(12) United States Patent
Tsubata

(10) Patent No.: US 8,570,453 B2
(45) Date of Patent: Oct. 29, 2013

(54) ACTIVE MATRIX SUBSTRATE, LIQUID CRYSTAL PANEL, LIQUID CRYSTAL DISPLAY UNIT, LIQUID CRYSTAL DISPLAY DEVICE AND TELEVISION RECEIVER

(75) Inventor: Toshihide Tsubata, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 190 days.

(21) Appl. No.: 13/146,636

(22) PCT Filed: Oct. 29, 2009

(86) PCT No.: PCT/JP2009/005753
§ 371 (c)(1),
(2), (4) Date: Jul. 27, 2011

(87) PCT Pub. No.: WO2010/089820
PCT Pub. Date: Aug. 12, 2010

(65) Prior Publication Data
US 2011/0279734 A1  Nov. 17, 2011

(30) Foreign Application Priority Data
Feb. 3, 2009  (JP) ............................... 2009-022977

(51) Int. Cl.
G02F 1/1343 (2006.01)
(52) U.S. Cl.
USPC ................................ 349/39; 349/48; 349/144
(58) Field of Classification Search
None
See application file for complete search history.

(56) References Cited

U.S. PATENT DOCUMENTS

| 5,808,706 | A | 9/1998 | Bae |
| 6,380,591 | B1 | 4/2002 | Kawano |
| 6,784,949 | B1 | 8/2004 | Nagata et al. |
| 2004/0114059 | A1* | 6/2004 | Lee et al. ..................... 349/39 |
| 2006/0023137 | A1 | 2/2006 | Kamada et al. |
| 2006/0236917 | A1* | 10/2006 | Denda ............................. 117/60 |
| 2007/0008444 | A1 | 1/2007 | Nakanishi et al. |
| 2007/0024786 | A1 | 2/2007 | Tanaka et al. |
| 2007/0070008 | A1 | 3/2007 | Shin et al. |
| 2007/0132690 | A1 | 6/2007 | Nakanishi et al. |

(Continued)

FOREIGN PATENT DOCUMENTS

| JP | H6-130412 A | 5/1994 |
| JP | 10-232405 A | 9/1998 |

(Continued)

OTHER PUBLICATIONS

English version of written opinion from PCT/JP2009/005753, mailing date Jan. 12, 2010.*

(Continued)

Primary Examiner — Mike Stahl
(74) Attorney, Agent, or Firm — Chen Yoshimura LLP

(57) ABSTRACT

With a configuration in which a first pixel electrode (17a) electrically connected to a first transistor (12) and a second pixel electrode (17b) connected to the first pixel electrode (17a) through a capacitance are provided in a single pixel, a storage capacitance wiring (18j) is formed in the same layer with a data signal line (15j), a second transistor (212c) is electrically connected to the storage capacitance wiring (18j) and to the first pixel electrode (17a), and a third transistor (212b) is electrically connected to the storage capacitance wiring (18j) and to the second pixel electrode (17b), a capacitance coupling type active matrix substrate equipped with transistors for discharge suppresses the aperture ratio reduction and load increase on gate bus lines (scan signal lines).

27 Claims, 39 Drawing Sheets

(56) References Cited

U.S. PATENT DOCUMENTS

| | | | |
|---|---|---|---|
| 2008/0062108 A1* | 3/2008 | Kim | 345/92 |
| 2008/0062340 A1* | 3/2008 | Um et al. | 349/38 |
| 2008/0067512 A1* | 3/2008 | Lee et al. | 257/59 |
| 2008/0158455 A1* | 7/2008 | Yoo et al. | 349/38 |
| 2009/0027582 A1 | 1/2009 | Ohta et al. | |
| 2010/0045883 A1* | 2/2010 | Kim et al. | 349/37 |
| 2010/0118010 A1 | 5/2010 | Shibasaki et al. | |
| 2011/0012941 A1 | 1/2011 | Shin et al. | |
| 2011/0128455 A1* | 6/2011 | Tsubata | 348/790 |
| 2011/0279735 A1 | 11/2011 | Tsubata | |

FOREIGN PATENT DOCUMENTS

| | | |
|---|---|---|
| JP | 11-202369 A | 7/1999 |
| JP | 2000-323698 A | 11/2000 |
| JP | 2001-223362 A | 8/2001 |
| JP | 2003-91017 A | 3/2003 |
| JP | 2006-39290 A | 2/2006 |
| JP | 2006-276432 A | 10/2006 |
| JP | 2006-330499 A | 12/2006 |
| JP | 2006-330633 A | 12/2006 |
| JP | 2007-086791 A | 4/2007 |
| WO | 2006/100861 A1 | 9/2006 |
| WO | 2010/089922 A1 | 8/2010 |

OTHER PUBLICATIONS

Applicant brings the attention of the Examiner to the following pending U.S. Appl. No. 13/146,637, filed Jul. 27, 2011, which is a national stage of PCT application No. PCT/JP2009/068211 published as WO2010/089922.

* cited by examiner

US 8,570,453 B2

ACTIVE MATRIX SUBSTRATE, LIQUID CRYSTAL PANEL, LIQUID CRYSTAL DISPLAY UNIT, LIQUID CRYSTAL DISPLAY DEVICE AND TELEVISION RECEIVER

TECHNICAL FIELD

The present invention relates to an active matrix substrate including a plurality of pixel electrodes in one pixel region, and to a liquid crystal display device (pixel division system) using such active matrix substrate.

BACKGROUND ART

In order to improve the dependence of view angle of γ (gamma) characteristics of liquid crystal display device (to suppress the display whitening problem or the like, for example), a liquid crystal display device in which a plurality of sub-pixels provided in one pixel are controlled for different luminance levels to display halftones by area gradation of the sub-pixels (pixel division system; see Patent Document 1, for example) is being proposed.

In an active matrix substrate disclosed in Patent Document 1 (see FIG. 41), three pixel electrodes (121a to 121c), three transistors (116, 421, and 422), and a control electrode 118 are provided in one pixel region, and a source electrode 116s of the transistor 116 connected to a gate bus line 112(n), two pixel electrodes 121a and 121c, and a control electrode 118 overlapping the pixel electrode 121b are electrically connected to each other. With this configuration, a coupling capacitance is formed where the pixel electrode 121b and the control electrode 118 overlap with each other, and the pixel electrode 121b, which is electrically floating, is connected to pixel electrodes 121a and 121c through the coupling capacitance (a capacitance coupling type active matrix substrate).

Also, a wiring 414 led out from a gate bus line 112(n−1) is connected to gate electrodes 421g and 422g, a wiring 424 led out from an auxiliary capacitance bus line 113 and a connecting section 423 are connected to each other, a transistor 421 for discharge is connected to the gate electrode 421g, the pixel electrode 121b, and the connecting section 423, and a transistor 422 for discharge is connected to the gate electrode 422g, the pixel electrode 121c, and the connecting section 423.

In a liquid crystal display device utilizing this active matrix substrate, sub-pixels that correspond to the pixel electrodes 121a and 121c can be bright sub-pixels, and a sub-pixel that corresponds to the pixel electrode 121b can be a dark sub-pixel. Halftones can be displayed by area gradation of bright sub-pixels (two sub-pixels) and a dark sub-pixel (one sub-pixel).

Also, when the previous gate bus line 112(n−1) is scanned (when transistors 421 and 422 for discharge turn on), the three pixel electrodes 121a to 121c can be connected to the auxiliary capacitance bus line 113. As a result, pixel electrode 121b, which is electrically floating, can be suppressed from being burned.

RELATED ART DOCUMENTS

Patent Documents

Patent Document 1: Japanese Patent Application Laid-Open Publication No. 2006-39290 (publication date: Feb. 9, 2006)

SUMMARY OF THE INVENTION

Problems to be Solved by the Invention

In the active matrix substrate shown in FIG. 41, the gate bus line 112(n−1) and the auxiliary capacitance bus line 113 are arranged in parallel with each other in the same layer. Therefore, in order to provide transistors 421 and 422 for discharge for connection to these bus lines, a wiring 424 led out from the auxiliary capacitance bus line 113 and a wiring 414 led out from the gate bus line 112(n−1) are necessary. However, by providing the wirings 414 and 424, a dead space is formed in the pixel region, and, as a result, the aperture ratio is lowered and the load on the gate bus line is increased.

The present invention is aiming at suppressing the aperture ratio reduction and the load increase on the gate bus line (scan signal line) for capacitance coupling type active matrix substrates equipped with transistors for discharge.

Means for Solving the Problems

An active matrix substrate of the present invention includes: a scan signal line that extends in the row direction when a data signal line extends in the column direction; a first transistor connected to the data signal line and the scan signal line; second and third transistors connected to the same scan signal line that is different from the aforementioned scan signal line; and a storage capacitance wiring, wherein a first pixel electrode electrically connected to the first transistor and a second pixel electrode connected to the first pixel electrode through a capacitance are provided in a single pixel region; the storage capacitance wiring is formed in the same layer with the data signal line; the second transistor is electrically connected to the storage capacitance wiring and the first pixel electrode; and the third transistor is electrically connected to the storage capacitance wiring and the second pixel electrode.

Effects of the Invention

In an active matrix substrate of the present invention, because the storage capacitance wiring is formed in the same layer with the data signal line (this is different from the layer of the scan signal line), an intersecting portion of the storage capacitance wiring and the scan signal line can be provided. Therefore, by disposing second and third transistors (transistors for discharge) near the intersecting portion, the aperture ratio reduction and the load increase on the gate bus line (scan signal line) can be suppressed more than in a conventional configuration (see FIG. 41). Also, this configuration has an advantage over the case where the storage capacitance wiring is provided in the same layer with the scan signal line, in that the distances between the storage capacitance wiring and the respective pixel electrodes are shorter, and therefore the storage capacitance can be increased without changing the aperture ratio.

BRIEF DESCRIPTION OF THE DRAWINGS

FIG. 5 is a schematic view showing the liquid crystal panel of FIG. 3 when the display is on.

FIG. 19 is a schematic view showing the liquid crystal panel of FIG. 18 when the display is on.

FIG. 23 is a schematic view showing the liquid crystal panel of FIG. 21 when the display is on.

DETAILED DESCRIPTION OF EMBODIMENTS

Examples of embodiments of the present invention are described below with reference to FIGS. 1 to 40. In the description below, it is assumed that the direction in which the scan signal line extends is the row direction, for convenience. Needless to say, however, when a liquid crystal display device equipped with the present liquid crystal panel (or the active matrix substrate used in the liquid crystal panel) is in use (when viewed), the scan signal line can extend either horizontal or vertical direction. Also, in figures showing the liquid crystal panels, the alignment control structure is omitted as appropriate.

Figure 3:
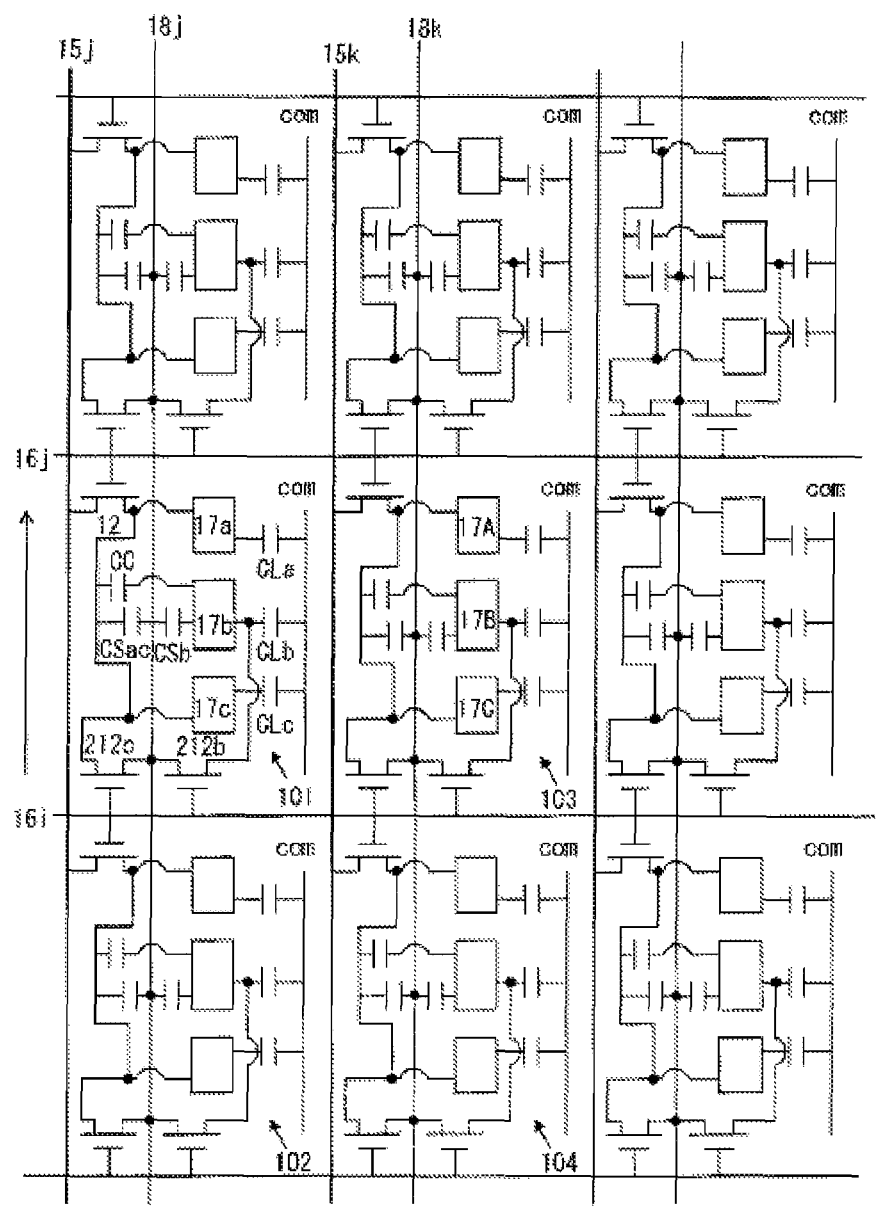
FIG. 3 is an equivalent circuit diagram of the liquid crystal panel of FIG. 1.

FIG. 3 is an equivalent circuit diagram showing a portion of a liquid crystal panel according to the present embodiment. As shown in FIG. 3, the present liquid crystal panel includes data signal lines (15$j$ and 15$k$) that extend in the column direction (up and down directions in the figure), scan signal lines (16$i$ and 16$j$) that extend in the row direction (left and right directions in the figure), pixels (101 to 104) arranged in row and column directions, storage capacitance wirings (18$j$ and 18$k$) that extend in the column direction (up and down directions in the figure), and a common electrode (opposite electrode) com, and the pixels have the same structure. The pixel column that includes pixels 101 and 102 and the pixel column that includes pixels 103 and 104 are adjacent to each other, and the pixel row that includes pixels 101 and 103 and the pixel row that includes pixels 102 and 104 are adjacent to each other.

The present liquid crystal panel is a capacitance coupling type liquid crystal panel equipped with transistors for discharge, in which for a pixel 101, for example, a data signal line 15$j$, a scan signal line 16$j$, and three transistors 12, 212$b$ (for discharge), and 212$c$ (for discharge), and a storage capacitance wiring 18$j$ are provided, and for the pixel 101, three pixel electrodes (17$a$ to 17$c$) are arranged in the column direction.

In the pixel 101, a pixel electrode 17$a$ (first pixel electrode) is connected to a data signal line 15$j$ through a transistor 12 (first transistor) connected to a scan signal line 16$j$; a pixel electrode 17$a$ and a pixel electrode 17$c$ (third pixel electrode) are connected to each other; the pixel electrodes 17$a$ and 17$c$ and a pixel electrode 17$b$ (second pixel electrode) are connected to each other through a coupling capacitance CC; transistors 212$b$ and 212$c$ for discharge are connected to a scan signal line 16$i$, which is scanned immediately before a scan signal line 16$j$; pixel electrodes 17$a$ and 17$c$ and a storage capacitance wiring 18$j$ are connected to each other through a transistor 212$c$; the pixel electrode 17$b$ and a storage capacitance wiring 18$j$ are connected to each other through the transistor 212b; a storage capacitance CSac is formed between the pixel electrodes 17a and 17c (including the electrical connecting section) and storage capacitance wiring 18j; a storage capacitance CSb is formed between the pixel electrode 17b (including the electrical connecting section) and the storage capacitance wiring 18j; a liquid crystal capacitance CLa is formed between the pixel electrode 17a and a common electrode com; a liquid crystal capacitance CLb is formed between the pixel electrode 17b and the common electrode com; and a liquid crystal capacitance CLc is formed between the pixel electrode 17c and the common electrode com.

In a liquid crystal display device equipped with the present liquid crystal panel, scan is conducted from the bottom to top of the figure (in the direction of the arrow). First, when the previous scan signal line 16i is scanned (when the transistors 212c and 212b for discharge are ON), the three pixel electrodes 17a to 17c are connected to the storage capacitance wiring 18j for discharging the pixel electrodes. Next, the current scan signal line 16j is scanned (transistor 12 turns ON), and the pixel electrodes 17a and 17c are connected to a data signal line 15j. Here, the pixel electrodes 17a and 17c are connected to the pixel electrode 17b through the coupling capacitance CC. Therefore, if the potential of the pixel electrode 17a and the pixel electrode 17c after the transistor 12 turns OFF (after scan signal line 16j is scanned) is denoted as "vac," and the potential of the pixel electrode 17b after the transistor 12 turns OFF (after scan signal line 16j is scanned) is denoted as "vb," then, |vac|≥|vb| (|vb|, for example, refers to the potential difference between the vb and the com potential=Vcom). For the halftone display, the sub-pixel including the pixel electrode 17a functions as a bright sub-pixel, the sub-pixel including the pixel electrode 17b functions as a dark sub-pixel, and the sub-pixel including the pixel electrode 17c functions as a bright sub-pixel. Display can be conducted by the area gradation of the two bright sub-pixels and the one dark sub-pixel. With this configuration, the view angle characteristics of the present liquid crystal display device can be improved.

Also, because the three pixel electrodes of a pixel can be discharged (to the storage capacitance wiring) immediately before (1H prior) the data signal potential is written on the pixel, burning of the sub-pixel that includes the pixel electrode which will be floating can be suppressed, and the variation of the pixel charge rate according to the data signal potentials written on the previous frame can also be minimized.

Figure 4:
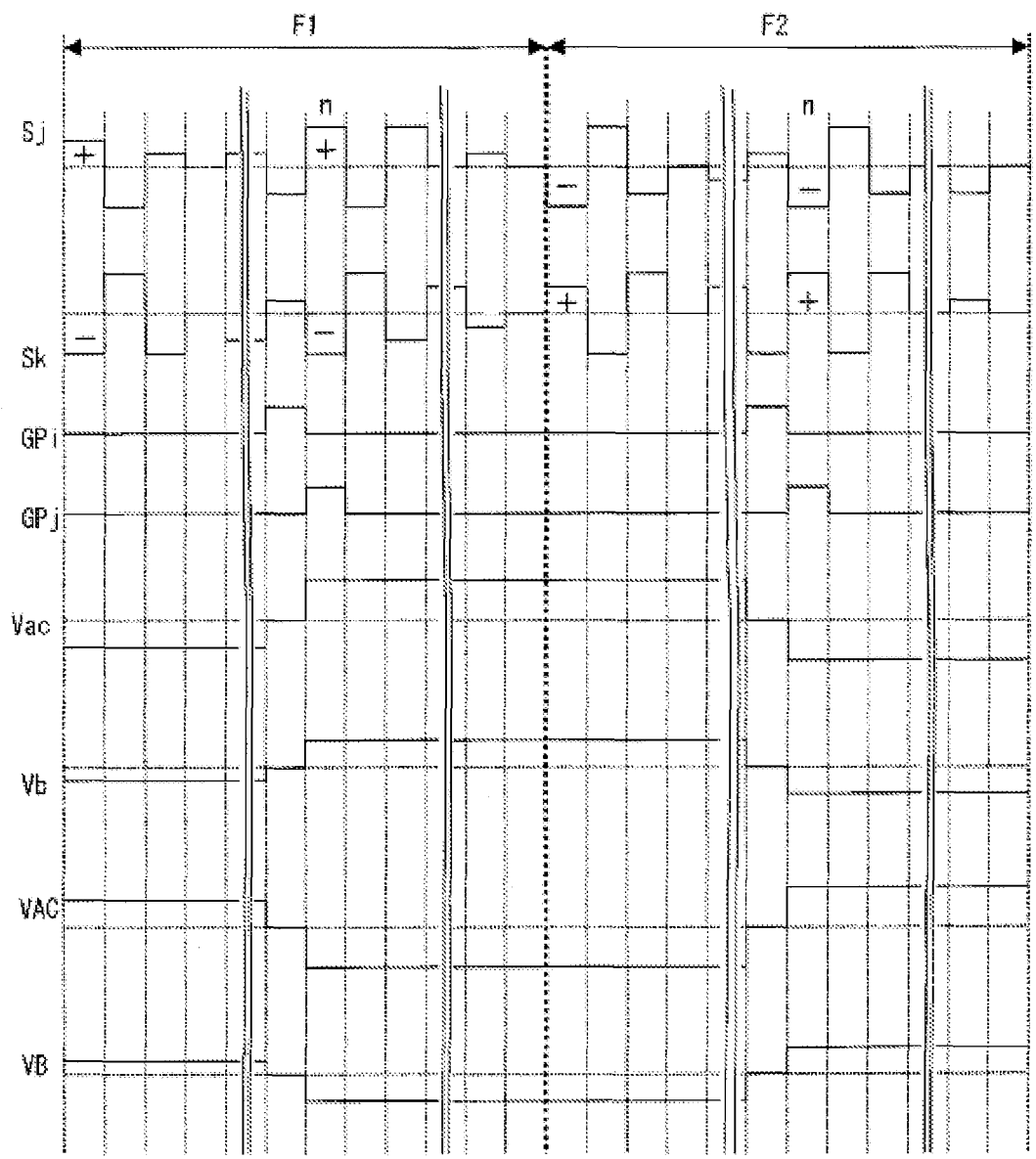
FIG. 4 is a timing chart showing the method for driving the liquid crystal display device equipped with the liquid crystal panel of FIG. 1.

FIG. 4 is a timing chart showing the method for driving the aforementioned liquid crystal display device (normally black mode). "Sj" and "Sk" refer to signal potentials supplied respectively to data signal lines 15j and 15k, "GPi" and "GPj" refer to gate-on pulse signals supplied respectively to scan signal lines 16i and 16j, "Vac" refers to the electrical potential of pixel electrodes 17a and 17c, and "Vb" refers to the electrical potential of the pixel electrode 17b. "VAC" refers to electrical potential of the pixel electrodes 17A and 17C provided in the pixel 103 (see FIG. 3), and "VB" refers to the electrical potential of the pixel electrode 17B provided in the pixel 103 (see FIG. 3).

In this driving method, as shown in FIG. 4, scan signal lines are selected sequentially, the polarity of the signal potential supplied to the data signal lines is reversed in every one horizontal scan period (1H), the polarity of the signal potential supplied during the same horizontal scan period in each frame is reversed for each frame, and during the same horizontal scan period, signal potentials of opposite polarities are supplied to two adjacent data signal lines.

Figure 5:
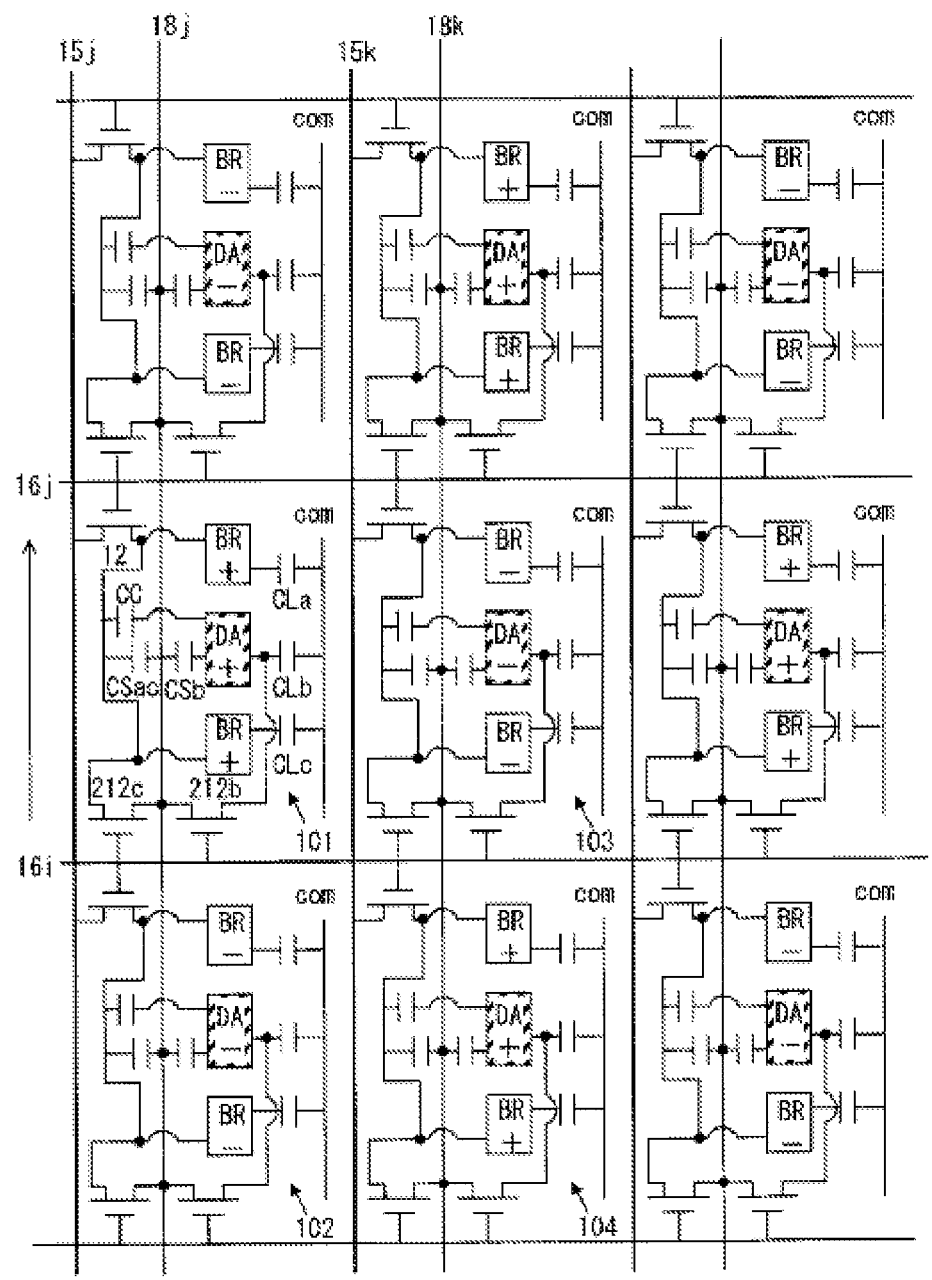

Specifically, in frame F1 out of consecutive frames F1 and F2, scan signal lines are sequentially selected, and to a data signal line 15j, a signal potential of negative polarity is supplied during the $(n-1)^{th}$ horizontal scan period (including the scan period of scan signal line 16i), and a signal potential of positive polarity is supplied during the $n^{th}$ horizontal scan period (including the scan period of scan signal line 16j), and to a data signal line 15k, a signal potential of positive polarity is supplied during the $(n-1)^{th}$ horizontal scan period, and a signal potential of negative polarity is supplied during the $n^{th}$ horizontal scan period. With this timing, as shown in FIG. 4, at the end of the $(n-1)^{th}$ horizontal scan period, a relation of Vac=Vb=VAC=VB=Vcom (the potential of the storage capacitance wiring 18j) is satisfied, and at the end of the $n^{th}$ horizontal scan period, relations of |Vac|≥|Vb| and |VAC|≥|VB| are satisfied. As shown in FIG. 5, a sub-pixel that includes the pixel electrode 17a (positive polarity) becomes a bright sub-pixel (BR), a sub-pixel that includes the pixel electrode 17b (positive polarity) becomes a dark sub-pixel (DA), a sub-pixel that includes the pixel electrode 17c (positive polarity) becomes a bright sub-pixel (BR), a sub-pixel that includes the pixel electrode 17A (negative polarity) becomes a bright sub-pixel (BR), a sub-pixel that includes the pixel electrode 17B (negative polarity) becomes a dark sub-pixel (DA), and a sub-pixel that includes the pixel electrode 17C (negative polarity) becomes a bright sub-pixel (BR).

In F2, scan signal lines are sequentially selected, and to data signal line 15j, a signal potential of positive polarity is supplied during the $(n-1)^{th}$ horizontal scan period (including the scan period of scan signal line 16i), and a signal potential of negative polarity is supplied during the $n^{th}$ horizontal scan period (including the scan period of scan signal line 16j), and to data signal line 15k, a signal potential of negative polarity is supplied during the $(n-1)^{th}$ horizontal scan period, and a signal potential of positive polarity is supplied in the $n^{th}$ horizontal scan period. With this timing, as shown in FIG. 4, at the end of the $(n-1)^{th}$ horizontal scan period, a relation of Vac=Vb=VAC=VB=Vcom (potential of storage capacitance wiring 18j) is satisfied, and at the end of the $n^{th}$ horizontal scan period, a relation of |Vac|≥|Vb| and |VAC|≥|VB| is satisfied. A sub-pixel that includes the pixel electrode 17a (negative polarity) becomes a bright sub-pixel, a sub-pixel that includes the pixel electrode 17b (negative polarity) becomes a dark sub-pixel, a sub-pixel that includes the pixel electrode 17c (negative polarity) becomes a bright sub-pixel, a sub-pixel that includes the pixel electrode 17A (positive polarity) becomes a bright sub-pixel, a sub-pixel that includes the pixel electrode 17B (positive polarity) becomes a dark sub-pixel, and a sub-pixel that includes the pixel electrode 17C (positive polarity) becomes a bright sub-pixel.

Figure 1:
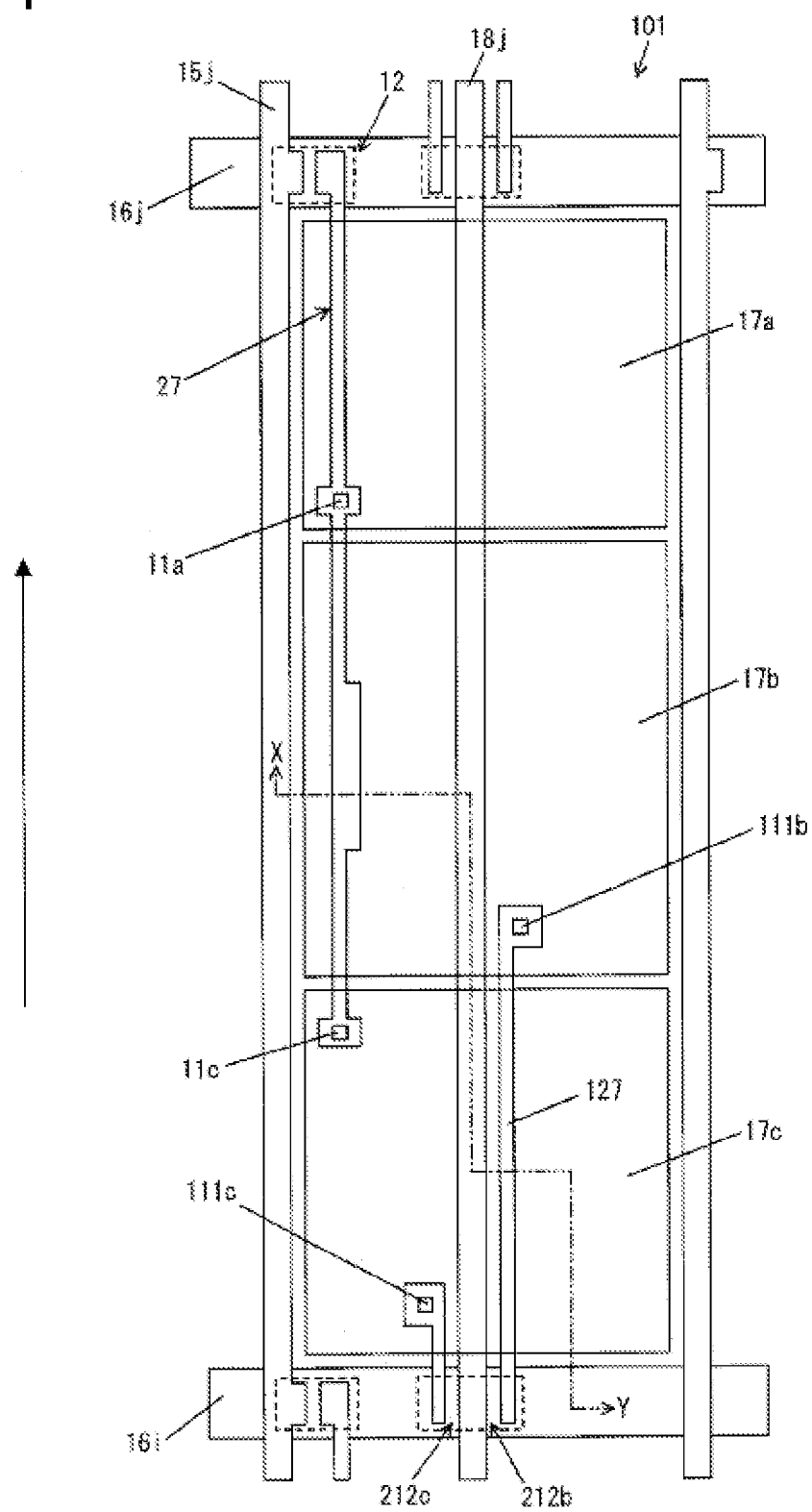
FIG. 1 is a plan view showing a configuration example of the present liquid crystal panel.

A specific example of pixel 101 of FIG. 3 is shown in FIG. 1. In FIG. 1, members of the color filter substrate (opposite substrate) are omitted, and only members of the active matrix substrate are illustrated for simplicity.

In the present liquid crystal panel, a transistor 12 is disposed near the intersecting portion of the data signal line 15j and the scan signal line 16j, and a storage capacitance wiring 18j is provided vertically across the pixel region defined by the data signal line 15j and the scan signal line 16j. The storage capacitance wiring 18j is formed in the same layer with the data signal line 15j, in parallel therewith. In the aforementioned pixel region, a pixel electrode 17a (first pixel electrode), a pixel electrode 17b (second pixel electrode), and a pixel electrode 17c are arranged in this order in the column direction, and the pixel electrode 17a is in proximity of the transistor 12.

The source electrode of the transistor 12 is connected to the data signal line 15*j*, the drain electrode is connected to a drain lead-out electrode 27, and the scan signal line 16*j* serves as the gate electrode of the transistor 12. The drain lead-out electrode 27 extends through under the pixel electrode 17*a* and the pixel electrode 17*b* and to under the pixel electrode 17*c*, and is connected to the pixel electrode 17*a* through a contact hole 11*a*, and is connected to the pixel electrode 17*c* through a contact hole 11*c*.

Also, the storage capacitance wiring 18*j* extends from above the current scan signal line 16*j* (where it intersects with the scan signal line 16*j*), continues through under the pixel electrode 17*a*, pixel electrode 17*b*, and pixel electrode 17*c*, and arrives above the previous scan signal line 16*i* (where it intersects with the scan signal line 16*i*). Transistors 212*b* and 212*c* are provided in proximity of the intersecting portion of the storage capacitance wiring 18*j* and the scan signal line 16*i*. A portion of previous scan signal line 16*i* functions as the respective gate electrodes of the transistors 212*b* and 212*c*; a portion of the storage capacitance wiring 18*j* functions as the common source electrode for the transistors 212*b* and 212*c*; the drain electrode of the transistor 212*b* is connected to the drain lead-out electrode 127; the drain electrode of the transistor 212*c* is connected to pixel electrode 17*c* through a contact hole 111*c*; the drain lead-out electrode 127 extends through under the pixel electrode 17*c* and arrives under the pixel electrode 17*b*, and is connected to the pixel electrode 17*b* through a contact hole 111*b*.

In the present liquid crystal panel, capacitances are formed at locations where the drain lead-out electrode 27 and the pixel electrode 17*b* overlap through an interlayer insulating film, and where the drain lead-out electrode 127 and the pixel electrode 17*c* overlap through an interlayer insulating film. The sum of the capacitances is a coupling capacitance CC (see FIG. 3). Further, capacitances are formed at locations where the storage capacitance wiring 18*j* and the pixel electrode 17*a* overlap through an interlayer insulating film, and where the storage capacitance wiring 18*j* and the pixel electrode 17*c* overlap through an interlayer insulating film. The sum of the capacitances is a storage capacitance CSac (see FIG. 3). Further, a capacitance is formed at a location where the storage capacitance wiring 18*j* and the pixel electrode 17*b* overlap through an interlayer insulating film. This capacitance is a storage capacitance CSb (see FIG. 3).

Figure 2:
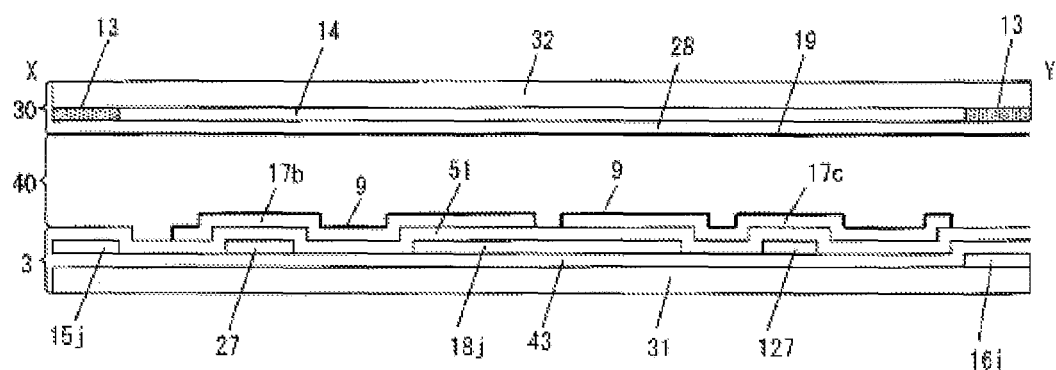
FIG. 2 is a cross-sectional arrow view showing the liquid crystal panel of FIG. 1.

FIG. 2 is a cross-sectional arrow view taken along the line X-Y of FIG. 1. As shown in the figure, the present liquid crystal panel includes an active matrix substrate 3, a color filter substrate 30 facing the active matrix substrate, and a liquid crystal layer 40 interposed between the substrates (3 and 30). In the active matrix substrate 3, a scan signal line 16*i* is formed on a glass substrate 31, and a gate insulating film 43 is formed to cover the scan signal line 16*i*. Over the gate insulating film 43, a drain lead-out electrode 27, a storage capacitance wiring 18*j*, a drain lead-out electrode 127, and a data signal line 15*j* are formed. Although not included in the cross-sectional view, over the gate insulating film 43, semiconductor layers for transistors 12, 212*b*, and 212*c* (i layer and n+ layer), and a source electrode and drain electrode in contact with the n+ layer are formed. Further, an interlayer insulating film 51 is formed to cover the metal layer composed of data signal line, drain lead-out electrode, and storage capacitance wiring and the like. Pixel electrodes 17*b* and 17*c* are formed on the interlayer insulating film 51, and an alignment film 9 is formed to cover the pixel electrodes. Although not included in the cross-sectional view of FIG. 2, portions of the interlayer insulating film 51 is removed at the locations where contact holes 11*a*, 11*c*, 111*b*, and 111*c* of FIG. 1 are formed.

The gate insulating film 43 may have a single-layered structure of inorganic insulating film (silicon nitride SiNx, for example), or a multi-layered structure of a thick organic insulating film (an insulating film made of SOG material, for example) and a thinner inorganic insulating film (silicon nitride SiNx, for example). Also, the interlayer insulating film 51 may have a single-layered structure of inorganic insulating film (silicon nitride SiNx, for example), or a multi-layered structure of a thin inorganic insulating film (silicon nitride SiNx, for example) and a thicker organic insulating film. With a multi-layered interlayer insulating film 51, parasitic capacitance of the pixel electrode and respective signal lines is reduced, and therefore the pixel electrode can be made larger (for higher aperture ratio), for example. In this case, in order to secure the coupling capacitance, the interlayer insulating film 51 may (locally) be thinned at the locations where the film overlaps the drain lead-out electrode 27 and the pixel electrode 17*b*, and where the film overlaps the drain lead-out electrode 127 and pixel electrode 17*c* (by removing the thick organic insulating film, for example).

On the other hand, for the color filter substrate 30, a black matrix 13 and a colored layer (color filter layer) 14 are formed on a glass substrate 32, and over which a common electrode (com) 28 is formed, and, furthermore, over which an alignment film 19 is formed.

Next, a method for manufacturing the present liquid crystal panel is described. The method for manufacturing the liquid crystal panel includes the steps of: manufacturing the active matrix substrate; manufacturing the color filter substrate; and assembling the substrates in which the substrates are bonded together and the liquid crystal is filled.

First, over a substrate made of glass, plastic, or the like, a metal film of titanium, chrome, aluminum, molybdenum, tantalum, tungsten, copper, or the like, an alloy film of such metals, or a layered film (thickness: 1000 Å-3000 Å) of such metals are deposited by sputtering. Then, patterning is conducted by a photolithographic technology (Photo Engraving Process; hereinafter referred to as "PEP technology") to form scan signal lines (gate electrodes of respective transistors).

Next, over the entire substrate with the scan signal lines formed thereon, an inorganic insulating film (thickness: approx. 3000 Å-5000 Å) made of silicon nitride or silicon oxide is deposited by CVD (Chemical Vapor Deposition) to form a gate insulating film.

Subsequently, an intrinsic amorphous silicon film (thickness: 1000 Å-3000 Å) and an n+ amorphous silicon film (thickness: 400 Å-700 Å) doped with phosphorus are continuously deposited over the gate insulating film (over the entire substrate) by CVD. Then, the films are patterned by PEP technology to form an island-shaped multi-layered body of silicon composed of the intrinsic amorphous silicon layer and the n+ amorphous silicon layer on the gate electrode.

Next, over the entire substrate with the multi-layered body of silicon is formed thereon, a metal film of titanium, chrome, aluminum, molybdenum, tantalum, tungsten, copper, or the like, an alloy film of such metals, or a layered film (thickness: 1000 Å-3000 Å) of such metals is deposited by sputtering. Then, patterning is conducted by the PEP technology to form data signal lines, source electrodes and drain electrodes of transistors, storage capacitance wirings, and drain lead-out electrodes (metal layer formation).

Further, using the source electrode and the drain electrode as a mask, the n+ amorphous silicon layer constituting the multi-layered body of silicon is etched away to form a transistor channel. Here, although the semiconductor layer may be formed of amorphous silicon film as described above, a polysilicon film may alternatively be deposited. Also, the amorphous silicon film or the polysilicon film may optionally be subjected to a laser annealing treatment for improved crystallinity. This treatment makes the electrons in the semiconductor layer move faster, and therefore improves the characteristics of the transistor (TFT).

Next, an interlayer insulating film is formed over the entire substrate on which data signal lines and the like have been formed. Specifically, using a mixed gas of $SiH_4$ gas, $NH_3$ gas, and $N_2$ gas, an inorganic interlayer insulating film (passivation film) made of SiNx and having a thickness of about 3000 Å is formed to cover the entire surface of the substrate by CVD. Further, an organic interlayer insulating film made of a positive photosensitive acrylic resin and having a thickness of about 3 μm is formed by spin coating or die coating as necessary.

Subsequently, using the PEP technology, the interlayer insulating film is etched away to form contact holes. Next, a transparent conductive film (thickness: 1000 Å-2000 Å) made of ITO (Indium Tin Oxide), IZO (Indium Zinc Oxide), zinc oxide, tin oxide, or the like is deposited on the interlayer insulating film in which the contact holes have been formed, over the entire substrate by sputtering. Then, the film is patterned by PEP technology to form pixel electrodes.

Lastly, polyimide resin is printed for a thickness of 500 Å to 1000 Å over the entire substrate with the pixel electrodes formed thereon. Then, through baking and a unidirectional rubbing treatment using a rotating cloth, an alignment film is formed. The active matrix substrate is manufactured in this manner.

Below, steps for manufacturing the color filter substrate are described.

First, over a substrate made of glass, plastic, or the like (over the entire substrate), a chrome thin film or a resin containing a black pigment is deposited. Then, using the PEP technology, the film is patterned to form a black matrix. Next, in intervals in the black matrix, a color filter layer (thickness: approx. 2 μm) of red, green, and blue is formed by patterning using a pigment dispersing method or the like.

Next, on the color filter layer over the entire substrate, a transparent conductive film (thickness: approx. 1000 Å) made of ITO, IZO, zinc oxide, tin oxide or the like is deposited to form a common electrode (com).

Lastly, polyimide resin is printed to a thickness of 500 Å to 1000 Å over the entire substrate with the common electrode formed thereon. Then, through baking and a unidirectional rubbing treatment using a rotating cloth, an alignment film is formed. The color filter substrate can be manufactured in this manner.

Below, the assembly process is described.

First, a sealing material made of a thermosetting epoxy resin or the like is applied on either the active matrix substrate or the color filter substrate by screen printing in a frame-like pattern with an opening, which will be the inlet for the liquid crystal. On the other substrate, ball-shaped spacers made of plastic or silica and having a diameter equivalent to the thickness of the liquid crystal layer are dispersed.

Next, the active matrix substrate and the color filter substrate are bonded together, and the sealing material is cured.

Lastly, liquid crystal material is introduced into the space surrounded by the active matrix substrate, the color filter substrate, and the sealing material by a decompression procedure. Then, a UV-curable resin is applied to the inlet for the liquid crystal and is subjected to UV radiation to seal in the liquid crystal material and thereby to form a liquid crystal layer. The liquid crystal panel is manufactured in this manner.

Figure 41:
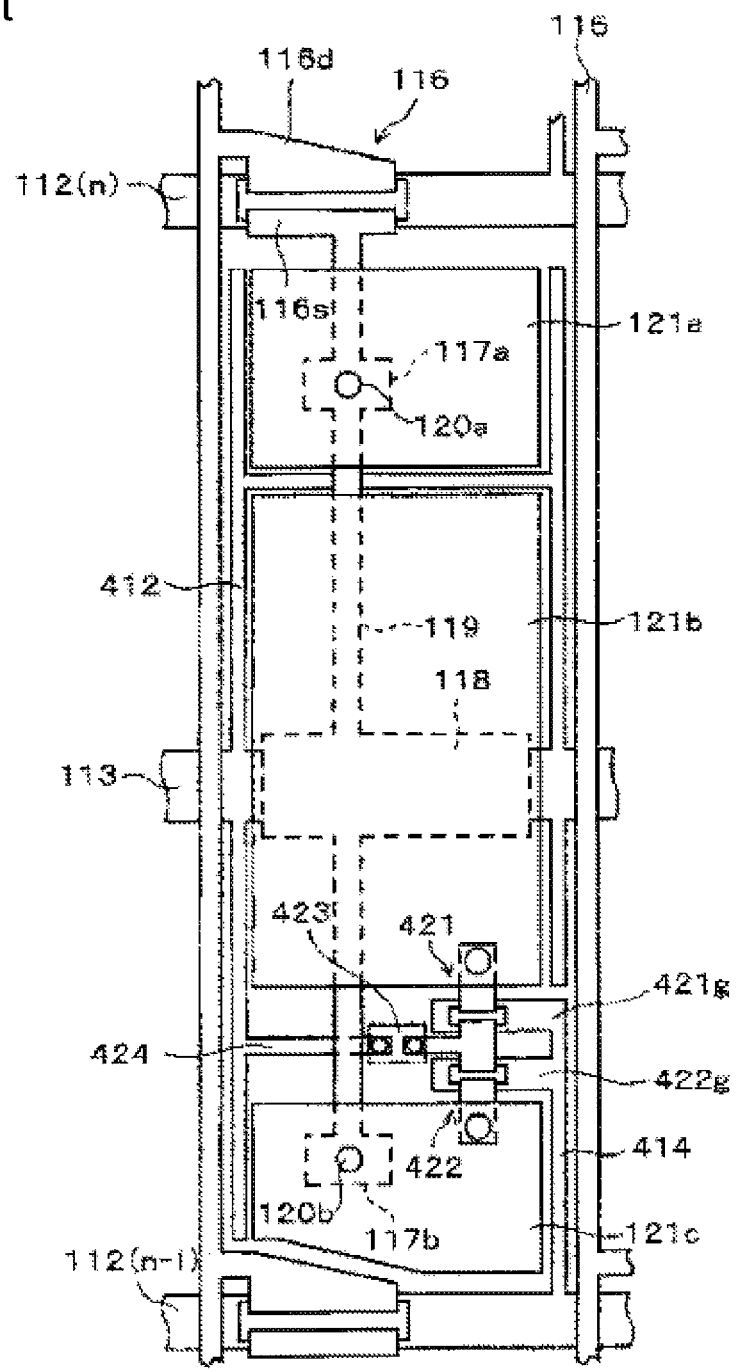
FIG. 41 is a plan view showing the configuration of a conventional active matrix substrate.

In the present liquid crystal panel, the capacitance coupling type active matrix substrate, which is equipped with transistors for discharge, has a storage capacitance wiring formed in the same layer with the data signal line, in parallel therewith. This arrangement allows the placement of a transistor for discharge near an intersecting portion of a scan signal line and a storage capacitance wiring, which eliminates the need to use lead-out lines from the storage capacitance wiring or from the scan signal line, as in a conventional case (see FIG. 41), to provide transistors for discharge. As a result, the aperture ratio reduction and the load increase on the scan signal line can be suppressed.

Also, because the storage capacitance wiring is formed in the metal layer (in the same layer with the data signal line), the distance between the respective pixel electrodes and the storage capacitance wiring is shorter compared to the case where the storage capacitance wiring is formed in the gate layer (in the same layer with the scan signal line). Consequently, the storage capacitance can be made larger without changing the overlapping area of the pixel electrode and the storage capacitance wiring (that is, without changing the aperture ratio). Also, the overlapping area of the pixel electrode and the storage capacitance wiring can be made smaller to improve the aperture ratio without changing the storage capacitance.

Also, because coupling capacitances are formed at two locations (where the drain lead-out electrode 27 and the pixel electrode 17b overlap, and where the drain lead-out electrode 127 and the pixel electrode 17c overlap), even if the drain lead-out electrodes 27 and 127 are made thinner to increase the aperture ratio, the necessary coupling capacitance can still be obtained.

Also, because the storage capacitance wiring is formed in the same layer with the data signal line, a portion of the storage capacitance wiring can be used as the common source electrode for transistors for discharge (212b and 212c). Consequently, contact holes do not need to be provided, unlike the case with the conventional configuration. As a result, problems such as poor contact at the contact holes or disturbed liquid crystal orientation caused by the contact holes can be avoided.

Also, if a problem such as a short-circuit occurs in the transistor 12 connected to the data signal line, by cutting the drain lead-out electrode 27 between the drain electrode of the transistor 12 and the contact hole 11a, the corresponding pixel can be made dark (because, in each frame, when the previous scan signal line 16i is scanned, the electrical potential of the storage capacitance wiring 18j is supplied to the pixel electrodes 17a and 17c).

Figure 6:
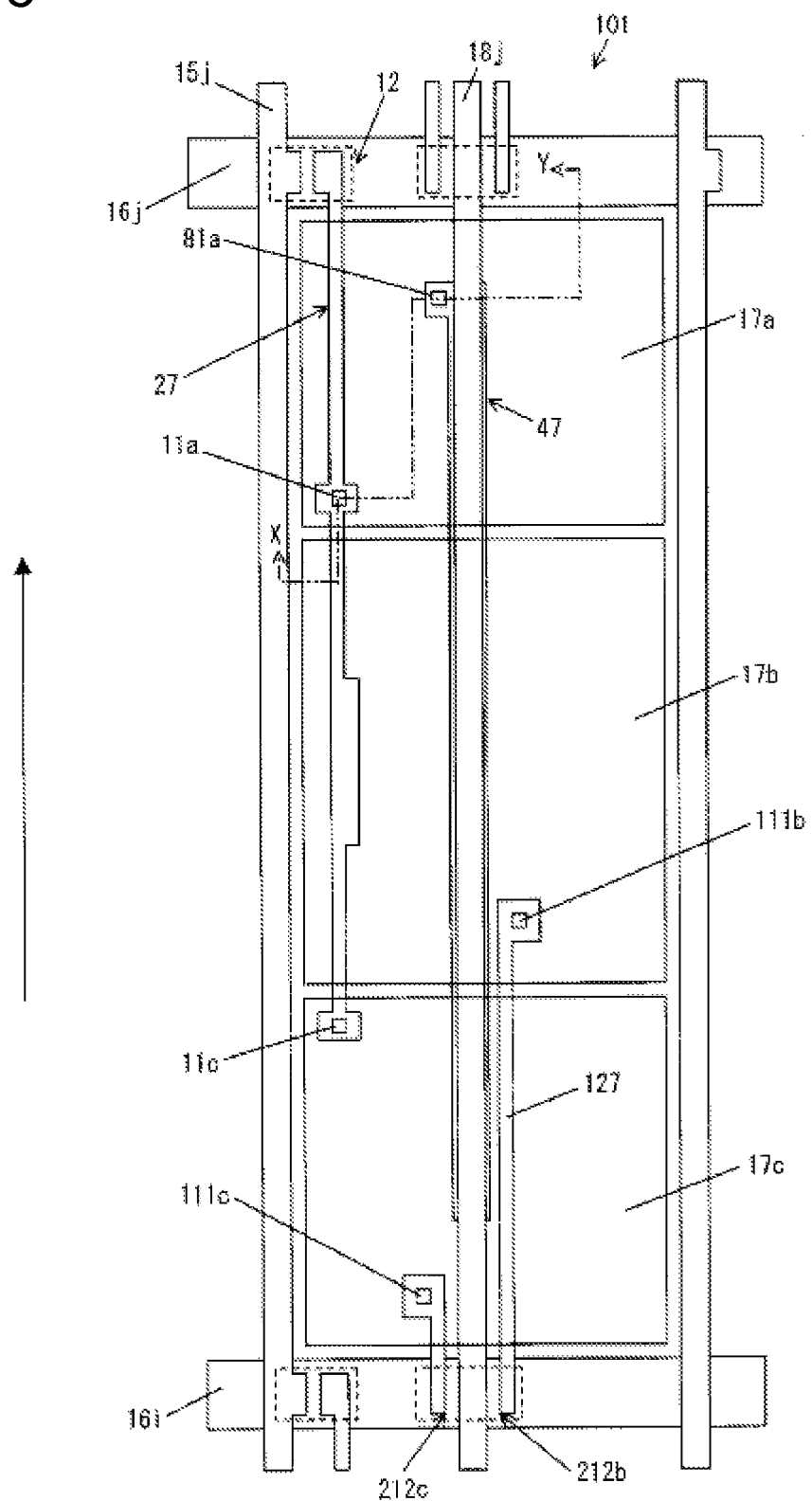
FIG. 6 is a plan view showing a modification example of the liquid crystal panel of FIG. 1.
Figure 7:
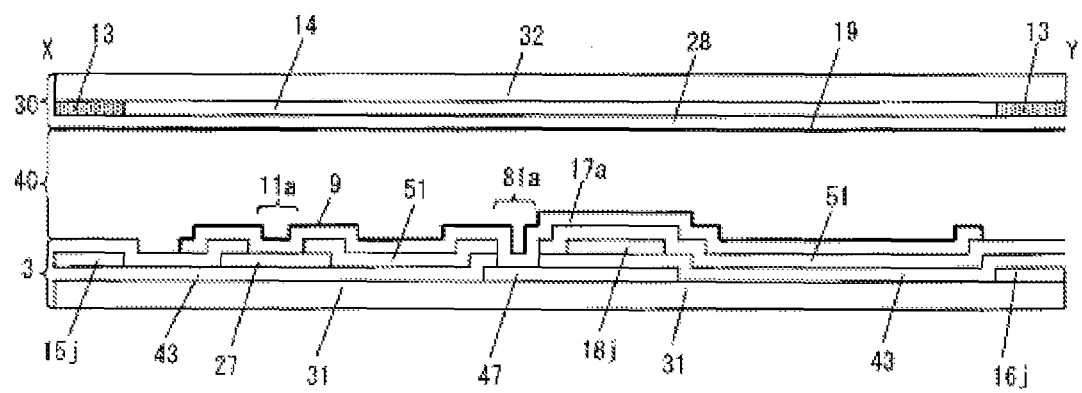
FIG. 7 is a cross-sectional arrow view showing the liquid crystal panel of FIG. 6.

As shown in FIG. 6, which illustrates a liquid crystal panel that is modified from the one in FIG. 1, and FIG. 7, which is a cross-sectional view taken along the line X-Y of FIG. 6, a capacitance electrode 47 can also be disposed under the storage capacitance wiring 18j in such manner as to overlaps with the pixel electrodes 17a to 17c, so that the capacitance electrode 47 is connected to the pixel electrode 17a through a contact hole 81a. As shown in FIGS. 6 and 7, the capacitance electrode 47 is formed in the same layer with the scan signal line 16j, and at a location where the contact hole 81a is formed, the gate insulating film 43 and the interlayer insulating film 51 are removed so that the pixel electrode 17a and the capacitance electrode 47 are in contact with one another. According to the configuration illustrated in FIGS. 6 and 7, a storage capacitance can be formed also at a location where the storage capacitance wiring 18j and the capacitance electrode 47 overlap through the gate insulating film 43. As a result, a storage capacitance CSac of FIG. 3 can be made larger while leaving the aperture ratio almost intact.

In this case, as shown in FIG. 6, preferably the width of the capacitance electrode 47 is made slightly greater than that of the storage capacitance wiring 18*j* so that the two edges of the storage capacitance wiring 18*j* extending in the column direction fall between the two edges of the capacitance electrode 47 extending in the column direction. With this configuration, the value of the storage capacitance is unlikely to vary even if the alignment and formation width of the capacitance electrode 47 are inconsistent. Also, because the a coupling capacitance can be formed at a location where the capacitance electrode 47 and the pixel electrode 17*b* overlap with each other only through the gate insulating film 43 and the interlayer insulating film 51 (the overlapping portion of the capacitance electrode 47 and the pixel electrode 17*b* minus the overlapping portion of the capacitance electrode 47, the pixel electrode 17*b*, and the storage capacitance wiring 18*j*), the drain lead-out electrodes 27 and 127 can be made thinner, accordingly.

Alternatively, the width of the storage capacitance wiring 18*j* may be made slightly greater than that of the capacitance electrode 47 so that the two edges of the capacitance electrode 47 extending in the column direction fall between the two edges of the storage capacitance wiring 18*j* extending in the column direction. With this configuration, the value of the storage capacitance is unlikely to vary even if the alignment and formation width of the storage capacitance wiring 18*j* are inconsistent. Also, the portion where the storage capacitance wiring 18*j* and the pixel electrodes 17*a* to 17*c* overlap with each other through the interlayer insulating film 51 becomes larger, and accordingly the storage capacitance value can be made larger.

Figure 38:
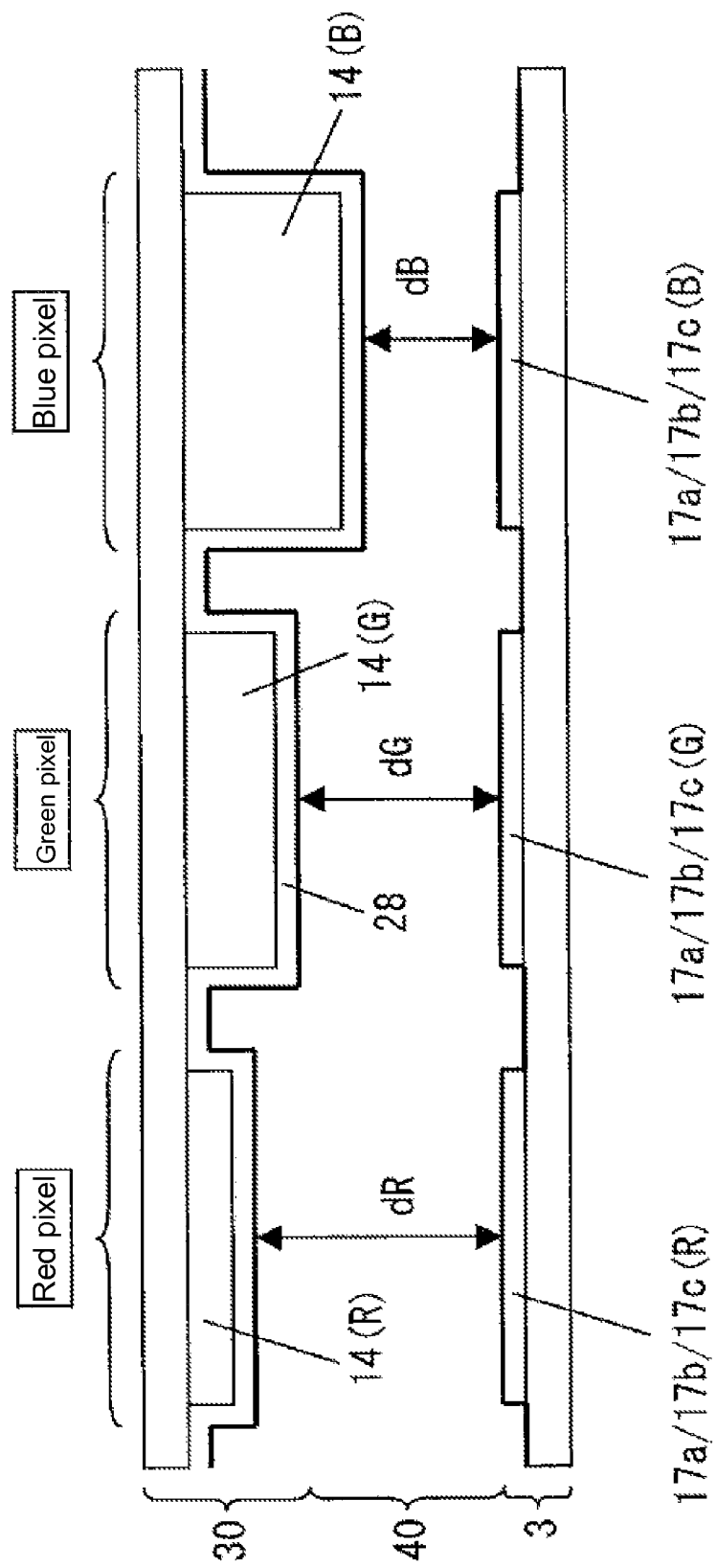
FIG. 38 is a cross-sectional view of an RGB multi-gap type liquid crystal panel.

Multi-gap type liquid crystal panels in which the liquid crystal layer has different thicknesses for R (red), G (green), B (blue) pixels to compensate for retardation wavelength dependence and to suppress the coloring have been proposed. However, in this type of liquid crystal panel where the liquid crystal capacity differs for R, G, and B pixels, the lead-in voltage when the transistor is OFF is different for R, G, and B pixels, which can cause problems such as burning and flickers. Therefore, if the liquid crystal panel of FIG. 6 is modified to be a multi-gap type liquid crystal panel as shown in FIG. 38, where dR (the thickness of the liquid crystal layer for R pixel)>dG (the thickness of the liquid crystal layer for G pixel)>dB (the thickness of the liquid crystal layer for B pixel), preferably the storage capacitance value is modified for R, G, and B pixels. More specifically, it is preferable that the relation of R pixel storage capacitance>G pixel storage capacitance>B pixel storage capacitance is satisfied.

Figure 39:
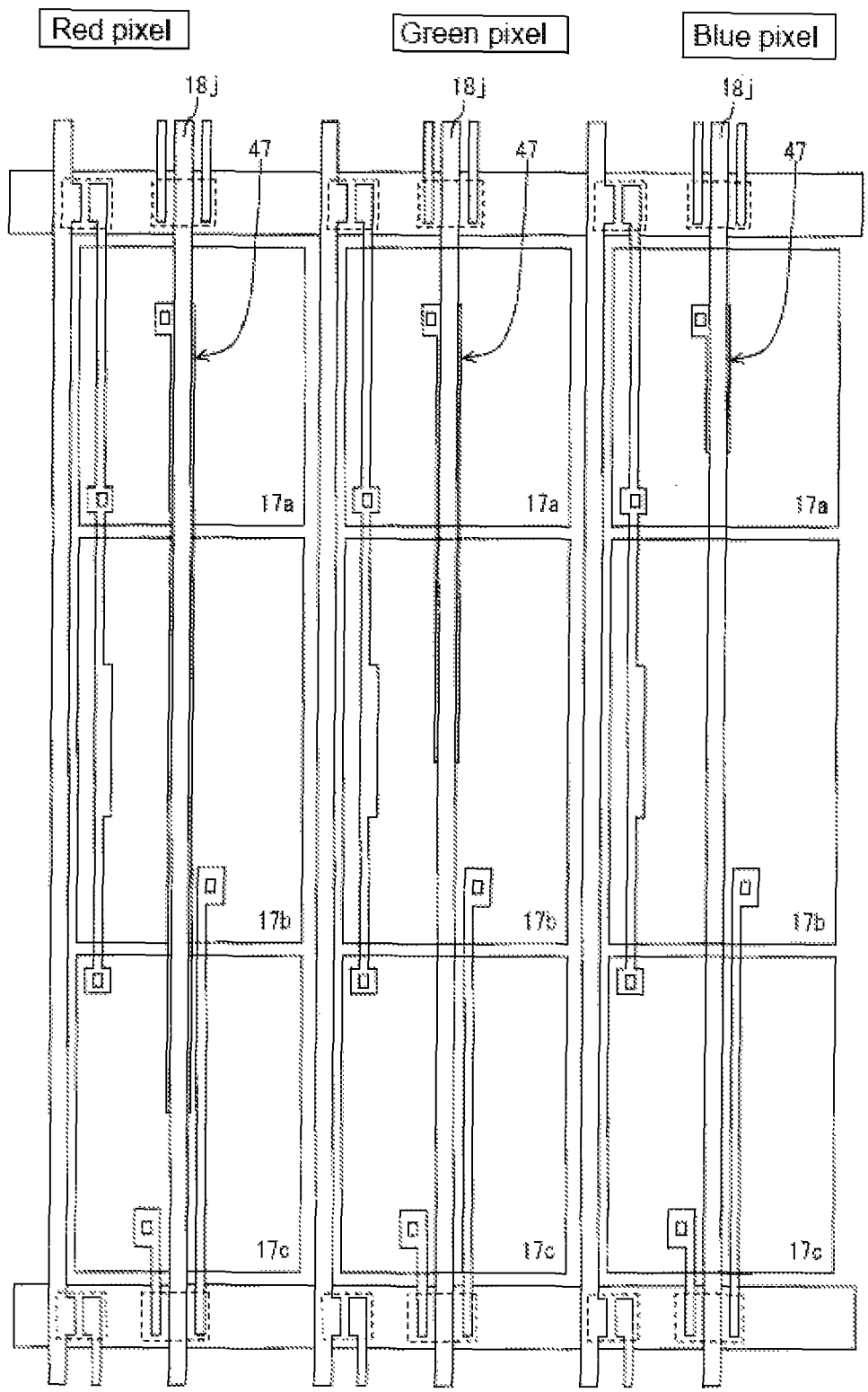
FIG. 39 is a plan view showing a configuration example of the liquid crystal panel of FIG. 6 as it is modified to be an RGB multi-gap type panel.

As shown in FIG. 39, for example, by making the capacitance electrode 47 for R pixel long enough to overlap the pixel electrodes 17*a* to 17*c*, by making the capacitance electrode 47 for G pixel long enough to overlap the pixel electrodes 17*a* and 17*b* only, and by making the capacitance electrode 47 for B pixel long enough to overlap the pixel electrode 17*a* only, and, furthermore, by using a transparent electrode as the capacitance electrode 47 for each pixel, variation in the liquid crystal capacitance can be compensated by the storage capacitance, without the need to change the aperture ratio for R, G, and B pixels. As a result, a consistent lead-in voltage can be obtained for R, G, and B pixels. With this configuration, burning and flickers can be suppressed.

Figure 40:
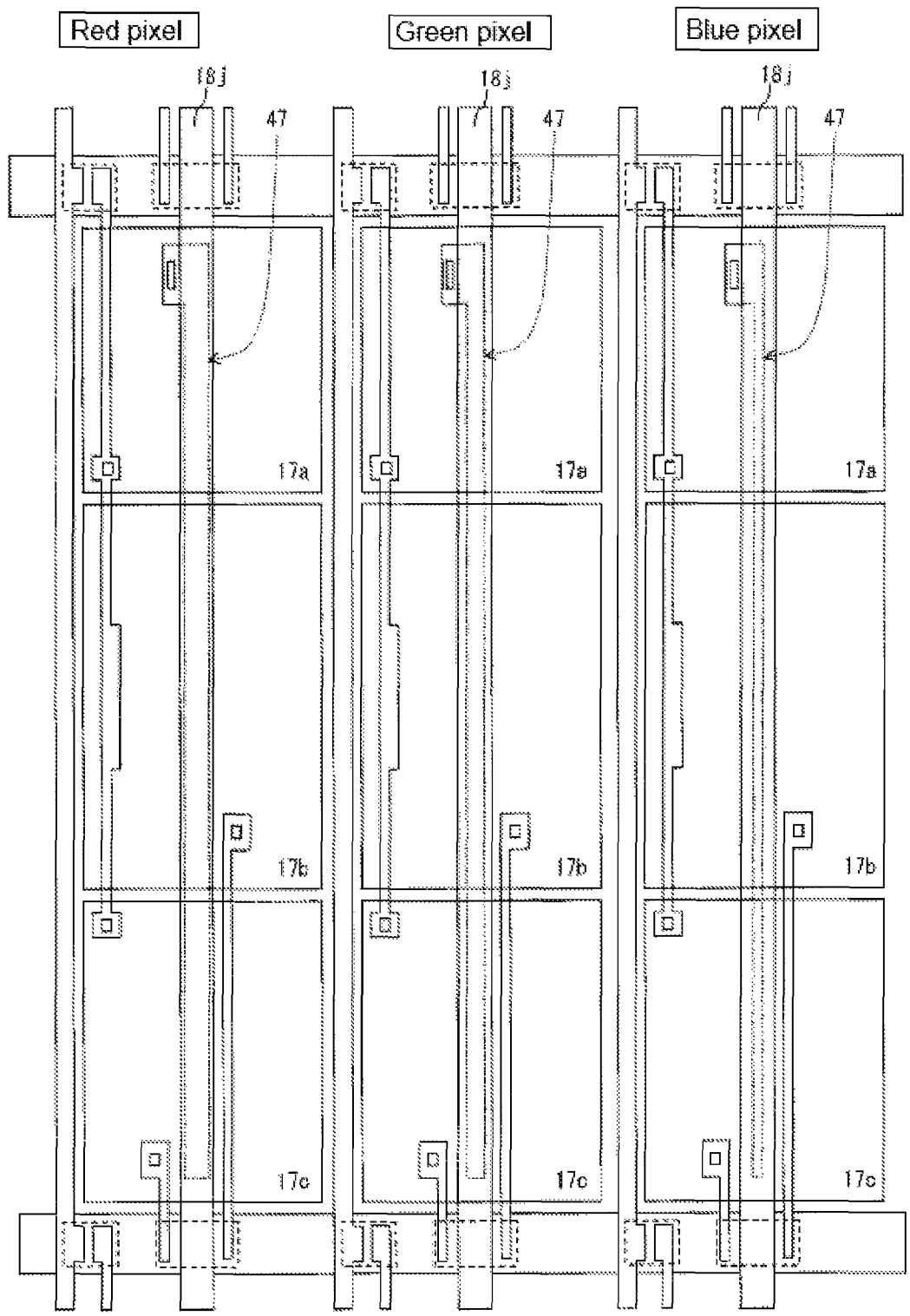
FIG. 40 is a plan view showing another configuration example of the liquid crystal panel of FIG. 6 as it is modified to be an RGB multi-gap type panel.

Alternatively, as shown in FIG. 40, by forming the capacitance electrode 47 of each pixel so that the two edges of the capacitance electrode 47 extending in the column direction fall between the two edges of the storage capacitance wiring 18*j* extending in the column direction, and by satisfying the relation of the capacitance electrode 47 width for R pixel>the capacitance electrode 47 width for G pixel>capacitance electrode 47 width for B pixel, variation in the liquid crystal capacitance can be compensated by the storage capacitance without the need to change the aperture ratio of R, G, and B pixels. As a result, a consistent lead-in voltage can be obtained for R, G, and B pixels. With this configuration, burning and flickers can be suppressed.

Figure 8:
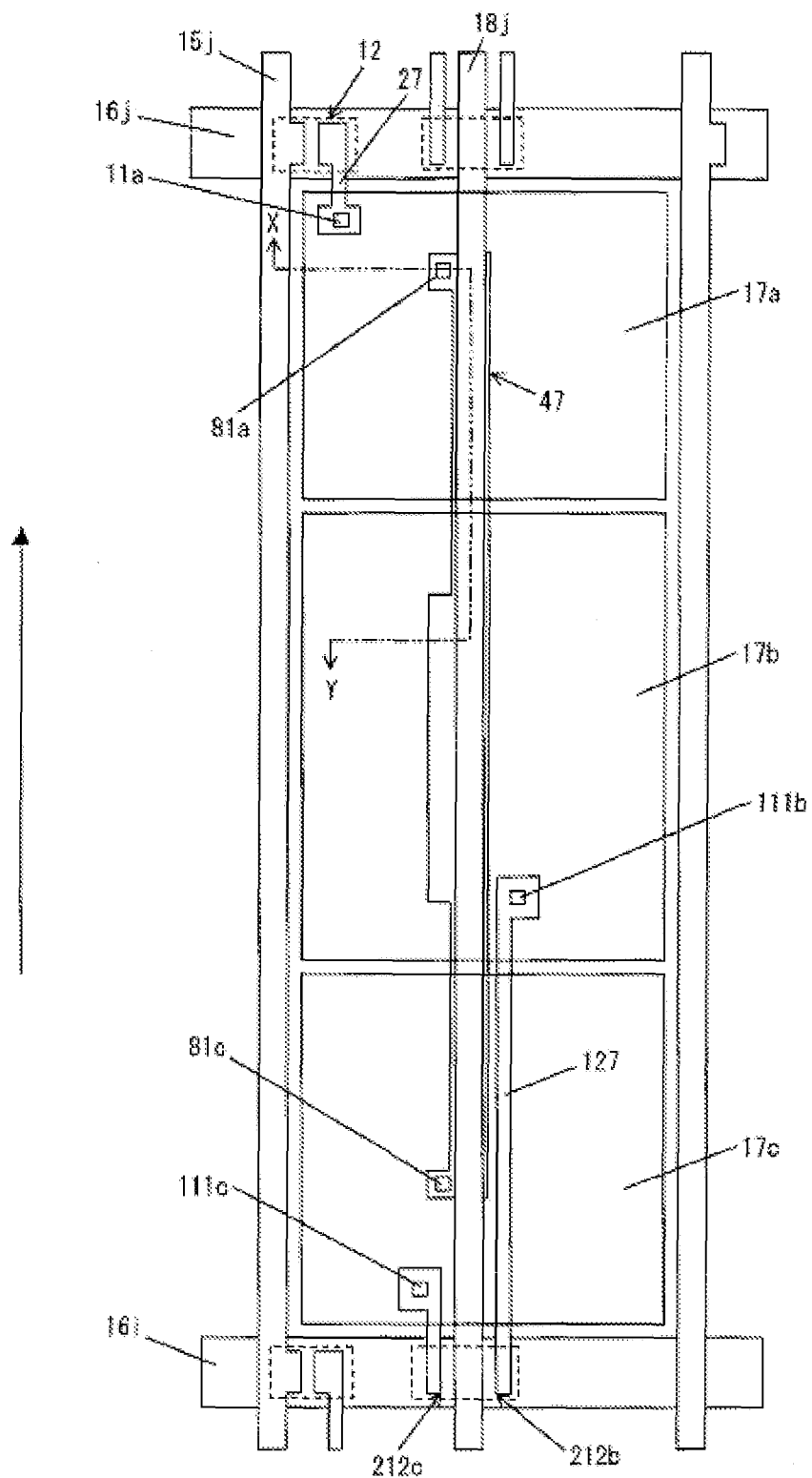
FIG. 8 is a plan view showing another modification example of the liquid crystal panel shown in FIG. 1.
Figure 9:
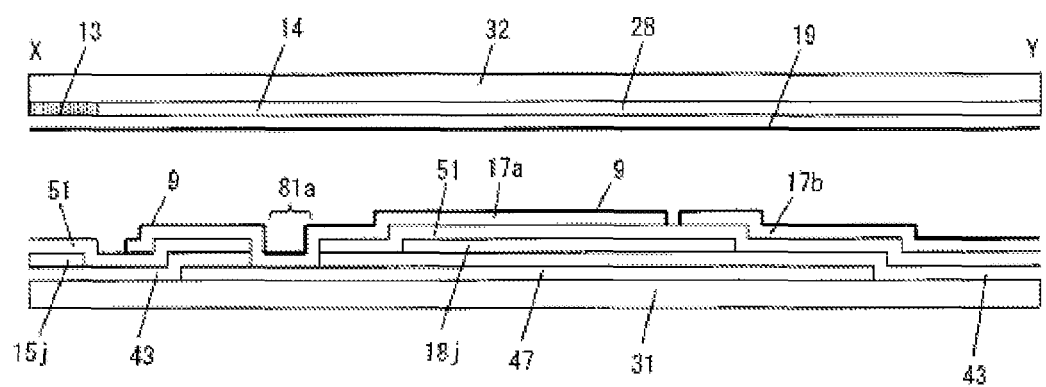
FIG. 9 is a cross-sectional arrow view showing the liquid crystal panel of FIG. 8.

As shown in FIG. 8, which illustrates a liquid crystal panel that is modified from the one in FIG. 6, and FIG. 9, which is a cross-sectional view taken along the line X-Y of FIG. 8, the aperture ratio can also be improved by making the drain lead-out electrode 27 shorter so that it overlaps the pixel electrode 17*a* only, and by transferring its function to the capacitance electrode 47. That is, the drain electrode of the transistor 12 is connected to the pixel electrode 17*a* through the contact hole 11*a*; the capacitance electrode 47 is provided under the storage capacitance wiring 18*j* in such manner as to overlap with the pixel electrodes 17*a* to 17*c*; the capacitance electrode 47 is connected to the pixel electrode 17*a* through the contact hole 81*a*, and also to the pixel electrode 17*c* through the contact hole 81*c*; and further, the portion of the capacitance electrode 47 that overlap the pixel electrode 17*b* is made wider. The capacitance electrode 47 is formed in the same layer with the scan signal line 16*j*; at the location where the contact hole 81*a* is formed, the gate insulating film 43 and the interlayer insulating film 51 are removed so that the capacitance electrode 47 and the pixel electrode 17*a* are in contact with each other; at the location where the contact hole 81*c* is formed, the gate insulating film 43 and the interlayer insulating film 51 are removed so that the capacitance electrode 47 and the pixel electrode 17*c* are in contact with each other.

In the liquid crystal panel shown in FIGS. 8 and 9, a capacitance is formed where the capacitance electrode 47 (especially the portion with a greater width) and the pixel electrode 17*b* overlap with each other through the gate insulating film 43 and the interlayer insulating film 51 only (the overlapping portion of the capacitance electrode 47 and the pixel electrode 17*b* minus the overlapping portion of the capacitance electrode 47, the pixel electrode 17*b*, and the storage capacitance wiring 18*j*) and where the drain lead-out electrode 127 and the pixel electrode 17*c* overlap with each other through the interlayer insulating film. The sum of the capacitances is a coupling capacitance CC (see FIG. 3). Further, capacitances are formed at locations where the storage capacitance wiring 18*j* and the pixel electrode 17*a* overlap with each other through the interlayer insulating film 51, where the storage capacitance wiring 18*j* and the pixel electrode 17*c* overlap with each other through the interlayer insulating film 51, and where the storage capacitance wiring 18*j* and capacitance electrode 47 overlap with each other through the gate insulating film 43. The sum of the capacitances is a storage capacitance CSac (see FIG. 3). Further, a capacitance is formed at a location where the storage capacitance wiring 18*j* and the pixel electrode 17*b* overlap with each other through an interlayer insulating film. This capacitance is a storage capacitance CSb (see FIG. 3). In this configuration, because a capacitance (coupling capacitance) is formed where the drain lead-out electrode 127 and the pixel electrode 17*c* overlap with each other through an interlayer insulating film, a portion with a greater width may not need to be formed for the capacitance electrode 47 depending on the size of the capacitance.

Figure 10:
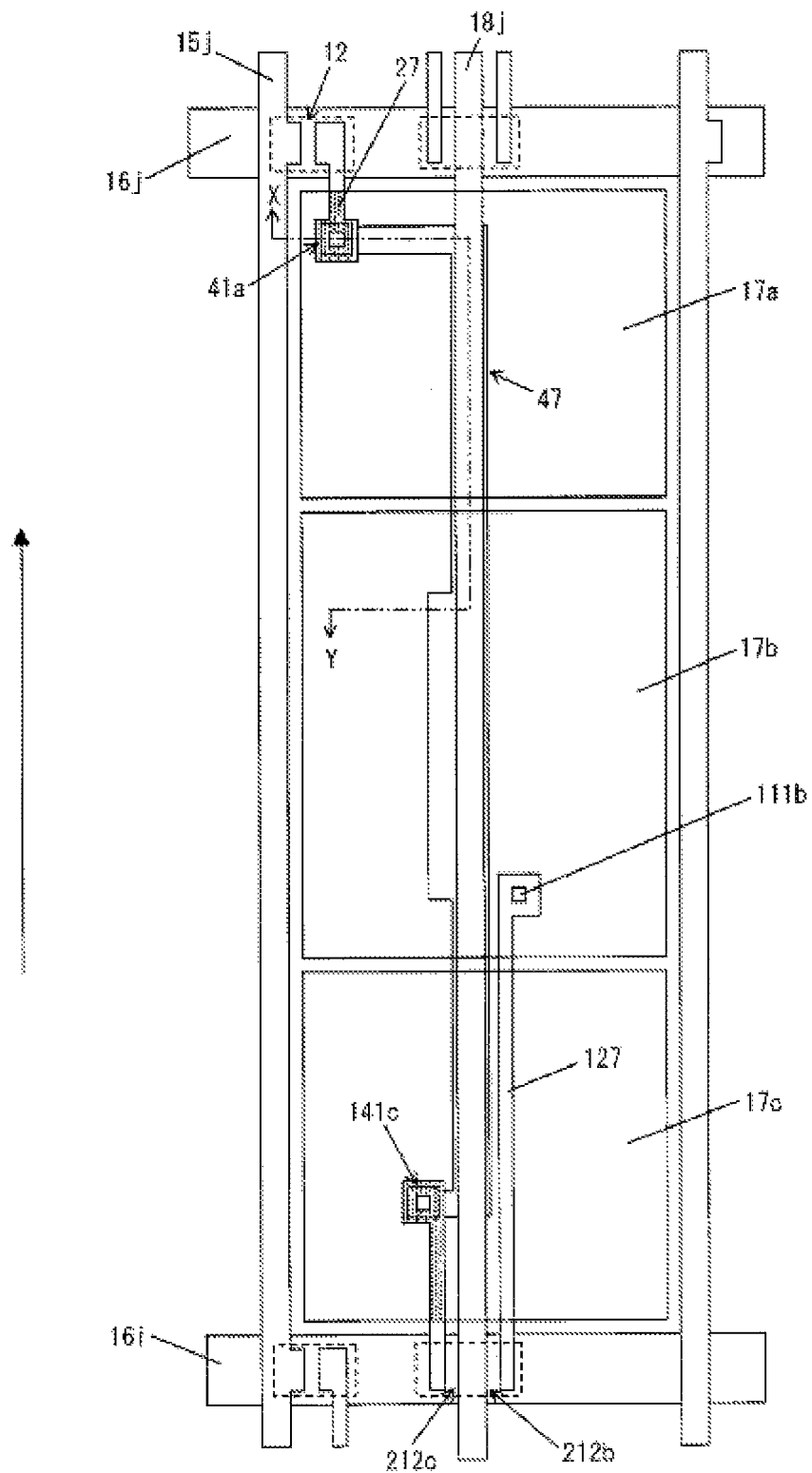
FIG. 10 is a plan view showing another modification example of the liquid crystal panel shown in FIG. 8.
Figure 11:
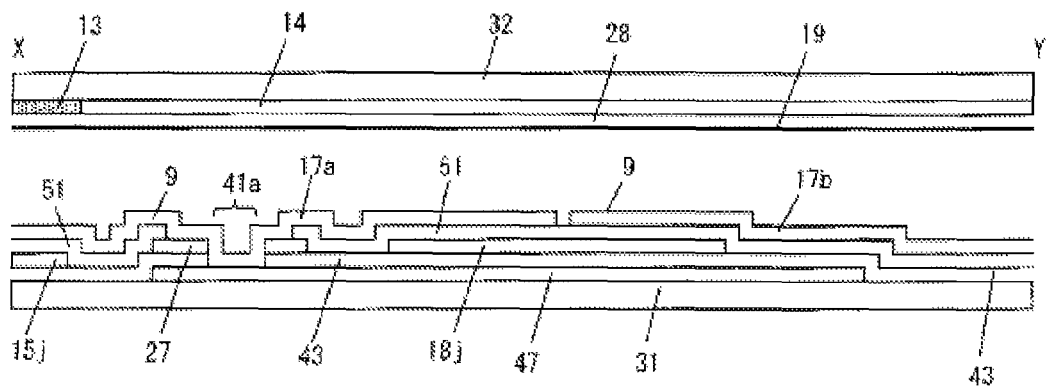
FIG. 11 is a cross-sectional arrow view showing the liquid crystal panel of FIG. 10.

As shown in FIG. 10, which illustrates a liquid crystal panel that is modified from the one in FIG. 8, and FIG. 11, which is a cross-sectional view taken along the line X-Y of FIG. 10, the contact hole 11a and the contact hole 81a can be combined to make a contact hole 41a, and the contact hole 111c and the contact hole 81c can be combined to make a contact hole 141c. For example, at the location where the contact hole 41a is formed, the interlayer insulating film 51 is removed, and the drain lead-out electrode 27 is also removed so that the entire portion that is removed overlap the central region of the removed portion of the interlayer insulating film 51. Further, the portion of the gate insulating film 43 located under the removed portion of the drain lead-out electrode 27 is removed. Because of this arrangement, the pixel electrode 17a is in contact with the drain lead-out electrode 27 and with the capacitance electrode 47. Since the alignment of the liquid crystal tends to become disturbed in proximity of the contact holes, by reducing the number of contact holes as in the configuration described above, disturbance of the liquid crystal alignment can be suppressed.

The contact hole 41a, for example, can be formed as described below. That is, by using a mixed gas of $CF_4$ and $O_2$ for etching the interlayer insulating film, the interlayer insulating film 51 is removed at the location where the contact hole 41a is formed till the surface of the drain lead-out electrode 27 (Al, for example) is exposed to stop the etching, and at the location where a portion of the drain lead-out electrode 27 is removed, the interlayer insulating film 51 and the gate insulating film 43 are removed till the surface of the capacitance electrode 47 (Al, for example) is exposed to stop the etching. Also, through this process, the gate insulating film and the interlayer insulating film located above the end portion of the scan signal line can also be removed to expose the end portion of the scan signal line (to connect the end portion of the scan signal line to an external connection terminal). For the etchant, besides the mixed gas described above, buffered hydrofluoric acid (BHF), which is a mixture of hydrofluoric acid (HF) and ammonium fluoride ($NH_4F$), can also be used.

Figure 12:
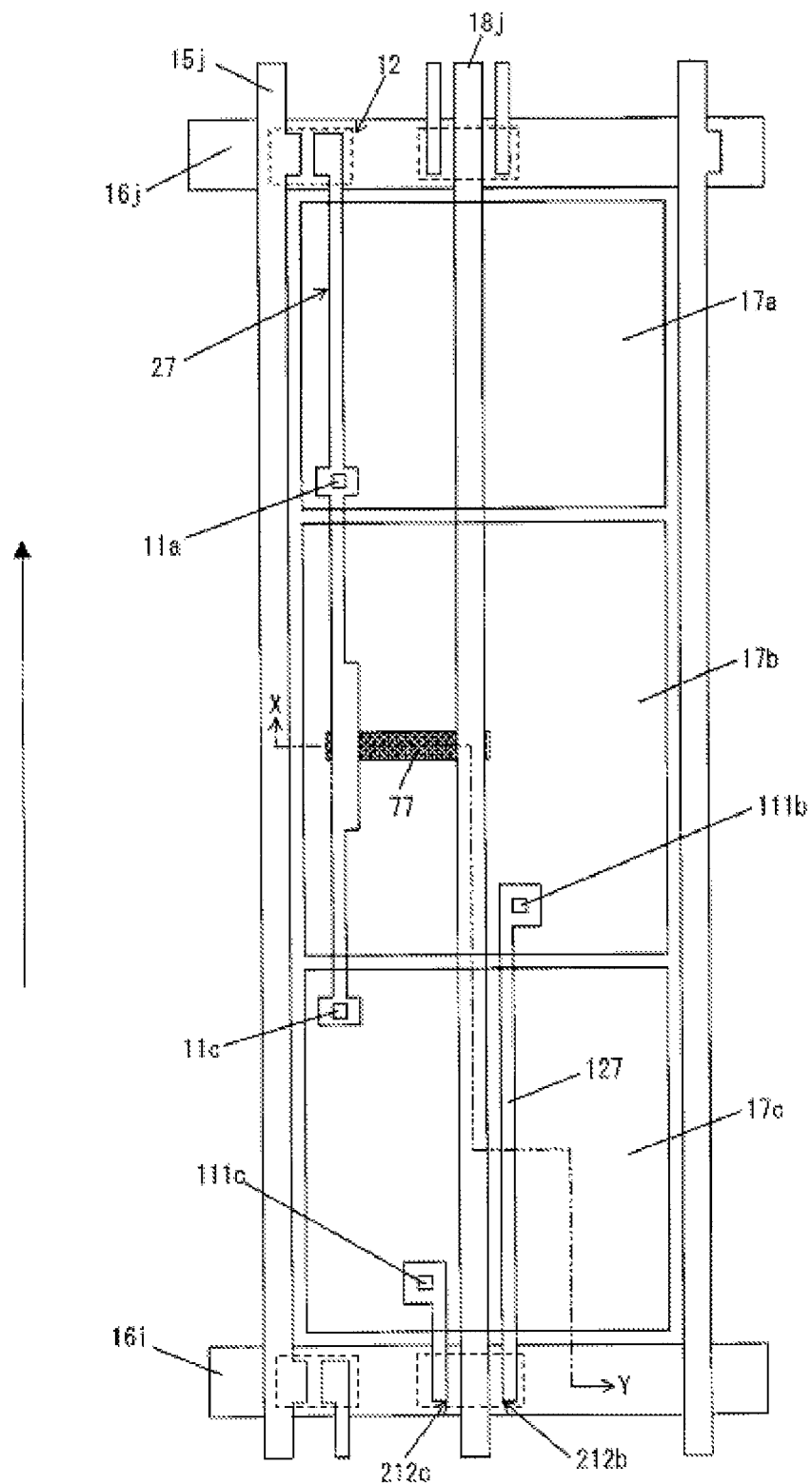
FIG. 12 is a plan view showing yet another modification example of the liquid crystal panel shown in FIG. 1.
Figure 13:
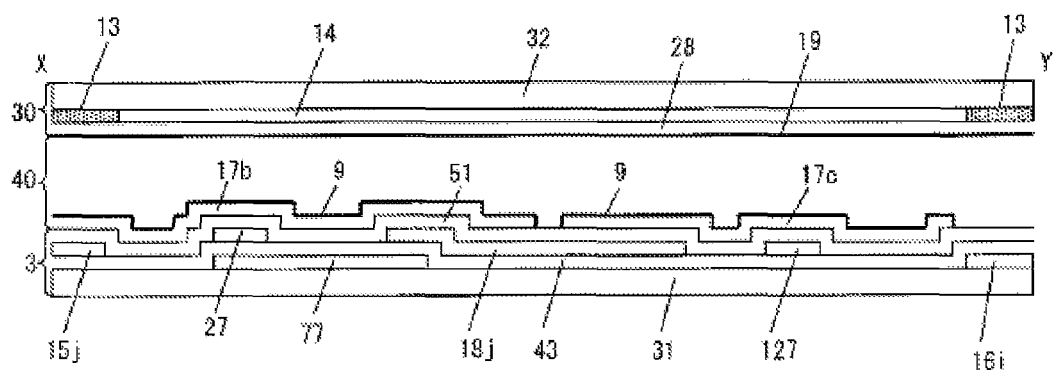
FIG. 13 is a cross-sectional arrow view showing the liquid crystal panel of FIG. 12.
Figure 14:
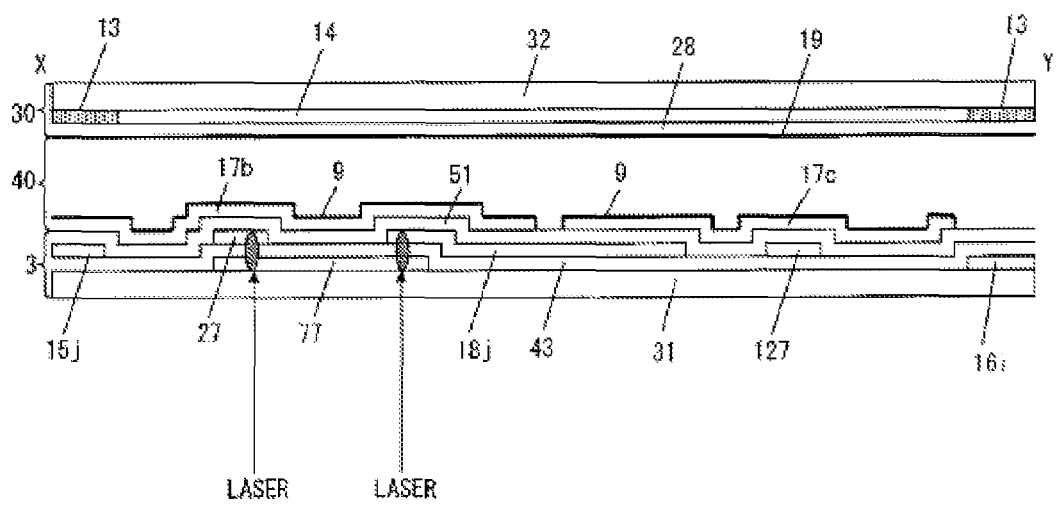
FIG. 14 is a cross-sectional view showing the repair method for the liquid crystal panel of FIGS. 12 and 13.

As shown in FIG. 12, which illustrates a liquid crystal panel that is modified from the one in FIG. 1, and FIG. 13, which is a cross-sectional view taken along the line X-Y of FIG. 12, a bridging electrode 77 that overlaps with both the drain lead-out electrode 27 and the storage capacitance wiring 18j can be provided in the same layer with the scan signal line, for use to repair the pixel if the transistor 12 becomes defective. In this configuration, if a problem, such as a short-circuit, occurs in the transistor 12, as shown in FIG. 14, the bridging electrode 77 and the drain lead-out electrode 27 are short-circuited by melting their intersecting portion, the bridging electrode 77 and the storage capacitance wiring 18j are short-circuited by melting their intersecting portion, and the drain lead-out electrode 27 is cut off between the drain electrode of the transistor 12 and the contact hole 11a. As a result, the potential of the storage capacitance wiring 18j is constantly supplied to the pixel electrodes 17a and 17c of the pixel having a defective transistor 12, and the pixel can be repaired to be a dark dot. Also, from the perspective of maintaining the aperture ratio, the bridging electrode 77 is preferably be disposed to overlap the alignment control structure (a light-shielding object, such as a linear protrusion) provided on the color filter substrate.

Figure 15:
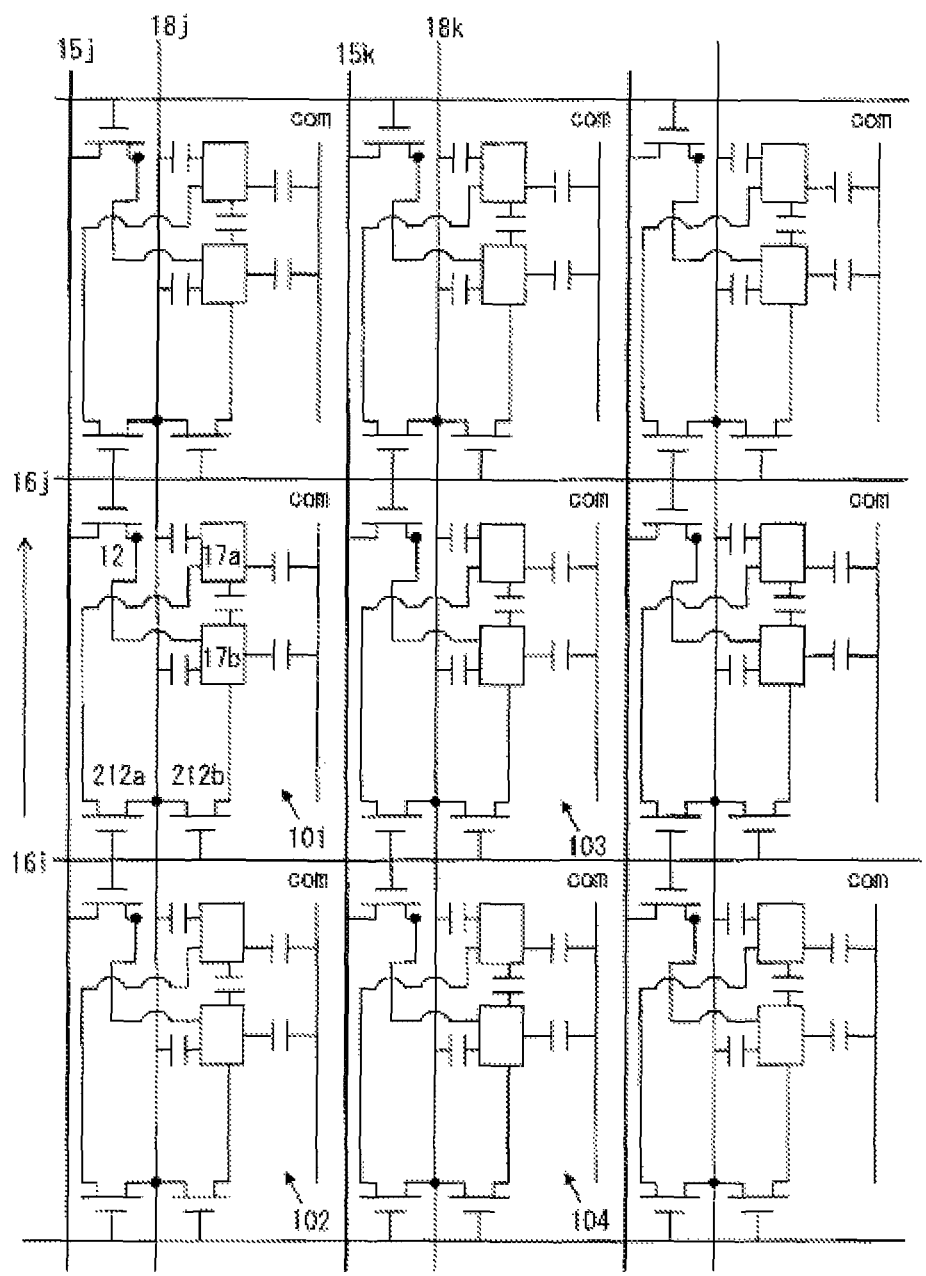
FIG. 15 is an equivalent circuit diagram showing another configuration of the present liquid crystal panel.
Figure 16:
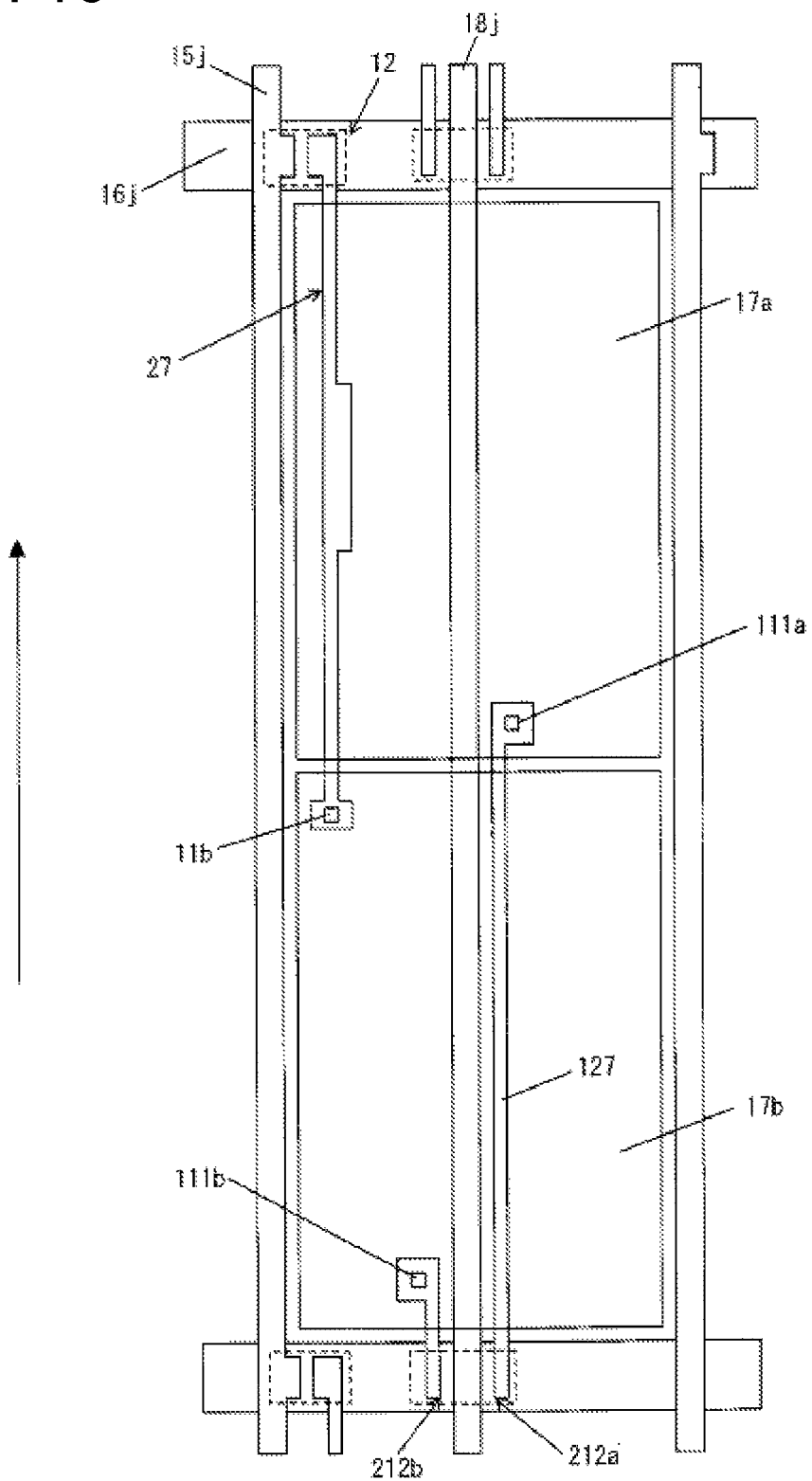
FIG. 16 is a plan view showing a configuration example of the liquid crystal panel of FIG. 15.

Although three pixel electrodes are provided for one pixel for the liquid crystal panel shown in FIG. 3, alternatively two pixel electrodes can be provided for one pixel, as shown in FIG. 15. In the liquid crystal display device equipped with the liquid crystal panel of FIG. 15, a sub-pixel that includes the pixel electrode 17a serves as a bright sub-pixel, and a sub-pixel that includes the pixel electrode 17b serves as a dark sub-pixel for the halftone display, and the display is conducted by the area gradation of the bright sub-pixels and dark sub-pixels. A specific example of pixel 101 of FIG. 15 is shown in FIG. 16. In the present liquid crystal panel, a transistor 12 is disposed near the intersecting portion of the data signal line 15j and the scan signal line 16j, and a storage capacitance wiring 18j is provided vertically across the pixel region defined by the data signal line 15j and the scan signal line 16j. The storage capacitance wiring 18j is formed in the same layer with the data signal line 15j, in parallel therewith. In the pixel region, the pixel electrode 17a (first pixel electrode) and the pixel electrode 17b (second pixel electrode) are arranged in the column direction, and the pixel electrode 17a is in proximity of the transistor 12.

The source electrode of the transistor 12 is connected to the data signal line 15j, the drain electrode is connected to the drain lead-out electrode 27, and the scan signal line 16j serves as the gate electrode of the transistor 12. The drain lead-out electrode 27 extends through under the pixel electrode 17a and arrives under the pixel electrode 17b, and is connected to the pixel electrode 17b through the contact hole 11b.

Also, the storage capacitance wiring 18j extends from above the current scan signal line 16j (where it intersects with the scan signal line 16j), continues through under the pixel electrode 17a and pixel electrode 17b, and arrives above the previous scan signal line 16i (where it intersects with the scan signal line 16i). Transistors 212a and 212b are provided near the intersecting portion of the storage capacitance wiring 18j and the scan signal line 16i. A portion of the previous scan signal line 16i functions as the gate electrodes of the transistors 212a and 212b; a portion of the storage capacitance wiring 18j functions as the common source electrode of the transistors 212a and 212b; the drain electrode of the transistor 212a is connected to the drain lead-out electrode 127; the drain electrode of the transistor 212b is connected to the pixel electrode 17b through the contact hole 111b; and the drain lead-out electrode 127 extends through under the pixel electrode 17b and arrives under the pixel electrode 17a, and is connected to the pixel electrode 17a through the contact hole 111a.

In the present liquid crystal panel, capacitances are formed at locations where the drain lead-out electrode 27 and the pixel electrode 17a overlap with each other through an interlayer insulating film, and where the drain lead-out electrode 127 and the pixel electrode 17b overlap with each other through an interlayer insulating film. The sum of the capacitances is a coupling capacitance CC (see FIG. 15). Further, a capacitance is formed at a location where the storage capacitance wiring 18j and the pixel electrode 17a overlap with each other through an interlayer insulating film. This capacitance is a storage capacitance CSa (see FIG. 15). Also, a capacitance is formed at a location where the storage capacitance wiring 18j and the pixel electrode 17b overlap through an interlayer insulating film. This capacitance is a storage capacitance CSb (see FIG. 15).

In the present liquid crystal panel, as in the case with the liquid crystal panel of FIG. 1, the aperture ratio reduction and the load increase on the scan signal line can be suppressed on the capacitance coupling type active matrix substrate equipped with transistors for discharge. Additionally, the storage capacitance between the pixel electrode and the storage capacitance wiring can be made larger without changing the aperture ratio. Also, the drain lead-out electrodes (27 and 127) can be made narrower to increase the aperture ratio, while the necessary coupling capacitance value can still be obtained. Additionally, even if a problem such as a short-circuit occurs in the transistor connected to the data signal line, the pixel can be repaired for a dark dot.

Figure 17:
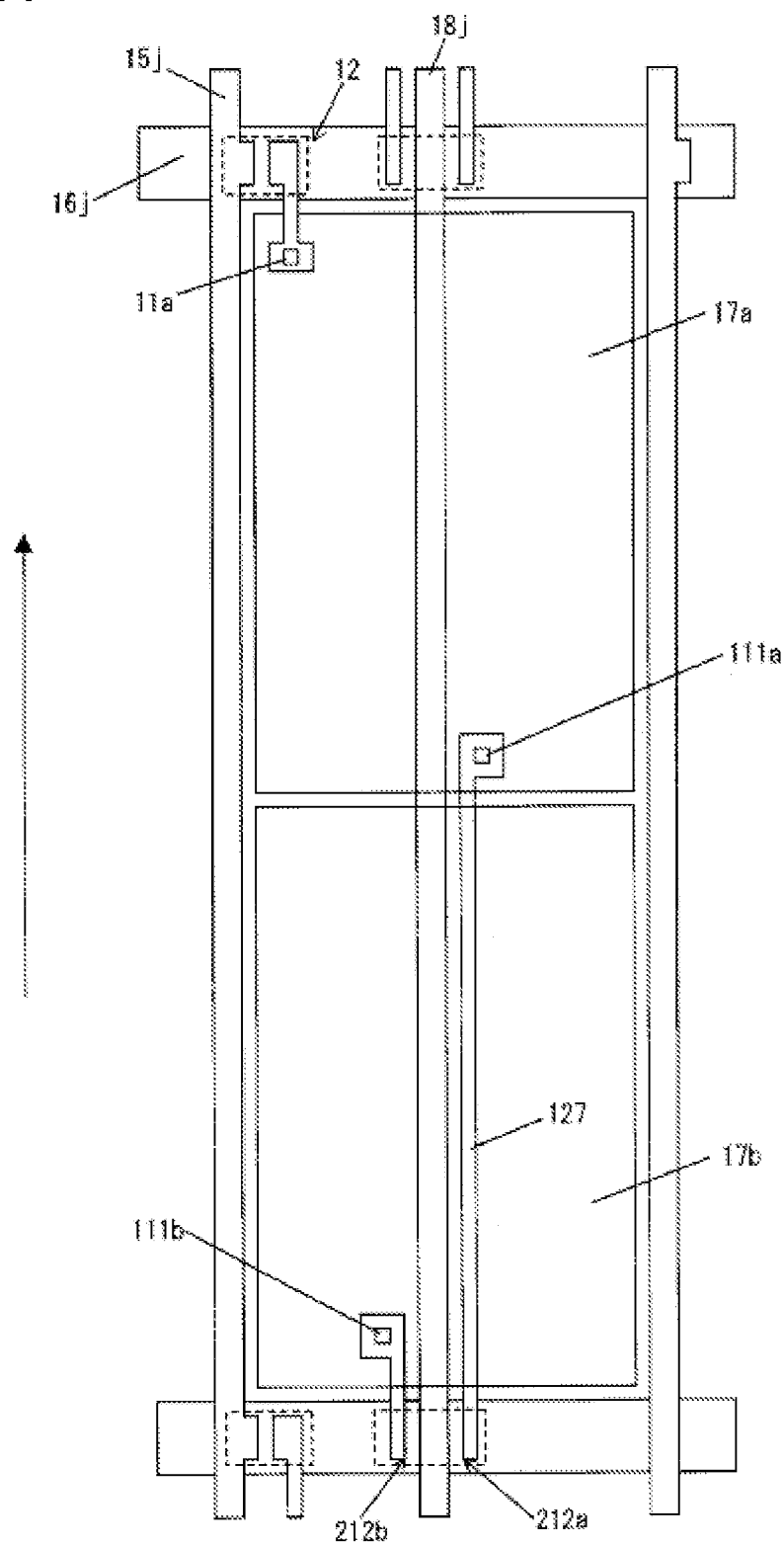
FIG. 17 is a plan view showing another configuration example of the liquid crystal panel shown in FIG. 15.

Although in the liquid crystal panel of FIG. 16, the drain lead-out electrode 27 is connected to the pixel electrode 17b (the pixel electrode distal to the current scan signal line 16j), alternatively, as shown in FIG. 17, the drain lead-out electrode 27 can also be made shorter to be connected to the pixel electrode 17a (the pixel electrode proximal to the current scan signal line 16j) through the contact hole 11a. In this case, because a coupling capacitance is formed where the drain lead-out electrode 127 and the pixel electrode 17b overlap through the interlayer insulating film, a separate coupling capacitance does not need to be formed. In the liquid crystal display device equipped with the liquid crystal panel of FIG. 17, a sub-pixel that includes the pixel electrode 17a becomes a bright sub-pixel, and a sub-pixel that includes the pixel electrode 17b becomes a dark sub-pixel for the halftone display.

Figure 18:
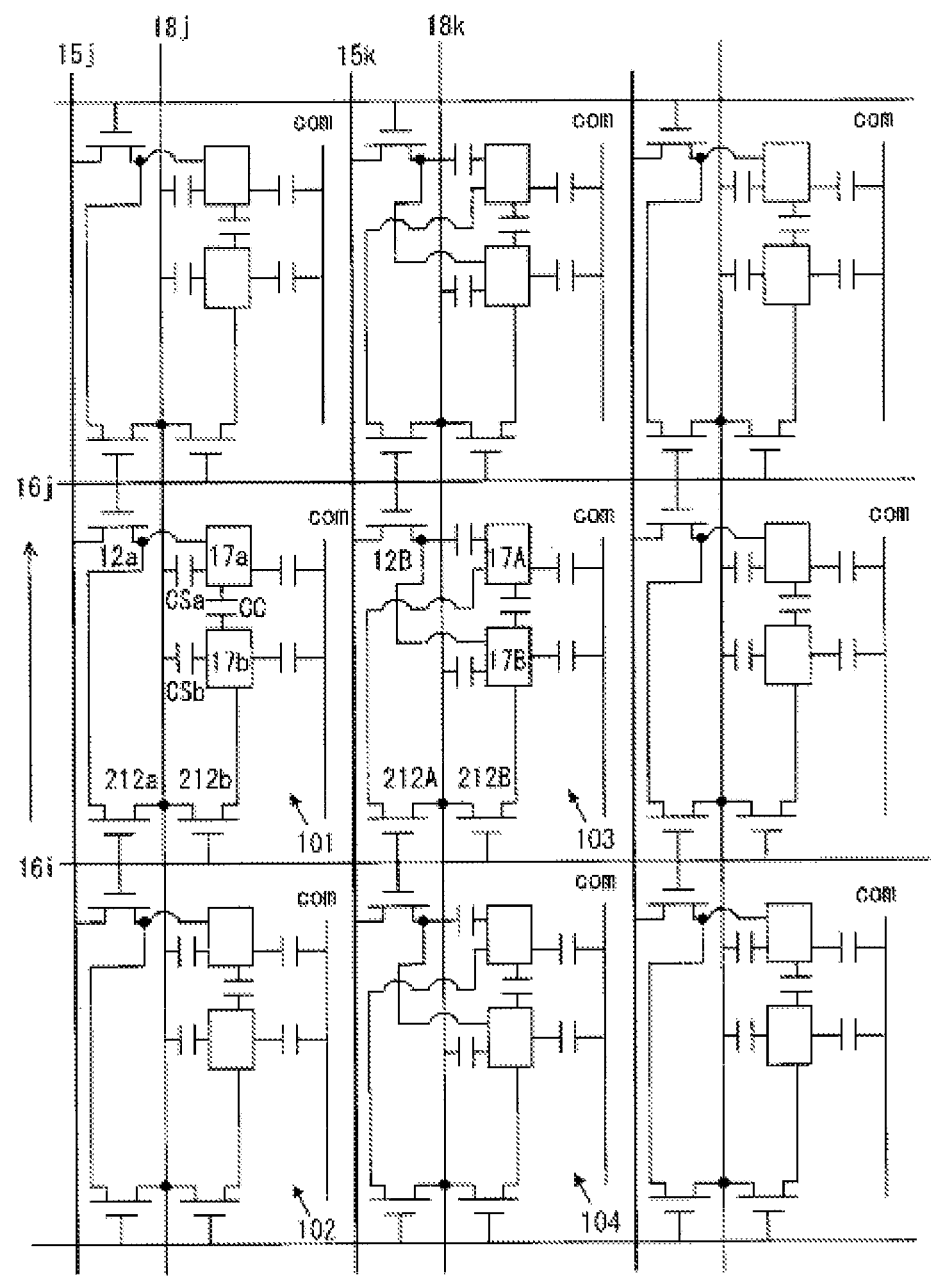
FIG. 18 is an equivalent circuit diagram showing yet another configuration of the present liquid crystal panel.
Figure 19:
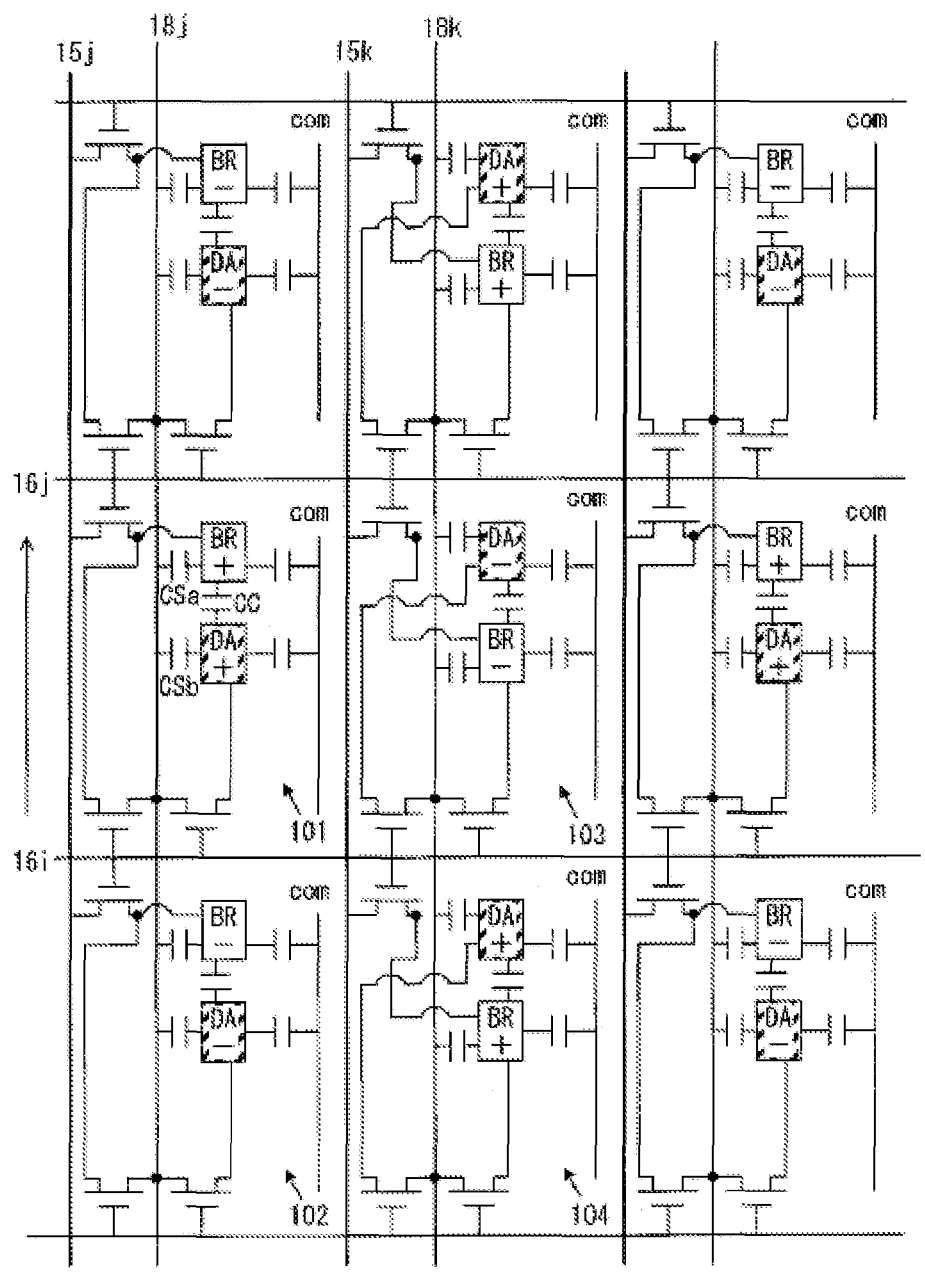
Figure 20:
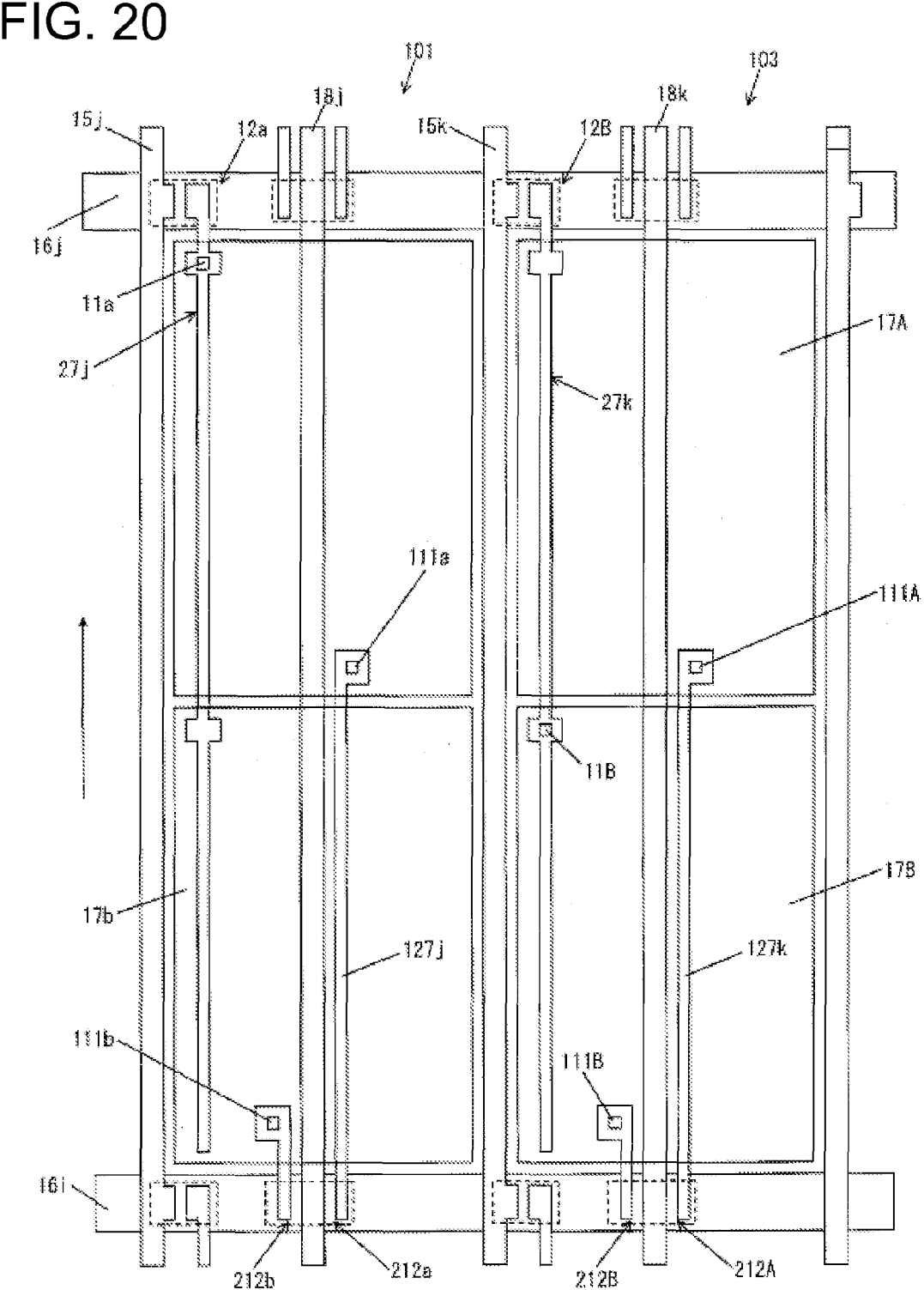
FIG. 20 is a plan view showing a configuration example of the liquid crystal panel of FIG. 18.

As shown in FIG. 18, the pixel shown in FIG. 17 and the pixel shown in FIG. 16 may be arranged alternately in the row direction (with a consistent configuration in the column direction). With this configuration, as shown in FIG. 19, bright sub-pixels and dark sub-pixels can be arranged in a checkered pattern (bright sub-pixels and dark sub-pixels are arranged alternately for both the row and column directions), which improves the display quality. In this case, as shown in FIG. 20, by arranging the drain lead-out electrode 27 in the same manner in the pixels 101 and 103 (in both pixels, the drain lead-out electrode 27 is arranged so that one end of the electrode is located near the scan signal line 16i, and the other end is located near the scan signal line 16j), which are disposed next to each other in the row direction, consistent configurations can be obtained for all the bright sub-pixels, and for all the dark sub-pixels, and the same aperture ratio can be achieved for pixels of all three colors. With this arrangement, the display quality can be improved (by suppressing the uneven chromaticity for the white display, for example).

Figure 21:
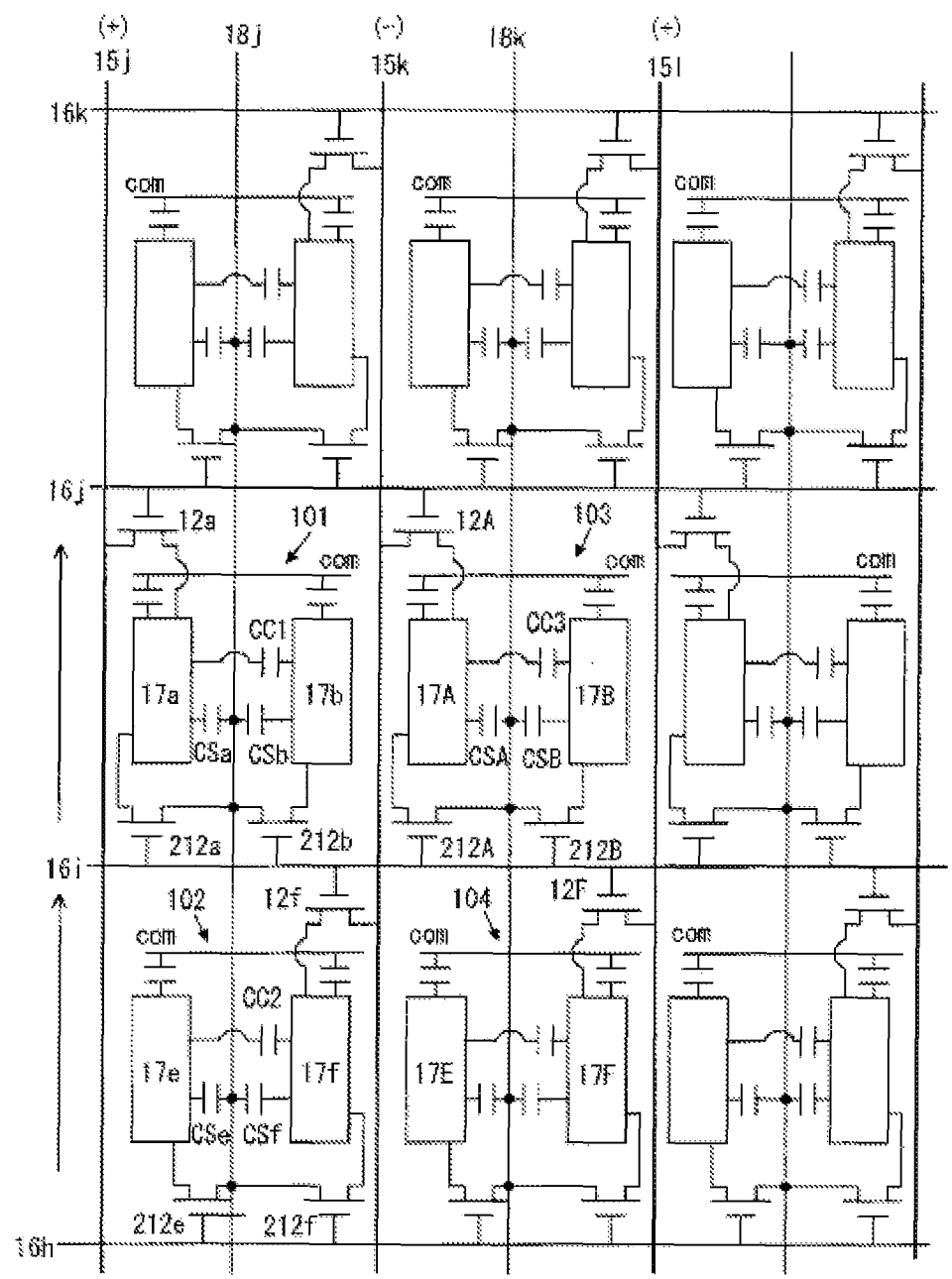
FIG. 21 is an equivalent circuit diagram showing yet another configuration of the present liquid crystal panel.

In the liquid crystal panel shown in FIGS. 1, 15, and 18, pixel electrodes of respective pixels are arranged in the column direction, and the pixels in the same column are connected to the same data signal line, but the configuration is not limited to this. As shown in FIG. 21, for example, pixel electrodes in each pixel can be arranged in the row direction so that odd-numbered pixels within a column are connected to one of the adjacent two data signal lines, and even-numbered pixels are connected to the other of the two data signal lines.

For example, in pixel 101, which is interposed between the data signal lines 15j and 15k, the pixel electrode 17a is arranged close to the data signal line 15j, and the pixel electrode 17b is arranged close to the data signal line 15k; the pixel electrode 17a is connected to the data signal line 15j through the transistor 12a connected to the scan signal line 16j; the pixel electrode 17a and the pixel electrode 17b are connected together through the coupling capacitance CC1; the transistors 212a and 212b for discharge are connected to the scan signal line 16i, which is scanned immediately before the scan signal line 16j; the pixel electrode 17a and the storage capacitance wiring 18j are connected together through the transistor 212a; and the pixel electrode 17b and the storage capacitance wiring 18j are connected together through the transistor 212b.

In pixel 102, which is disposed adjacent to the pixel 101 in the column direction, the pixel electrode 17e is arranged close to the data signal line 15j, and the pixel electrode 17f is arranged close to data signal line 15k; pixel electrode 17f is connected to the data signal line 15k through the transistor 12f connected to the scan signal line 16i; the pixel electrode 17f and the pixel electrode 17e are connected together through the coupling capacitance CC2; the transistors 212e and 212f for discharge are connected to the scan signal line 16h, which is scanned immediately before the scan signal line 16i; the pixel electrode 17e and the storage capacitance wiring 18j are connected together through the transistor 212e; and the pixel electrode 17f and the storage capacitance wiring 18j are connected together through the transistor 212f.

In pixel 103, which is interposed between the data signal lines 15k and 15l, the pixel electrode 17A is arranged close to the data signal line 15k, and the pixel electrode 17B is arranged close to the data signal line 15l; pixel electrode 17A is connected to the data signal line 15k through the transistor 12A connected to the scan signal line 16j; the pixel electrode 17A and the pixel electrode 17B are connected together through the coupling capacitance CC3; the transistors 212A and 212B for discharge are connected to the scan signal line 16i, which is scanned immediately before the scan signal line 16j; the pixel electrode 17A and the storage capacitance wiring 18k are connected together through the transistor 212A; and the pixel electrode 17B and the storage capacitance wiring 18k are connected together through the transistor 212B.

Figure 22:
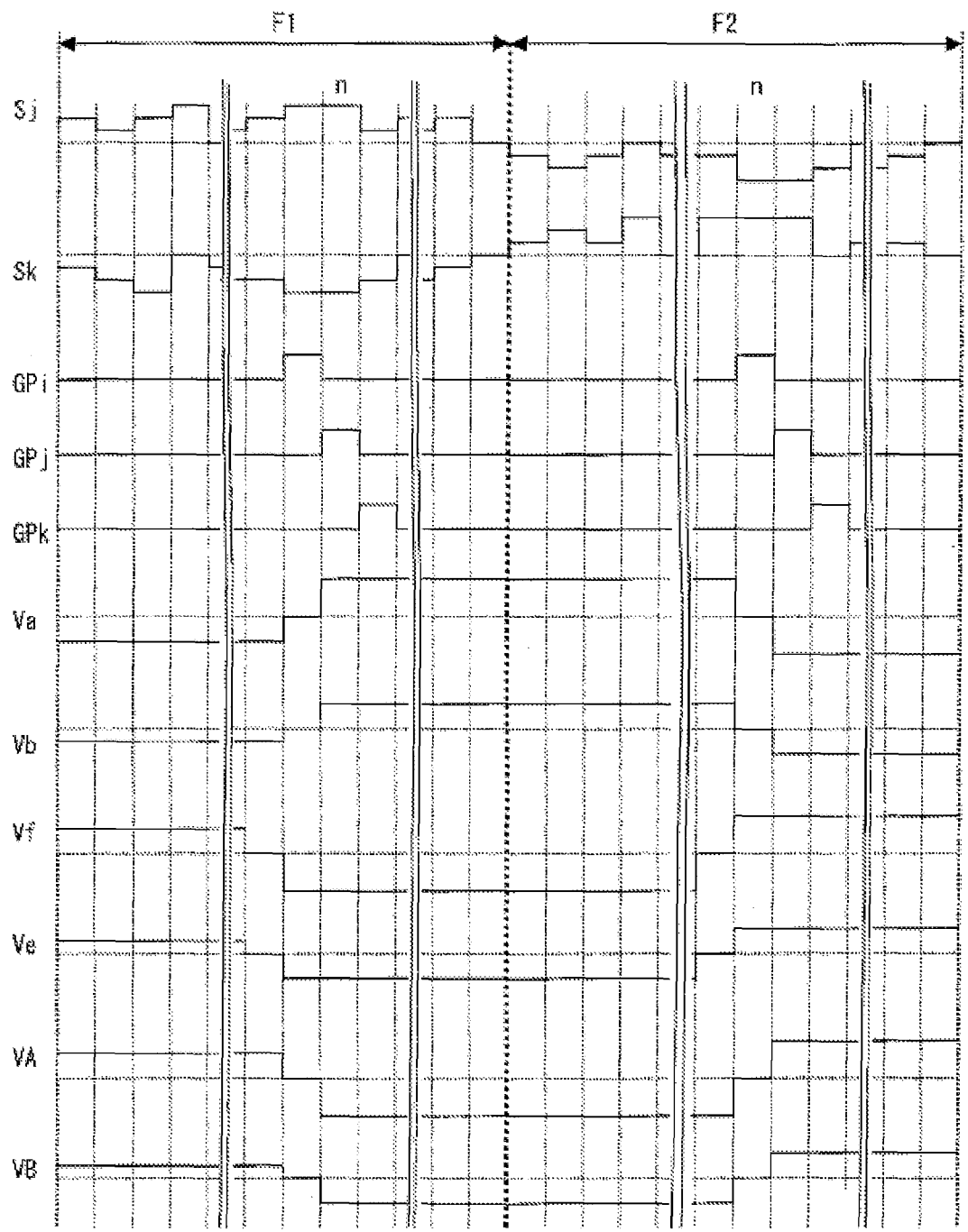
FIG. 22 is a timing chart showing the driving method for a liquid crystal display device equipped with the liquid crystal panel of FIG. 21.

FIG. 22 is a timing chart showing the method for driving the liquid crystal display device (normally black mode). "Sj" and "Sk" denote signal potentials supplied to the data signal lines 15j and 15k, respectively; "GPi" and "GPj" denote gate-on pulse signals supplied to the scan signal lines 16i and 16j, respectively; "Va" denotes the potential of the pixel electrode 17a; "Vb" denotes the potential of the pixel electrode 17b; "Ve" denotes the potential of the pixel electrode 17e; "Vf" denotes the potential of the pixel electrode 17f; "VA" denotes the potential of the pixel electrode 17A; and "VB" denotes the potential of the pixel electrode 17B.

In this driving method, as shown in FIG. 22, scan signal lines are selected sequentially, the polarity of the signal potential supplied to the data signal lines is reversed for every one vertical scan period (1V), and signal potentials of opposite polarities are supplied to two adjacent data signal lines.

Figure 23:
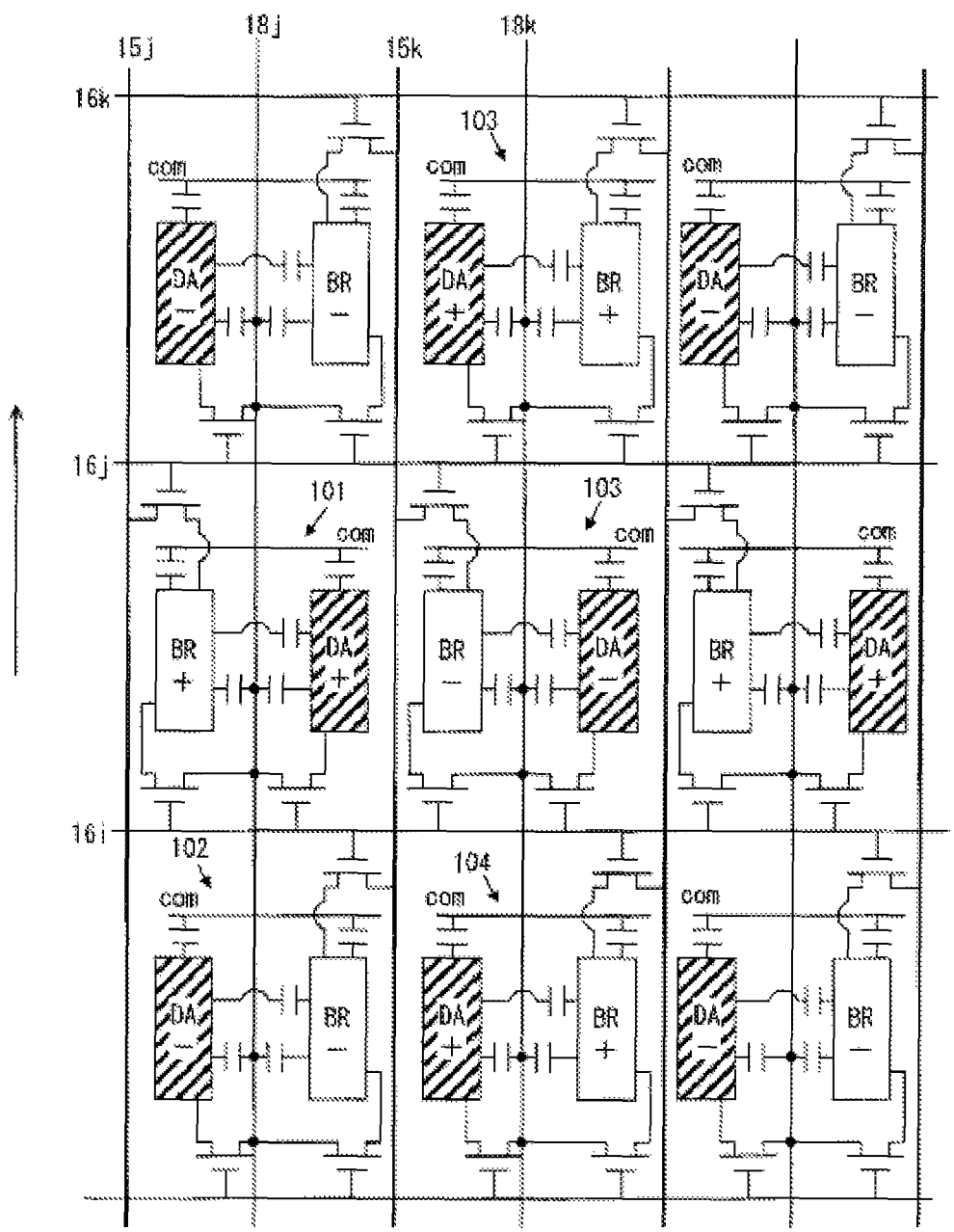

Specifically, in frame F1 out of consecutive frames F1 and F2, scan signal lines are sequentially selected, and to the data signal line 15j, a signal potential of positive polarity is supplied during the $(n-1)^{th}$ horizontal scan period (including the scan period of scan signal line 16i), and a signal potential of positive polarity is supplied also during the $n^{th}$ horizontal scan period (including the scan period of scan signal line 16j), and to the data signal line 15k, a signal potential of negative polarity is supplied during the $(n-1)^{th}$ horizontal scan period, and a signal potential of negative polarity is supplied also during the $n^{th}$ horizontal scan period. With this timing, as shown in FIG. 22, at the end of the $(n-1)^{th}$ horizontal scan period, relations of Va=Vb=VA=VB=Vcom (the potential of the respective storage capacitance wirings 18j and 18k) and |Vf|≥|Ve| are satisfied, and at the end of the $n^{th}$ horizontal scan period, relations of |Va|≥|Vb| and |VA|≥|VB| are satisfied. As shown in FIG. 23, a sub-pixel that includes the pixel electrode 17a (positive polarity) becomes a bright sub-pixel (BR), a sub-pixel that includes the pixel electrode 17b (positive polarity) becomes a dark sub-pixel (DA), a sub-pixel that includes the pixel electrode 17A (negative polarity) becomes a bright sub-pixel (BR), a sub-pixel that includes the pixel electrode 17B (negative polarity) becomes a dark pixel (DA), a sub-pixel that includes the pixel electrode 17e (negative polarity) becomes a dark sub-pixel (BR), and a sub-pixel that includes the pixel electrode 17f (negative polarity) becomes a bright sub-pixel (DA).

Also, in frame F2, scan signal lines are sequentially selected, and to the data signal line 15j, a signal potential of negative polarity is supplied during the $(n-1)^{th}$ horizontal scan period (including the scan period of the scan signal line 16$i$), and a signal potential of negative polarity is supplied during the n$^{th}$ horizontal scan period (including the scan period of the scan signal line 16$j$), and to data signal line 15$k$, a signal potential of positive polarity is supplied during the (n−1)$^{th}$ horizontal scan period (including the scan period of the scan signal line 16$i$), and a signal potential of positive polarity is supplied also during the n$^{th}$ horizontal scan period. With this timing, as shown in FIG. 22, at the end of the (n−1)$^{th}$ horizontal scan period, relations of Va=Vb=VA=VB=Vcom (the potential of the storage capacitance wirings 18$j$ and 18$k$) and |Vf|≥|Ve| are satisfied, and at the end of the n$^{th}$ horizontal scan period, relations of |Va|≥|Vb| and |VA|≥|VB| are satisfied. A sub-pixel that includes the pixel electrode 17$a$ (negative polarity) becomes a bright sub-pixel (BR), a sub-pixel that includes the pixel electrode 17$b$ (negative polarity) becomes a dark sub-pixel (DA), a sub-pixel that includes the pixel electrode 17A (positive polarity) becomes a bright sub-pixel (BR), a sub-pixel that includes the pixel electrode 17B (positive polarity) becomes a dark sub-pixel (DA), a sub-pixel that includes the pixel electrode 17$e$ (positive polarity) becomes a dark sub-pixel (BR), and a sub-pixel that includes the pixel electrode 17$f$ (positive polarity) becomes a bright sub-pixel (DA).

According to the configuration described above, display can be conducted by the area gradation of the bright sub-pixels and the dark sub-pixels arranged in the row direction, and therefore the view angle characteristics of the liquid crystal display device can be improved. Also, because the two pixel electrodes of a pixel can be discharged (to the storage capacitance wiring) immediately before (1H prior) the data signal potential is written on the pixel, burn-in of the sub-pixel that includes a pixel electrode which will be floating can be suppressed, and variation of the pixel charge rate according to the data signal potentials written on the previous frame can also be minimized.

Further, as shown in FIG. 23, while the data signal lines are driven by the V-line inversion drive (signal potentials of the same polarity are supplied to a particular data signal line during one vertical scan period), the polarity distribution of the signal potential written on pixels can be that of the dot-inversion. As a result, power consumption is suppressed and flickering is reduced. Further, because bright sub-pixels and dark sub-pixels are arranged in a checkered pattern, (bright sub-pixels and dark sub-pixels are arranged alternately for both the row and column directions), uneven streaks, which can be generated by columns composed of bright pixels, are suppressed, and clear displays can be achieved.

Figure 24:
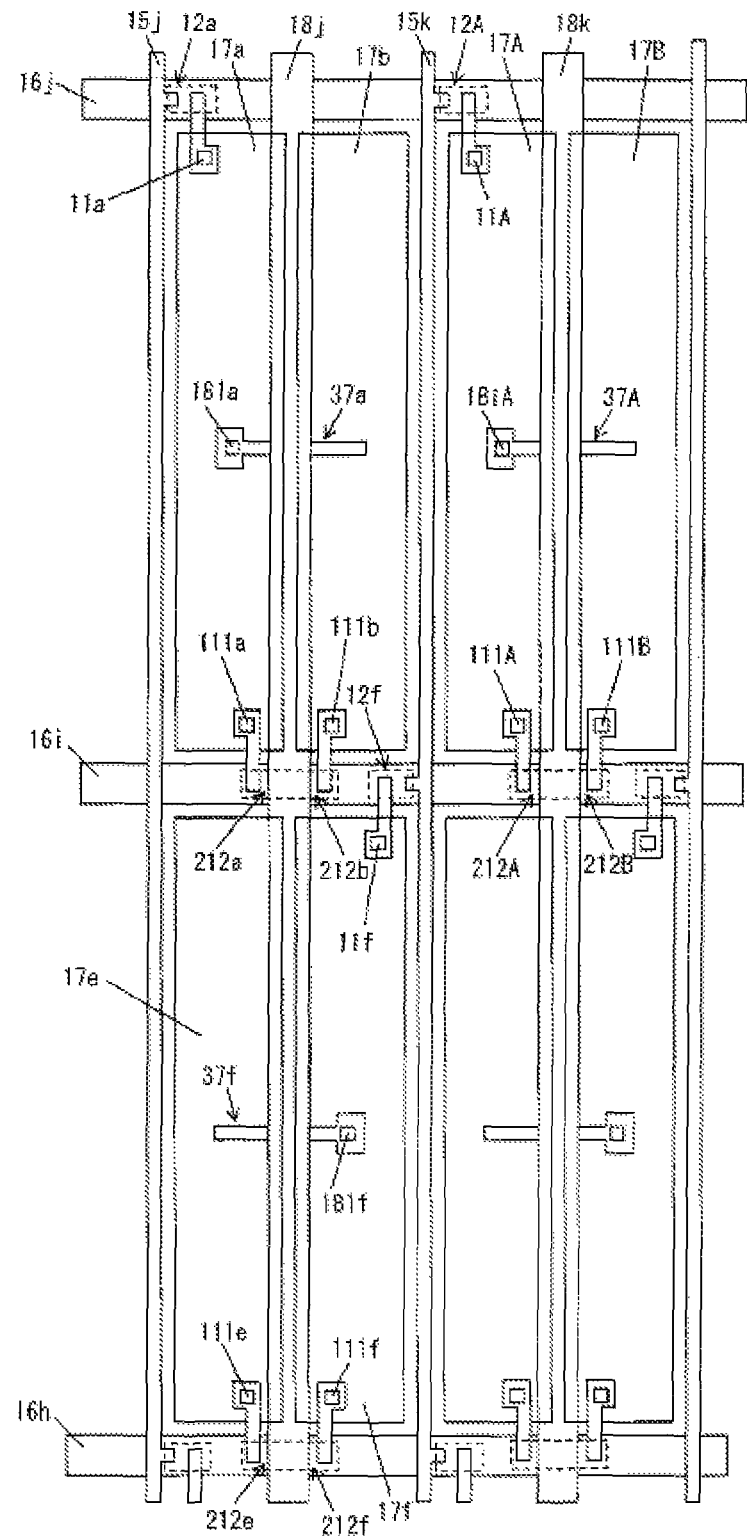
FIG. 24 is a plan view showing a configuration example of the liquid crystal panel of FIG. 21.

Specific examples of pixels 101 to 104 of FIG. 21 are shown in FIG. 24. In FIG. 24, members of the color filter substrate (opposite substrate) are omitted, and only members of the active matrix substrate are illustrated for simplicity.

In pixel 101, a transistor 12$a$ is disposed near the intersecting portion of the data signal line 15$j$ and scan signal line 16$j$, and a storage capacitance wiring 18$j$ is provided vertically across the pixel region defined by the data signal lines 15$j$ and 15$k$ and the scan signal line 16$j$. The storage capacitance wiring 18$j$ is formed in the same layer with the data signal line 15$j$, in parallel therewith. In the aforementioned pixel region, the pixel electrode 17$a$ and the pixel electrode 17$b$ are arranged in the row direction so that the pixel electrode 17$a$ is disposed close to the transistor 12$a$, and the respective pixel electrodes overlap with the storage capacitance wiring 18$j$.

Also, the source electrode of the transistor 12$a$ is connected to the data signal line 15$j$, and the drain electrode is connected to the pixel electrode 17$a$, and the scan signal line 16$j$ serves as the gate electrode of the transistor 12$a$. Further, the pixel electrode 17$a$ is connected to the capacitance electrode 37$a$ extending in the row direction through the contact hole 181$a$. The capacitance electrode 37$a$ is formed in the same layer with the scan signal line, and extends from under the pixel electrode 17$a$, crosses under the storage capacitance wiring 18$j$, and arrives under the pixel electrode 17$b$.

Also, the storage capacitance wiring 18$j$ extends from above the current scan signal line 16$j$ (where it intersects with the scan signal line 16$j$), continues through under the edges of the pixel electrode 17$a$ and the pixel electrode 17$b$, and arrives above the previous scan signal line 16$i$ (where it intersects with the scan signal line 16$i$). Transistors 212$a$ and 212$b$ are provided in proximity of the intersecting portion of the storage capacitance wiring 18$j$ and the scan signal line 16$i$. A portion of the previous scan signal line 16$i$ functions as gate electrodes of the transistors 212$a$ and 212$b$; a portion of the storage capacitance wiring 18$j$ functions as the common source electrode for the transistors 212$a$ and 212$b$; the drain electrode of the transistor 212$a$ is connected to the pixel electrode 17$b$ through the contact hole 111$a$; and the drain electrode of the transistor 212$b$ is connected to the pixel electrode 17$b$ through the contact hole 111$b$.

With this configuration, in pixel 101, a capacitance is formed at a location where the capacitance electrode 37$a$ and the pixel electrode 17$b$ overlap through the gate insulating film and the interlayer insulating film only (the overlapping portion of the capacitance electrode 37$a$ and the pixel electrode 17$b$ minus the overlapping portion of the capacitance electrode 37$a$, pixel electrode 17$b$, and the storage capacitance wiring 18$j$). This capacitance is a coupling capacitance CC1 (see FIG. 21). Further, capacitances are formed at locations where the storage capacitance wiring 18$j$ and the pixel electrode 17$a$ overlap through an interlayer insulating film, and where the storage capacitance wiring 18$j$ and the capacitance electrode 37$a$ overlap through a gate insulating film. The sum of these capacitances is a storage capacitance CSa (see FIG. 21). Also, a capacitance is formed at a location where the storage capacitance wiring 18$j$ and the pixel electrode 17$b$ overlap through an interlayer insulating film. This capacitance is a storage capacitance CSb (see FIG. 21).

In pixel 102, a transistor 12$f$ is disposed near the intersecting portion of the data signal line 15$k$, which is adjacent to the data signal line 15$j$, and the scan signal line 16$i$, and the storage capacitance wiring 18$j$ is disposed vertically across the pixel region defined by the data signal lines 15$i$ and 15$k$ and the scan signal line 16$i$. The storage capacitance wiring 18$j$ is formed in the same layer with the data signal line 15$k$, in parallel therewith. In the aforementioned pixel region, the pixel electrode 17$e$ and the pixel electrode 17$f$ are arranged in the row direction so that the pixel electrode 17$f$ is in proximity of the transistor 12$f$, and the respective pixel electrodes overlap the storage capacitance wiring 18$j$.

The source electrode of the transistor 12$f$ is connected to the data signal line 15$k$, and the drain electrode is connected to the pixel electrode 17$f$. The scan signal line 16$i$ serves as the gate electrode of the transistor 12$f$. Further, the pixel electrode 17$f$ is connected to capacitance electrode 37$f$ extending to the row direction through a contact hole 181$f$. The capacitance electrode 37$f$ is formed in the same layer with the scan signal line, and extends from under the pixel electrode 17$f$, crosses under the storage capacitance wiring 18$j$, and arrives under the pixel electrode 17$e$.

The storage capacitance wiring 18$j$ extends from above the current scan signal line 16$i$ (where it intersects with the scan signal line 16$i$), continues through under the edges of the pixel electrode 17$e$ and pixel electrode 17$f$, and arrives above the previous scan signal line 16$h$ (where it intersects with the scan signal line 16$h$). Transistors 212$e$ and 212$f$ are disposed near the intersecting portion of the storage capacitance wiring 18*j* and scan signal line 16*h*. A portion of the previous scan signal line 16*h* functions as the gate electrodes of the transistors 212*e* and 212*f*; a portion of the storage capacitance wiring 18*j* functions as the common source electrode of the transistors 212*e* and 212*f*; the drain electrode of the transistor 212*e* is connected to the pixel electrode 17*e* through a contact hole 111*e*; and the drain electrode of the transistor 212*f* is connected to the pixel electrode 17*f* through a contact hole 111*f*.

With this configuration, in pixel 102, a capacitance is formed at a location where the capacitance electrode 37*f* and the pixel electrode 17*e* overlap through the gate insulating film and the interlayer insulating film. This capacitance is a coupling capacitance CC2 (see FIG. 21). Further, capacitances are formed at locations where the storage capacitance wiring 18*j* and the pixel electrode 17*f* overlap through the interlayer insulating film, and where the storage capacitance wiring 18*j* and capacitance electrode 37*f* overlap through the gate insulating film. The sum of these capacitances is a storage capacitance CSf (see FIG. 21). Also, a capacitance is formed at a location where the storage capacitance wiring 18*j* and the pixel electrode 17*e* overlap through the interlayer insulating film. This capacitance is a storage capacitance CSe (see FIG. 21).

In pixel 103, the transistor 12A is disposed near the intersecting portion of the data signal line 15*k* and the scan signal line 16*j*, and the storage capacitance wiring 18*k* is provided vertically across the pixel region defined by the data signal lines 15*k* and 15*l* and the scan signal line 16*j*. The storage capacitance wiring 18*k* is formed in the same layer with the data signal line 15*k*, in parallel therewith. In the aforementioned pixel region, the pixel electrode 17A and the pixel electrode 17B are arranged in the row direction so that the pixel electrode 17A is in proximity of the transistor 12A, and the respective pixel electrodes overlap the storage capacitance wiring 18*k*.

The source electrode of the transistor 12A is connected to the data signal line 15*k*, and the drain electrode is connected to the pixel electrode 17A. The scan signal line 16*j* serves as the gate electrode of the transistor 12A. Further, the pixel electrode 17A is connected to the capacitance electrode 37A extending in the row direction through the contact hole 181A. The capacitance electrode 37A is formed in the same layer with the scan signal line, and extends from under the pixel electrode 17A, crosses under the storage capacitance wiring 18*k*, and arrives under the pixel electrode 17B.

The storage capacitance wiring 18*k* extends from above the current scan signal line 16*j* (where it intersects with the scan signal line 16*j*), crosses under the edges of the pixel electrode 17A and pixel electrode 17B, and arrives above the previous scan signal line 16*i* (where it intersects with the scan signal line 16*i*). Transistors 212A and 212B are disposed near the intersecting portion of the storage capacitance wiring 18*k* and scan signal line 16*i*. A portion of the previous scan signal line 16*i* functions as the gate electrodes of the transistors 212A and 212B; a portion of the storage capacitance wiring 18*k* functions as the common source electrode of the transistors 212A and 212B; the drain electrode of the transistor 212A is connected to the pixel electrode 17A through a contact hole 111A; the drain electrode of the transistor 212B is connected to the pixel electrode 17B through a contact hole 111B.

With this configuration, in pixel 103, a capacitance is formed at a location where the capacitance electrode 37A and the pixel electrode 17B overlap through the gate insulating film and the interlayer insulating film. This capacitance is a coupling capacitance CC3 (see FIG. 21). Further, capacitances are formed at locations where the storage capacitance wiring 18*j* and the pixel electrode 17A overlap through the interlayer insulating film, and where the storage capacitance wiring 18*j* and the storage electrode 37A overlap through the gate insulating film. The sum of these capacitances is a storage capacitance CSA (see FIG. 21). Also, a capacitance is formed at a location where the storage capacitance wiring 18*j* and the pixel electrode 17B overlap through the interlayer insulating film. This capacitance is a storage capacitance CSB (see FIG. 21).

In the present liquid crystal panel, as in the case with the liquid crystal panel of FIG. 1, the aperture ratio reduction and the load increase on the scan signal line can be suppressed on the capacitance coupling type active matrix substrate equipped with transistors for discharge. Also, the storage capacitances between the pixel electrodes and storage capacitance wirings can be improved without changing the aperture ratio. If the liquid crystal panel of FIG. 24 is in the VA (vertical alignment) TN mode, a capacitance electrode (37*a* or the like) may be arranged at dark lines.

Figure 25:
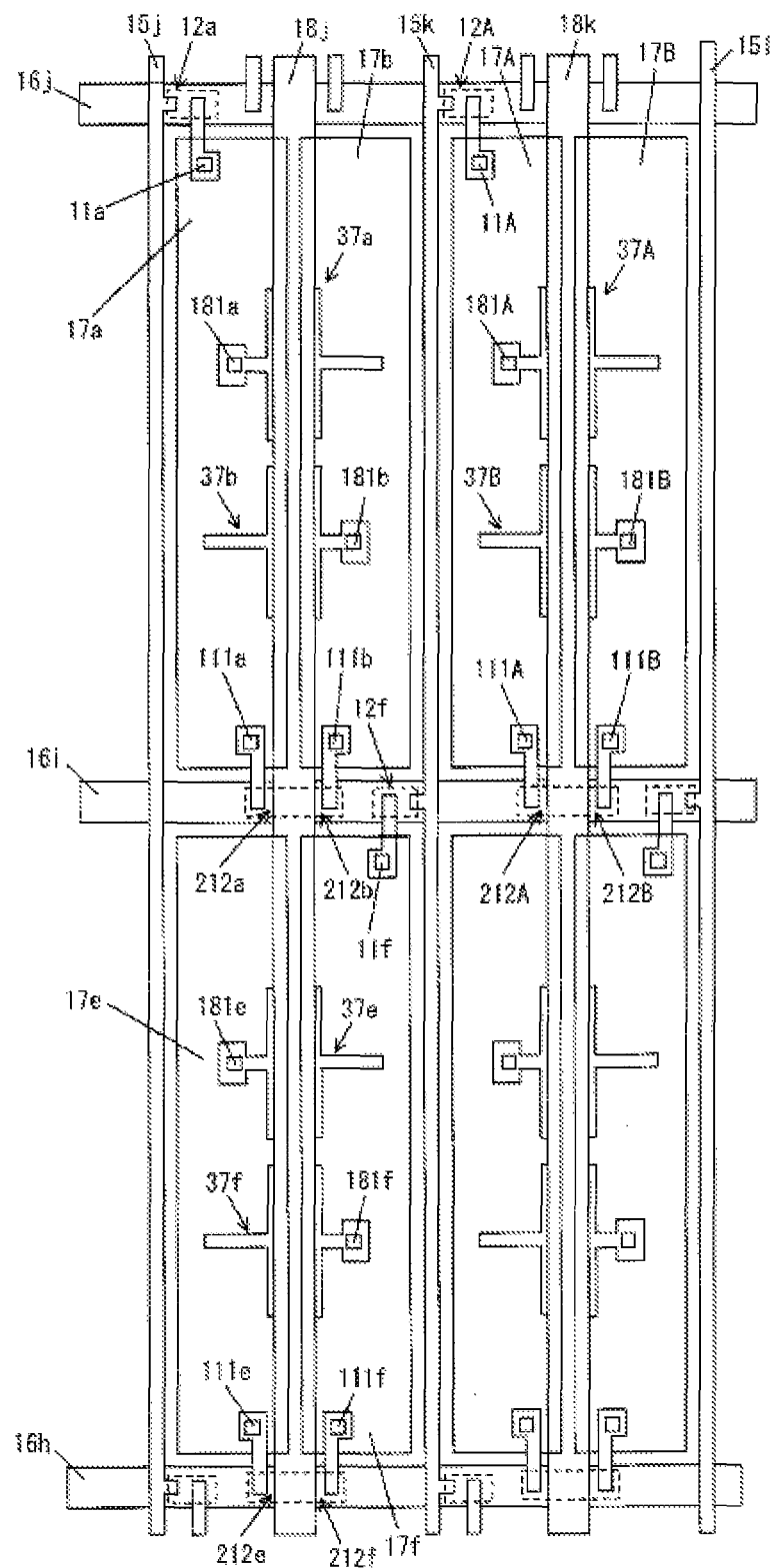
FIG. 25 is a plan view showing another configuration example of the liquid crystal panel shown in FIG. 21.

The liquid crystal panel of FIG. 24 may be modified to be the one shown in FIG. 25, where two capacitance electrodes are arranged for each pixel symmetrically with respect to a point. For example, in pixel 101, the pixel electrode 17*a* is connected to a capacitance electrode 37*a* formed in the same layer with the scan signal line through the contact hole 181*a*, and the capacitance electrode 37*a* extends from under the pixel electrode 17*a* in the row direction, extends sideways under the storage capacitance wiring 18*j*, and further extends in the row direction to arrive under the pixel electrode 17*b*. The pixel electrode 17*b* is connected to a capacitance electrode 37*b* formed in the same layer with the scan signal line through the contact hole 181*b*. The capacitance electrode 37*b* extends from under the pixel electrode 17*b* in the row direction, extends sideways under the storage capacitance wiring 18*j*, and further extends in the row direction to arrive under the pixel electrode 17*a*.

With this configuration, in pixel 101, capacitances are formed at locations where the capacitance electrode 37*a* and the pixel electrode 17*b* overlap through the gate insulating film and the interlayer insulating film, and where the capacitance electrode 37*b* and the pixel electrode 17*a* overlap through the gate insulating film and the interlayer insulating film. The sum of these capacitances is a coupling capacitance CC1 (see FIG. 21). Further, capacitance are formed at locations where the storage capacitance wiring 18*j* and pixel electrode 17*a* overlap through the interlayer insulating film, and where the storage capacitance wiring 18*j* and the capacitance electrode 37*a* overlap through the gate insulating film. The sum of these capacitances is a storage capacitance CSa (see FIG. 21). Also, capacitances are formed at locations where the storage capacitance wiring 18*j* and the pixel electrode 17*b* overlap through the interlayer insulating film, and where the storage capacitance wiring 18*j* and the capacitance electrode 37*b* overlap through the gate insulating film. The sum of these capacitances is a storage capacitance CSb (see FIG. 21).

According to the aforementioned configuration, because coupling capacitances are formed at two locations, the value of the coupling capacitance CC1 can be made larger. Also, even if problems such as poor contacts at the contact hole 181*a* and broken wires in the capacitance electrode 37*a* occur, bright sub-pixels and dark sub-pixels can still be formed using the capacitance electrode 37*b*. Also, because both the capacitance electrodes 37*a* and 37*b* have a portion that extends sideways in both directions, the value of the storage capacitances CSa and CSb can be made larger. Additionally, the configuration in which the capacitance electrode 37*a* and the capacitance electrode 37b are arranged symmetrically with respect to a point on the storage capacitance wiring 18j has an advantage that the value of coupling capacitance CC1 is compensated even if the pixel electrodes 17a and 17b are misaligned slightly in the row direction against the gate layer.

Figure 26:
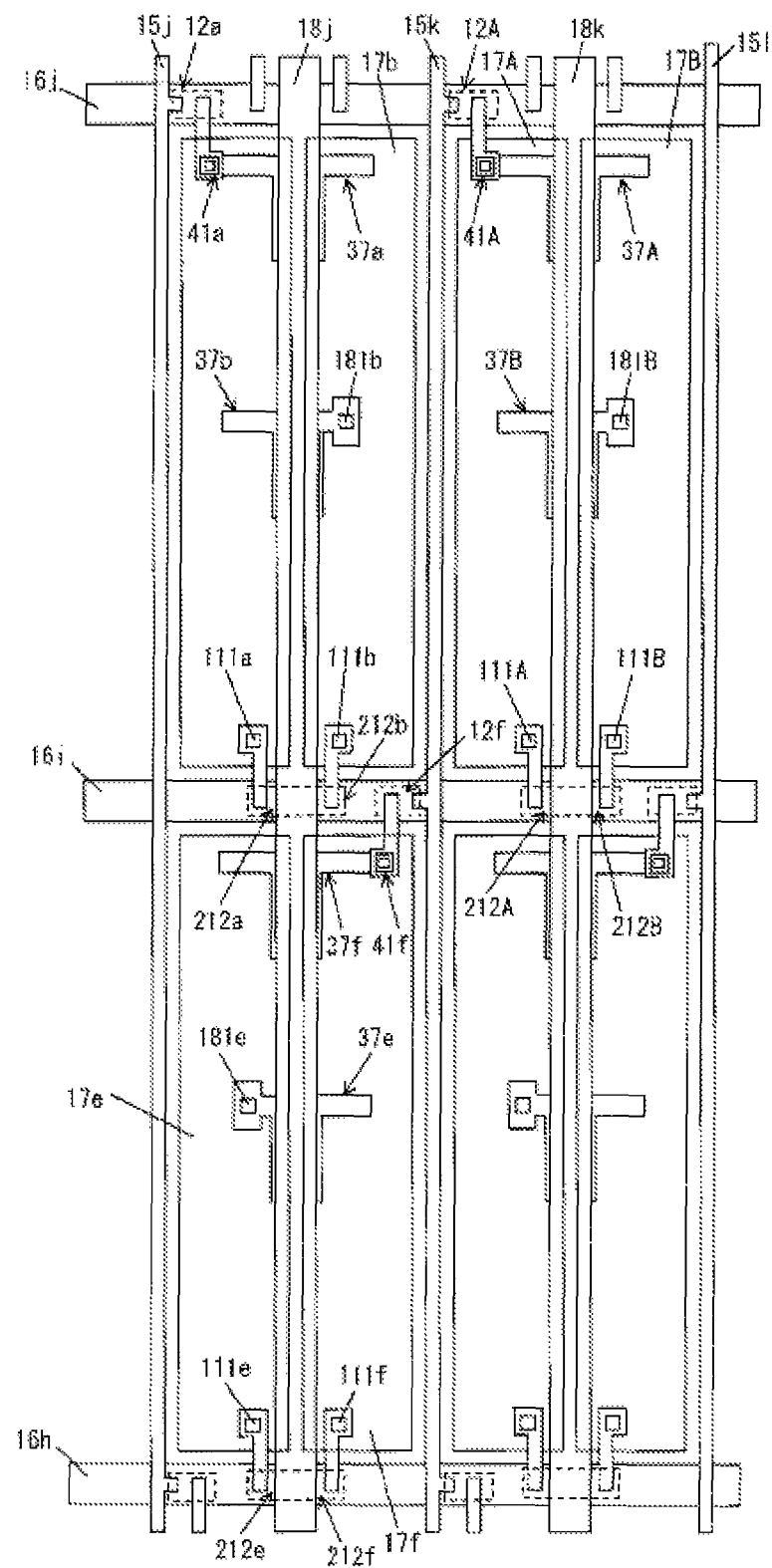
FIG. 26 is a plan view showing yet another configuration example of the liquid crystal panel shown in FIG. 21.

As shown in FIG. 26, which illustrates a liquid crystal panel that is modified from the one in FIG. 25, the contact hole 11a and the contact hole 181a can be combined to make a contact hole 41a, the contact hole 11f and the contact hole 181f can be combined to make a contact hole 41f, and the contact hole 11A and the contact hole 181A can be combined to make a contact hole 41A. For example, at a location where the contact hole 41a is formed, the interlayer insulating film is removed, and the drain lead-out electrode is also removed so that the entire portion that is removed overlap the central region of the removed portion of the interlayer insulating film. Further, the portion of the gate insulating film located under the removed portion of the drain lead-out electrode is removed. Because of this arrangement, the pixel electrode 17a is in contact with the drain lead-out electrode and with the capacitance electrode 38a. Since the alignment of the liquid crystal tends to become disturbed in proximity of the contact holes, by reducing the number of contact holes as in the configuration described above, disturbance of the liquid crystal alignment can be suppressed.

Figure 27:
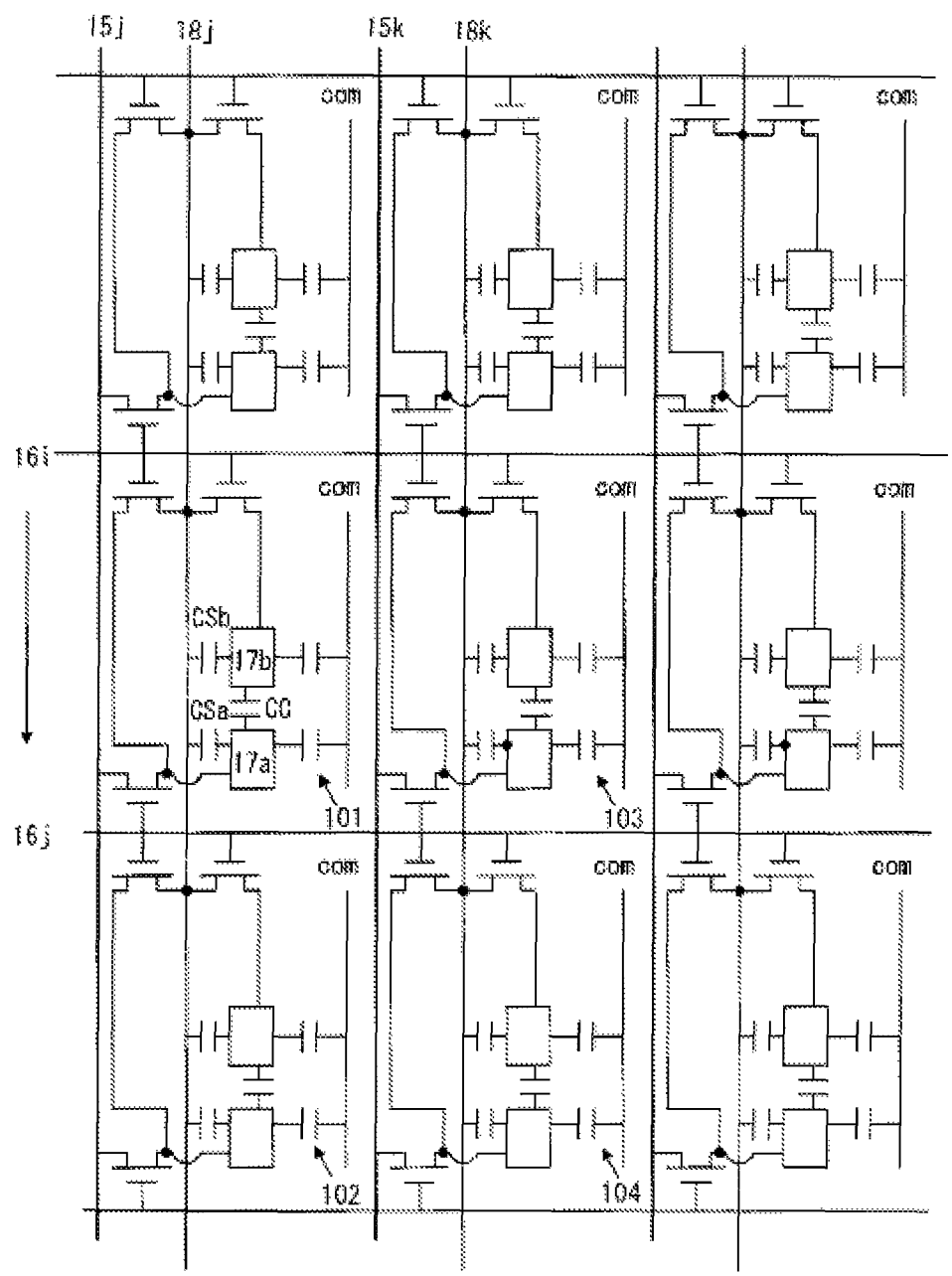
FIG. 27 is an equivalent circuit diagram showing the configuration when the scan direction of the liquid crystal panel of FIG. 15 is reversed.
Figure 28:
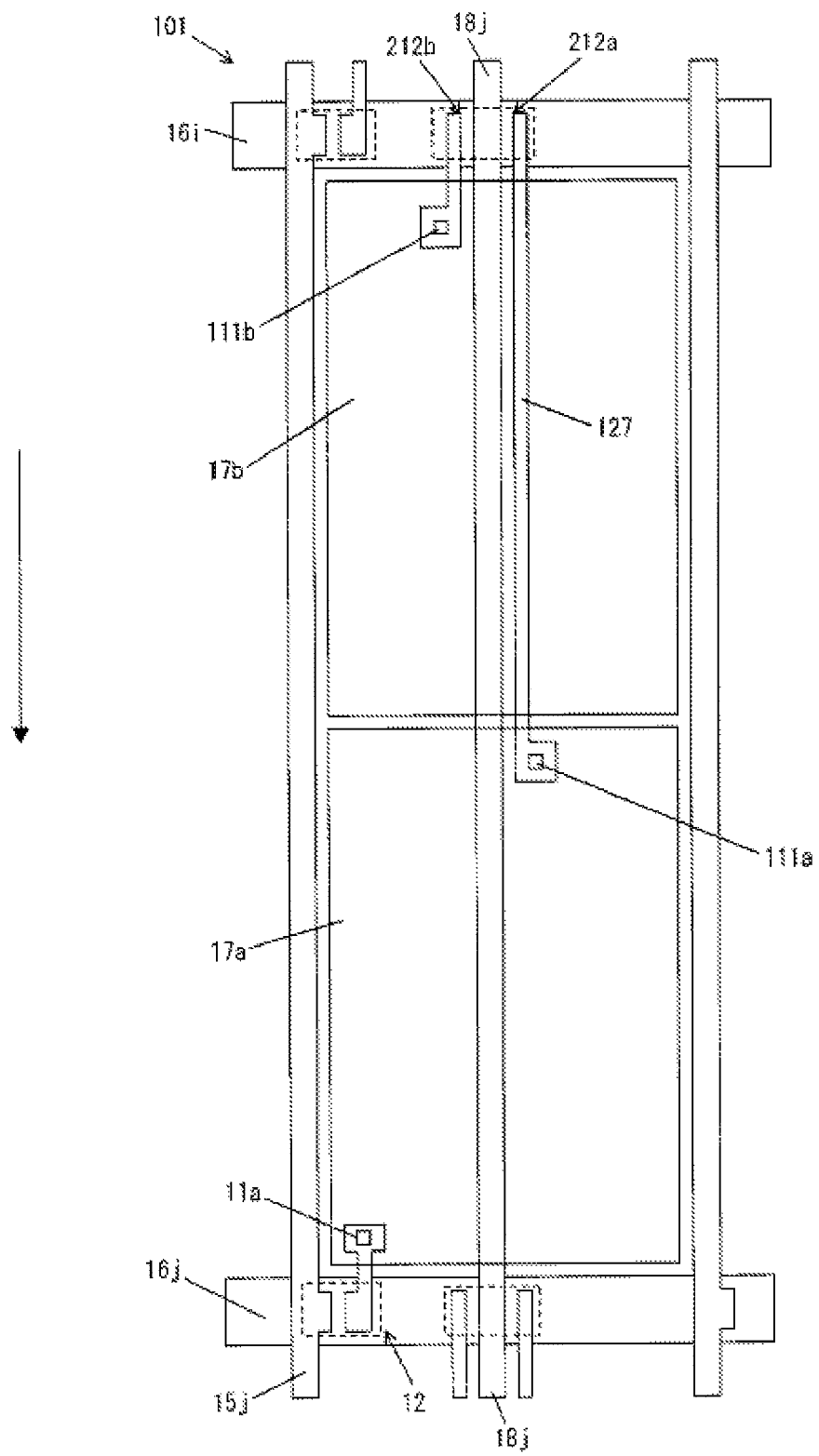
FIG. 28 is a plan view showing a configuration example of the liquid crystal panel of FIG. 27.

FIG. 27 illustrates the liquid crystal panel shown in FIG. 15, but in FIG. 27, the scan direction is from the top to bottom in the figure. FIG. 28 is a specific example of FIG. 27. In the present liquid crystal panel, a transistor 12 is disposed near the intersecting portion of the data signal line 15j and the scan signal line 16j, and a storage capacitance wiring 18j is provided vertically across the pixel region defined by the data signal line 15j and the scan signal line 16j. The storage capacitance wiring 18j is formed in the same layer with the data signal line 15j, in parallel therewith. In the aforementioned pixel region, a pixel electrode 17a (first pixel electrode) and a pixel electrode 17b (second pixel electrode) are arranged in the column direction, and the pixel electrode 17a is in proximity of the transistor 12.

Also, the source electrode of the transistor 12 is connected to the data signal line 15j, and the drain electrode is connected to the pixel electrode 17a. The scan signal line 16j serves as the gate electrode of the transistor 12.

Also, the storage capacitance wiring 18j extends from above the previous scan signal line 16i (where it intersects with the scan line 16i), continues through under the pixel electrode 17b and the pixel electrode 17a, and arrives above the current scan signal line 16j (where it intersects with the scan signal line 16j). Transistors 212a and 212b are disposed near the intersecting portion of the storage capacitance wiring 18j and the scan signal line 16i. A portion of the previous scan signal line 16i functions as the gate electrodes of the transistors 212a and 212b, and a portion of the storage capacitance wiring 18j functions as the common source electrode of the transistors 212a and 212b. The drain electrode of the transistor 212a is connected to the drain lead-out electrode 127, the drain electrode of the transistor 212b is connected to the pixel electrode 17b through the contact hole 111b, and the drain lead-out electrode 127 extends through under the pixel electrode 17b, arrives under the pixel electrode 17a, and is connected to the pixel electrode 17a through contact hole 111a.

In the present liquid crystal panel, a capacitance is formed at a location where the drain lead-out electrode 127 and the pixel electrode 17b overlap through the interlayer insulating film. This capacitance is a coupling capacitance CC (see FIG. 27). Further, a capacitance is formed at a location where the storage capacitance wiring 18j and the pixel electrode 17a overlap through the interlayer insulating film. This capacitance is a storage capacitance CSa (see FIG. 27). Also, a capacitance is formed at a location where the storage capacitance wiring 18j and the pixel electrode 17b overlap through the interlayer insulating film. This capacitance is a storage capacitance CSb (see FIG. 27).

Unlike the case where the drain electrode of the transistor 12 is connected to the drain lead-out electrode that overlaps the pixel electrode 17b, in the configuration described above, such drain lead-out electrode is not necessary, and therefore, the aperture ratio can be improved accordingly.

Figure 29:
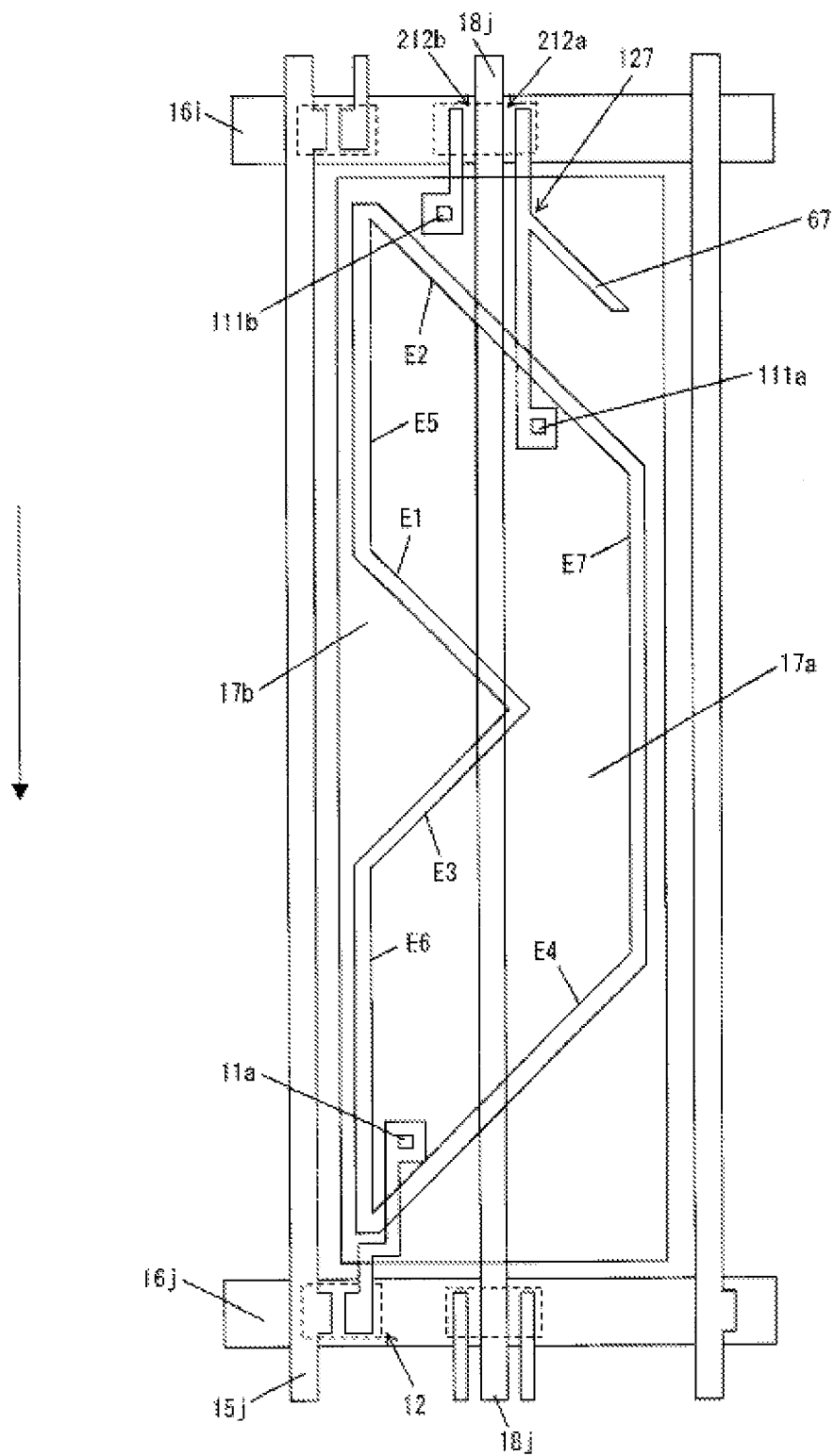
FIG. 29 is a plan view showing another configuration example of the liquid crystal panel shown in FIG. 27.

The liquid crystal panel of FIG. 28 can be modified into the configuration shown in FIG. 29, in which the pixel electrode 17a is V-shaped when observed in the row direction, and the pixel electrode 17b surrounds the pixel electrode 17a. That is, the pixel electrode 17a is composed of two sides E1 and E2, each forming a 315 degree angle against the scan signal line, two sides E3 and E4, each forming a 45 degree angle against the scan signal line, a side E5 connecting one end of the side E1 to one end of the side E2 and parallel with the data signal line, a side E6 connecting one end of the side E3 to one end of the side E4 and parallel with the data signal line, and a side E7 connecting the other end of the side E2 to the other end of the side E4 and parallel with the data signal line.

In the configuration described above, the space between the side E1 and a portion of the inner periphery of the pixel electrode 17b that faces the side E1, the space between the side E2 and a portion of the inner periphery of the pixel electrode 17b that faces the side E2, the space between the side E3 and a portion of the inner periphery of the pixel electrode 17b that faces the side E3, and a space between the side E4 and a portion of the inner periphery of the pixel electrode 17b that faces the side E4 can function as alignment control structures. Also, in FIG. 29, a capacitance electrode 67 extends from the drain lead-out electrode 127, forming a 315 degree angle against the scan signal line in order to increase the value of the coupling capacitance. The capacitance electrode 67 is formed in such manner as to overlap the alignment control structure (linear protrusions, for example) on the color filter substrate. However, this (the capacitance electrode 67) does not need to be disposed if the drain lead-out electrode 127 alone is enough to provide the necessary coupling capacitance value.

Figure 30:
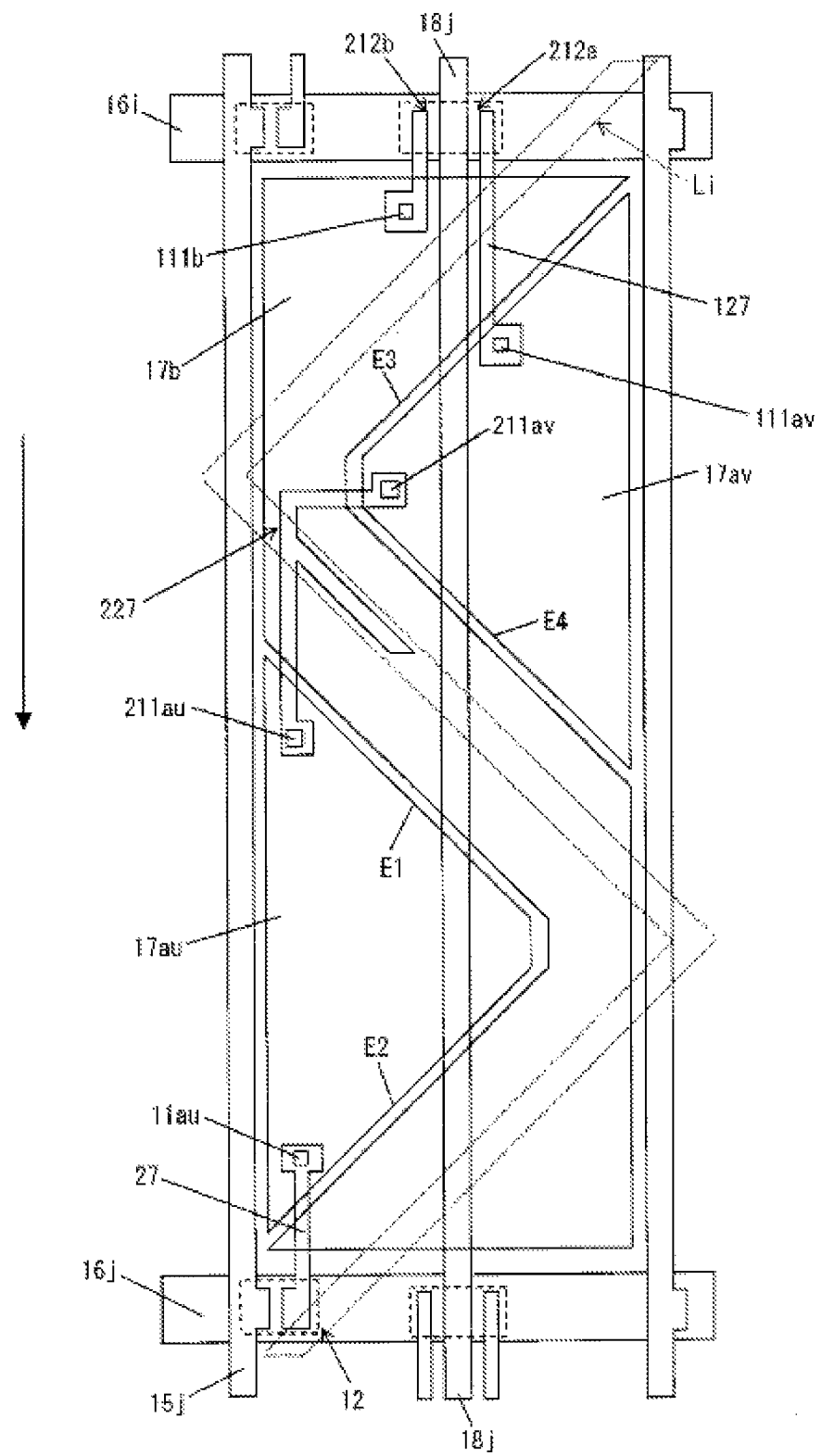
FIG. 30 is a plan view showing yet another configuration of the present liquid crystal panel.

The liquid crystal panel of FIG. 28 can also be modified into a configuration shown in FIG. 30, in which a isosceles trapezoid-shaped pixel electrode having a base along the data signal line and a pixel electrode that is symmetrical with the aforementioned pixel electrode with respect to a point, and pixel electrodes that fit in with these two pixel electrodes are provided in one pixel region.

In the present liquid crystal panel, a transistor 12 is provided near the intersecting portion of the data signal line 15j and the scan signal line 16j, and a storage capacitance wiring 18j is disposed vertically across the pixel region defined by the data signal line 15j and the scan signal line 16j. The storage capacitance wiring 18j is formed in the same layer with the data signal line 15j, in parallel therewith. In the aforementioned pixel region, pixel electrodes 17au and 17av and a pixel electrode 17b are arranged. Here, the pixel electrode 17au is disposed near the transistor 12, and has an isosceles trapezoid shape, in which the legs are an edge E1 forming a 315 degree against the scan signal line and an edge E2 forming a 45 degree angle against the scan signal line, and the base is the edge that extends along the data signal line 15j. The pixel electrode 17av is arranged symmetrically with the pixel electrode 17au with respect to the center of the pixel, and has an isosceles trapezoid shape, in which the legs are an edge E3 forming a 45 degree angle against the scan signal line and an edge E4 forming a 315 degree angle against the scan signal line, and the base is the edge that extends along the data signal line 15k. The source electrode of the transistor 12 is connected to the data signal line 15j, the drain electrode is connected to the pixel electrode 17au, and the scan signal line 16j serves as the gate electrode of the transistor 12. Also, the pixel electrode 17au is connected to a connecting electrode 227 through a contact hole 211au, and the connecting electrode 227 is connected to the pixel electrode 17av through a contact hole 211av.

Also, the storage capacitance wiring 18j extends from above the previous scan signal line 16i (where it intersects with the scan signal line 16i), crosses under the pixel electrode 17b, pixel electrode 17av, pixel electrode 17b, pixel electrode 17au, and pixel electrode 17b, and arrives above the current scan signal line 16j (where it intersects with the scan signal line 16j). The transistors 212a and 212b are provided near the intersecting portion of the storage capacitance wiring 18j and the scan signal line 16i. A portion of the previous scan signal line 16i functions as the gate electrodes of the transistors 212a and 212b; a portion of the storage capacitance wiring 18j functions as the common source electrode of the transistors 212a and 212b; the drain electrode of the transistor 212a is connected to the drain lead-out electrode 127; the drain electrode of the transistor 212b is connected to the pixel electrode 17b through a contact hole 111b; the drain lead-out electrode 127 extends through under the pixel electrode 17b, arrives under the pixel electrode 17av, and is connected to the pixel electrode 17av through a contact hole 111av.

In the present liquid crystal panel, a capacitance is formed at a location where the drain lead-out electrode 127 and the pixel electrode 17av overlap through the interlayer insulating film. This capacitance is a coupling capacitance. Further, capacitances are formed at locations where the storage capacitance wiring 18j and the pixel electrode 17av overlap through the interlayer insulating film, and where the storage capacitance wiring 18j and the pixel electrode 17au overlap through the interlayer insulating film. The sum of these capacitances is a storage capacitance. Also, a capacitance is formed at a location where the storage capacitance wiring 18j and the pixel electrode 17b overlap through the interlayer insulating film. This is a storage capacitance.

In the configuration described above, a space between a side E1 and a portion of the outer periphery of the pixel electrode 17b that faces the side E1, a space between a side E2 and a portion of the outer periphery of the pixel electrode 17b that faces the side E2, a space between a side E3 and a portion of the outer periphery of the pixel electrode 17b that faces the side E3, and space between a side E4 and a portion of the outer periphery of the pixel electrode 17b that faces the side E4 can function as alignment control structures.

Although in the liquid crystal panel shown in FIGS. 1 to 3, two transistors for discharge connected to the previous scan signal line are provided, and the drain electrode of one of the transistors is connected to a pixel electrode 17c (a pixel electrode corresponding to a bright sub-pixel), and the other drain is connected to a pixel electrode 17b (a pixel electrode corresponding to a dark sub-pixel), this configuration does not serve as a limitation in any way. For example, as shown in FIG. 31, in another possible configuration, only one transistor for discharge that is connected to the previous scan signal line is provided, and its drain electrode is connected to a pixel electrode 17b (a pixel electrode corresponding to a dark sub-pixel).

Figure 31:
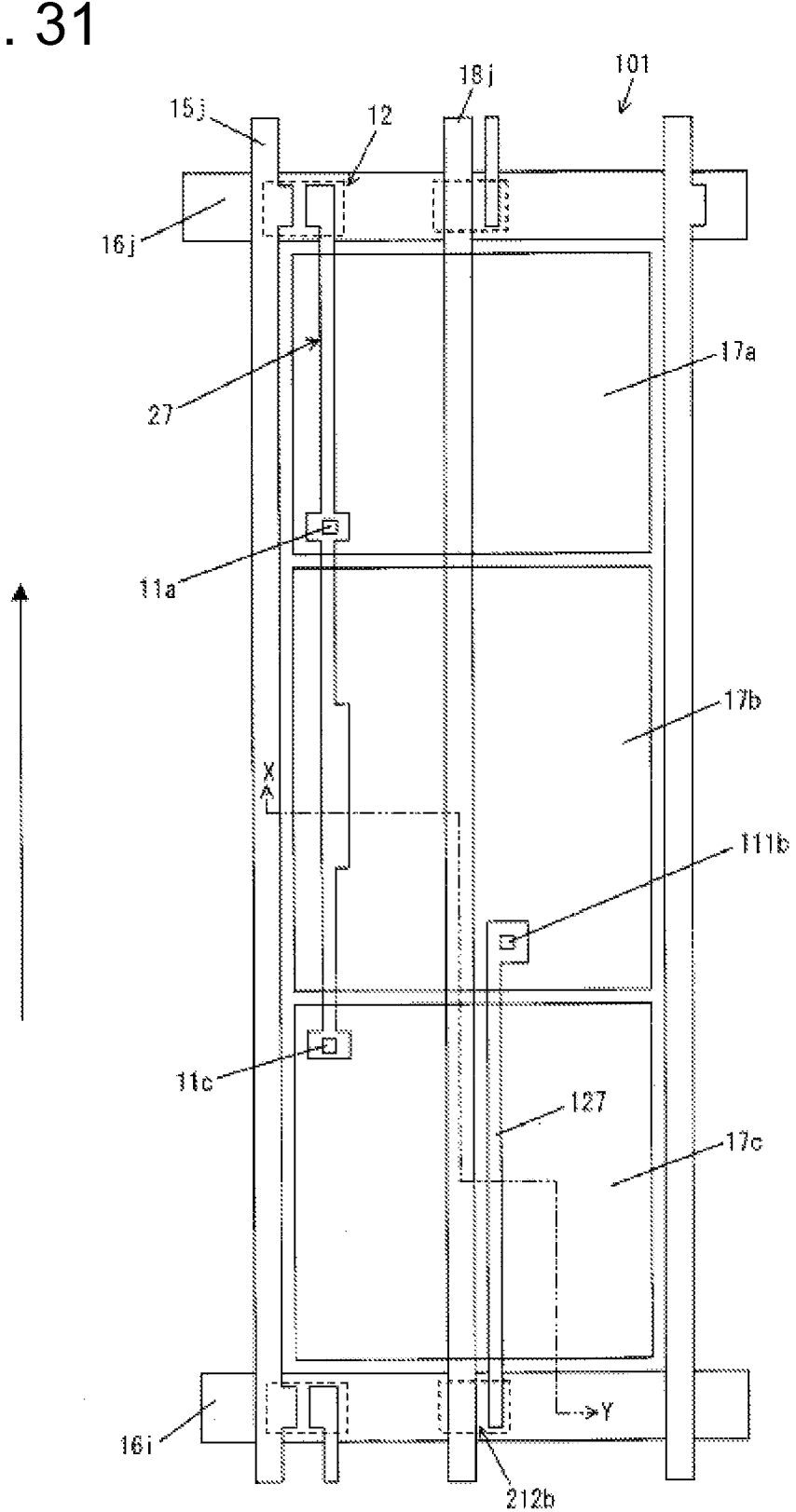
FIG. 31 is a plan view showing yet another modification example of the liquid crystal panel shown in FIG. 1.

That is, in FIG. 31, only a transistor 212b is provided as the transistor for discharge in which the scan signal line 16i serves as the gate electrode. The source electrode of the transistor 212b is connected to the storage capacitance wiring 18j, and the drain electrode is connected to the pixel electrode 17b through a drain lead-out electrode 127 and a contact hole 111b. Other than that, this configuration is identical to the one shown in FIG. 1. In this case, the pixel electrode 17b, which is electrically floating, is discharged when the scan signal line 16i is scanned. Consequently, dark sub-pixels are prevented from being burned. Also, similar to the liquid crystal panel of FIG. 1, in the capacitance coupling type active matrix substrate equipped with transistors for discharge, the aperture ratio reduction and the load increase on the scan signal lines can be suppressed. Additionally, the storage capacitance between the pixel electrode and the storage capacitance wiring can be increased without changing the aperture ratio. Also, because coupling capacitances are formed at two locations, necessary coupling capacitance can be obtained even if the drain lead-out electrodes (27 and 127) are made narrower for higher aperture ratio.

Figure 32:
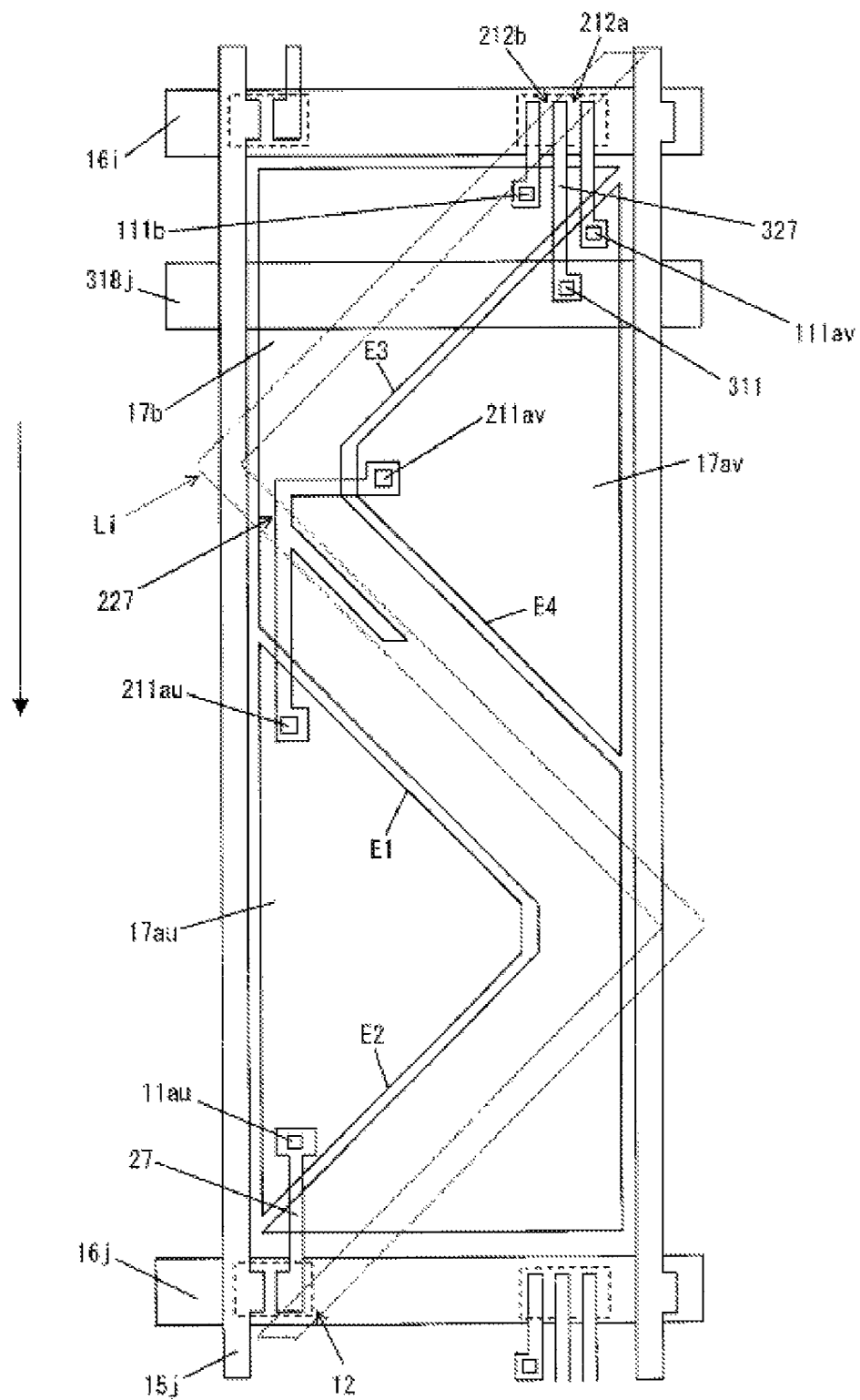
FIG. 32 is a plan view showing yet another configuration of the present liquid crystal panel.
Figure 33:
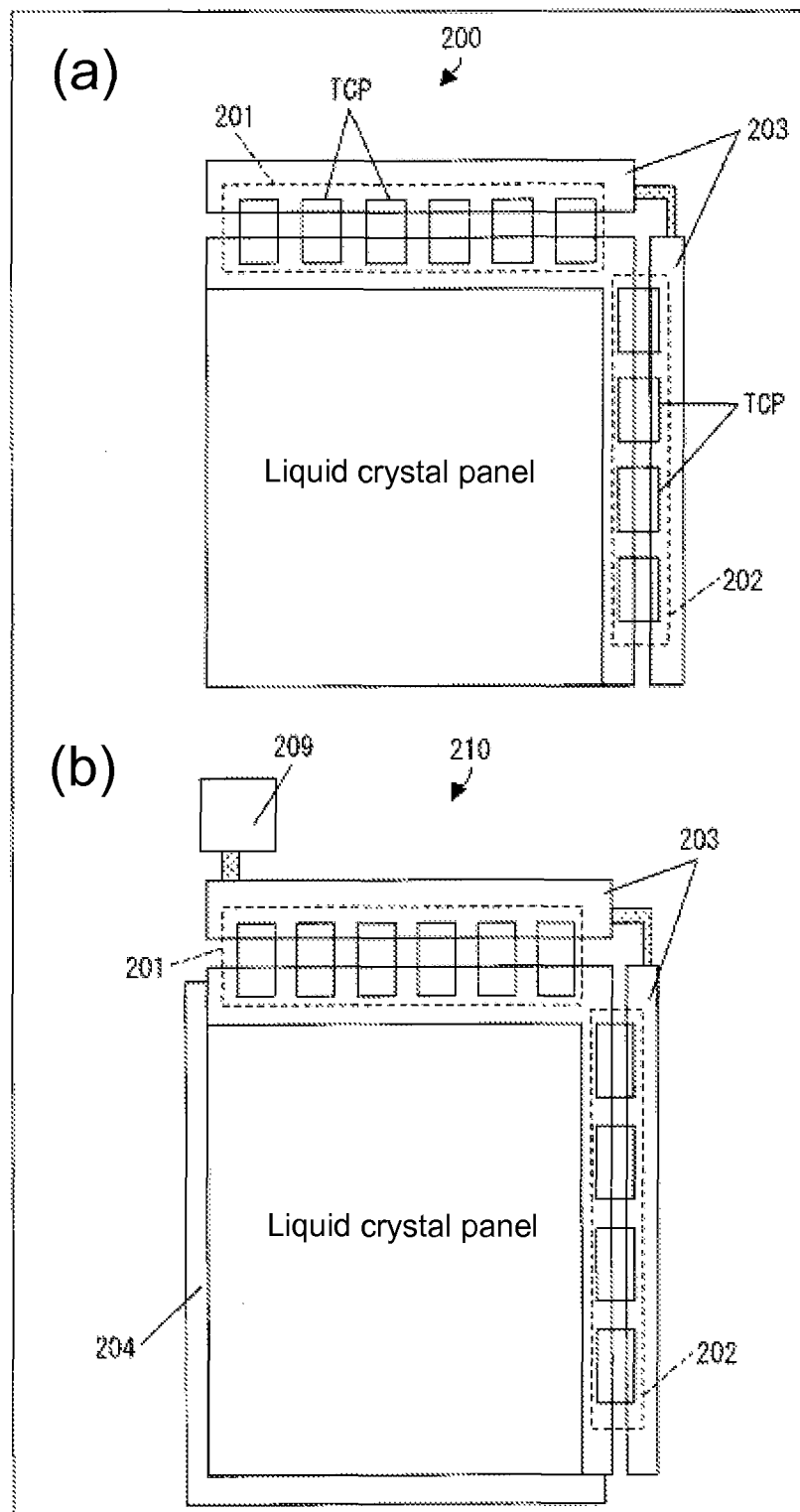
FIG. 33($a$) is a schematic view showing the configuration of a liquid crystal display unit, and FIG. 33($b$) is a schematic view showing the configuration of a liquid crystal display device.

Furthermore, with a configuration as shown in FIG. 32, the aperture ratio reduction and the load increase on the scan signal line can also be suppressed for the capacitance coupling type active matrix substrate equipped with transistors for discharge. In the liquid crystal panel shown in FIG. 32, the shapes of the three pixel electrodes (17av, 17au, and 17b) and their relation of connection, and also the location of the transistor 12 and its relation of connection are the same as those of the liquid crystal panel of FIG. 30 except that the storage capacitance wiring 318j is formed in the same layer with the previous scan signal line 16i so that it extends along the scan signal line 16i, and overlaps the pixel electrodes 17av and 17b through the insulating layer. A portion of the previous scan signal line 16i functions as the gate electrodes of the transistors 212a and 212b; the common source electrode of the transistors 212a and 212b is connected to the storage capacitance wiring 318j through a drain lead-out electrode 327 and a contact hole 311; the drain electrode of the transistor 212a is connected to the pixel electrode 17av through a contact hole 111av; and the drain electrode of the transistor 212b is connected to the pixel electrode 17b through a contact hole 111b. Although two transistors 212a and 212b are provided in FIG. 32 as transistors for discharge, alternatively, only the transistor 212b, not transistor 212a, for example, may be provided.

In the present embodiments, a liquid crystal display unit and a liquid crystal display device are constituted as follows. That is, two polarizing plates A and B are attached on respective sides of the liquid crystal panel so that the polarizing axis of the polarizing plate A and the polarizing axis of the polarizing plate B cross each other at a right angle. For the polarizing plates, an optical compensation sheet or the like may be layered as necessary. Next, as shown in FIG. 33(a), drivers (gate driver 202 and source driver 201) are connected. Here, connection of a driver by TCP system is described as an example. First, ACF is temporarily pressure-bonded to the terminal section of the liquid crystal panel. Next, TCP with a driver mounted thereon is punched out from the carrier tape, aligned to the panel terminal electrode, and heated for permanent pressure-bonding. Then, a circuit substrate 209 (PWB) and TCP input terminals for coupling the driver TCPs are connected together by ACF. The liquid crystal display unit 200 is thus complete. Subsequently, as shown in FIG. 33(b), a display control circuit 209 is connected to drivers (201 and 202) of the liquid crystal display unit through circuit substrates 203 for unification with a illumination device (backlight unit) 204, to complete a liquid crystal display device 210.

Figure 34:
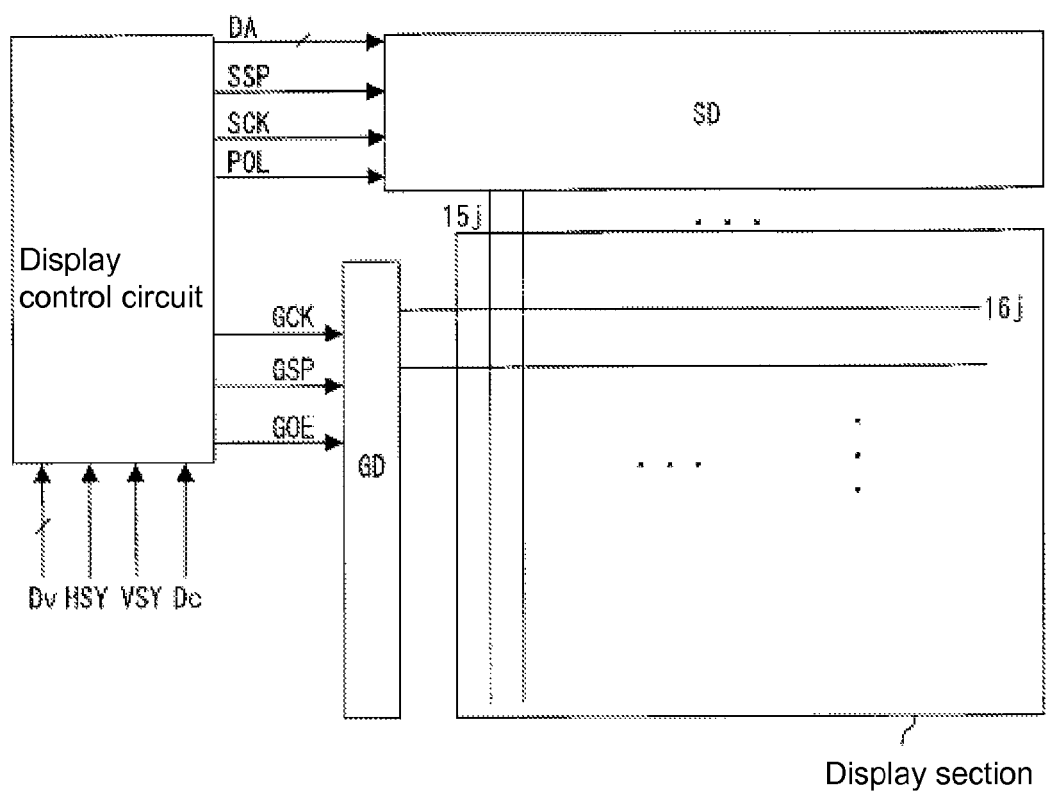
FIG. 34 is a block diagram explaining an entire configuration of the present liquid crystal display device.

FIG. 34 is a block diagram showing a configuration of a liquid crystal display device. As shown in the figure, the liquid crystal display device includes a display section (liquid crystal panel), a source driver (SD), a gate driver (GD), and a display control circuit. The source driver drives the data signal lines, the gate driver drives the scan signal lines, and the display control circuit controls the source driver and the gate driver.

The display control circuit receives a digital video signal Dv representing images to be displayed, a horizontal synchronization signal HSY and a vertical synchronization signal VSY corresponding to the digital video signal Dv, and a control signal Dc for controlling the display action, from an external signal source (a tuner, for example). The display control circuit generates signals for displaying images represented by the digital video signal Dv on the display section, according to the received signals Dv, HSY, VSY, and Dc, and outputs them. These are a data start pulse signal SSP, a data clock signal SCK, a digital image signal DA (the signal corresponding to the video signal Dv) representing the image to be displayed, a gate start pulse signal GSP, a gate clock signal GCK, and a gate driver output control signal (scan signal output control signal) GOE.

More specifically, the video signal Dv is subjected to the timing adjustment and the like in the internal memory as necessary, and then is output from the display control circuit as a digital image signal DA. The display control circuit generates: a data clock signal SCK, which is composed of pulses corresponding to the respective pixels of the images represented by the digital image signal DA; a data start pulse signal SSP, which, according to the horizontal synchronization signal HSY, shifts to a high level (H level) for a predetermined period of time for every horizontal scan period; a gate start pulse signal GSP, which, according to the vertical synchronization signal VSY, shifts to H level for a predetermined period of time for every frame period (one vertical scan period); a gate clock signal GCK according to the horizontal synchronization signal HSY; and a gate driver output control signal GOE according to the horizontal synchronization signal HSY and the control signal Dc.

Among the signals generated by the display control circuit as described above, the digital image signal DA, the polarity inversion signal POL for controlling the polarity of signal potentials (data signal potentials), the data start pulse signal SSP, and the data clock signal SCK are input to the source driver, and the gate start pulse signal GSP, the gate clock signal GCK, and the gate driver output control signal GOE are input to the gate driver.

The source driver sequentially generates analog potentials (signal potentials) corresponding to the pixel values of images represented by the digital image signal DA at respective scan signal lines for every horizontal scan period, based on the digital image signal DA, data clock signal SCK, data start pulse signal SSP, and polarity inversion signal POL, and outputs these data signals to the data signal lines.

The gate driver generates the gate-on pulse signal according to the gate start pulse signal GSP, the gate clock signal GCK, and the gate driver output control signal GOE, and outputs the signals to the scan signal lines to selectively drive the scan signal lines.

As described above, the data signal line and the scan signal line in the display section (liquid crystal panel) are driven by the source driver and the gate driver, and signal potentials are written from the data signal lines to the pixel electrodes through transistors (TFT) connected to the selected scan signal lines. Consequently, voltages are applied to the liquid crystal layer for respective sub-pixels, by which the amount of the light from the backlight that is transmitted is controlled, and images represented by the digital video signal Dv are displayed on respective sub-pixels.

Figure 35:
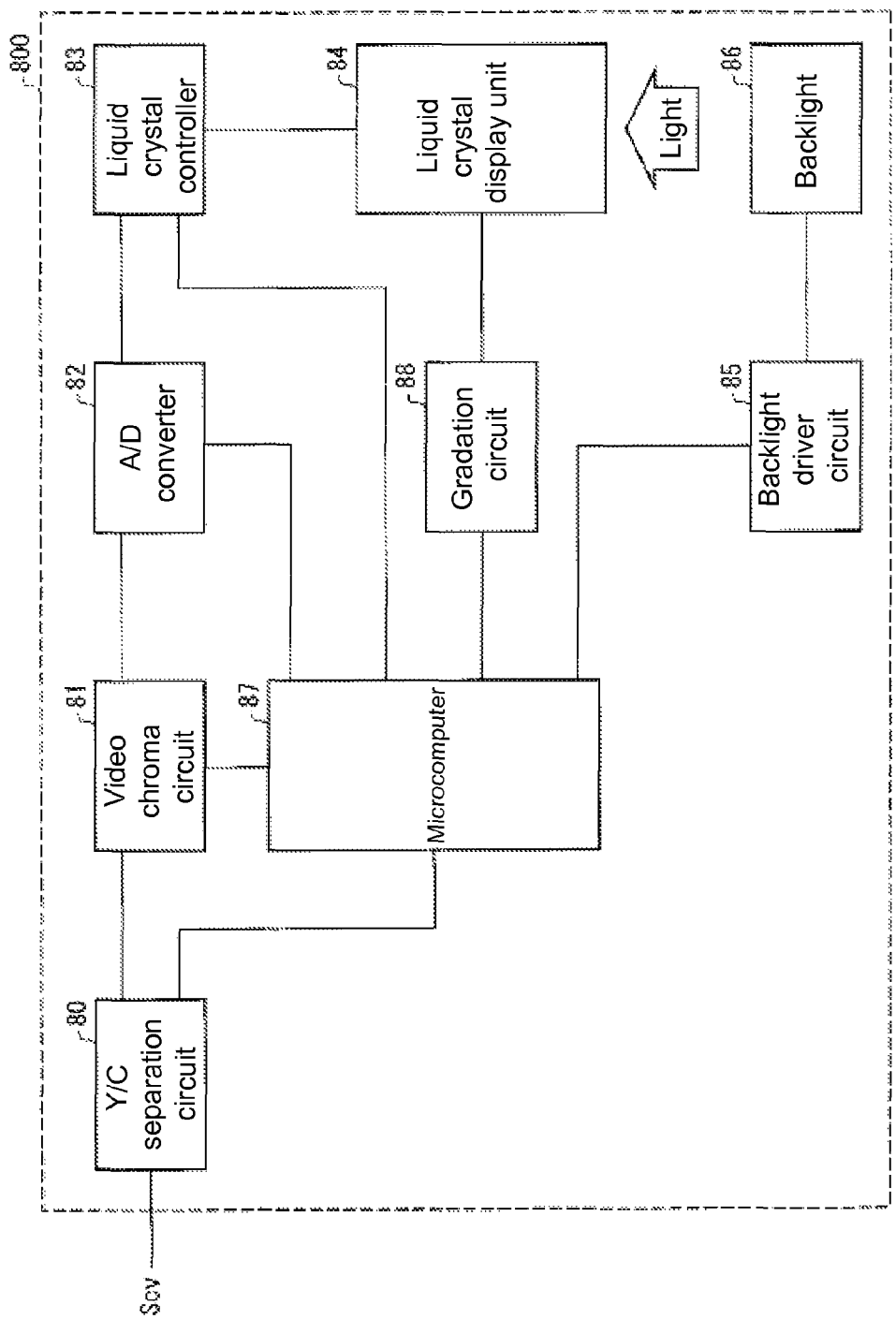
FIG. 35 is a block diagram explaining the functions of a present liquid crystal display device.

Next, a configuration example of the present liquid crystal display device as applied to a television receiver is described. FIG. 35 is a block diagram showing the configuration of a liquid crystal display device 800 for television receiver. The liquid crystal display device 800 includes a liquid crystal display unit 84, a Y/C separation circuit 80, a video chroma circuit 81, an A/D converter 82, a liquid crystal controller 83, a backlight driver circuit 85, a backlight 86, a microcomputer 87, and a gradation circuit 88. The liquid crystal display unit 84 is composed of a liquid crystal panel and a source driver and a gate driver for driving the liquid crystal panel.

In the liquid crystal display device 800 having a configuration described above, first, a composite color image signal Scv, which is a television signal, is input from outside to the Y/C separation circuit 80. There, the signal is separated into a luminance signal and a color signal. The luminance signal and the color signal are converted to analog a RGB signal corresponding to three primary colors of the light by the video chroma circuit 81. Further, this analog RGB signal is converted to a digital RGB signal by the A/D converter 82. The digital RGB signal is input to the liquid crystal controller 83. In the Y/C separation circuit 80, horizontal and vertical synchronization signals are also obtained from the composite color image signal Scv, which is input from outside. These synchronization signals are also input to the liquid crystal controller 83 through the microcomputer 87.

To the liquid crystal display unit 84, the digital RGB signal is input from the liquid crystal controller 83, together with the timing signal according to the aforementioned synchronization signals at a predetermined timing. Also, in the gradation circuit 88, gradation potentials of respective three primary colors R, G, and B for color display are generated, and the gradation potentials are also supplied to the liquid crystal display unit 84. In the liquid crystal display unit 84, signals for driving (data signals=signal potentials and scan signals, and the like) are generated by the internal source driver, the gate driver, and the like according to the RGB signals, the timing signals, and gradation potentials. According to the signals for driving, color images are displayed on the internal liquid crystal panel. In order for the images to be displayed by the liquid crystal display unit 84, the light needs to be radiated from behind the liquid crystal panel in the liquid crystal display unit. In the liquid crystal display device 800, the backlight driver circuit 85 drives the backlight 86 under the control of the microcomputer 87, and irradiates the backside of the liquid crystal panel with the light. Overall system control, including the processes described above, is conducted by the microcomputer 87. Not only image signals according to television broadcasting, but signals of images captured by cameras and of other images supplied via internet connection can also be used as image signals input from outside (composite color image signal). In the liquid crystal display device 800, image display according to various image signals is possible.

Figure 36:
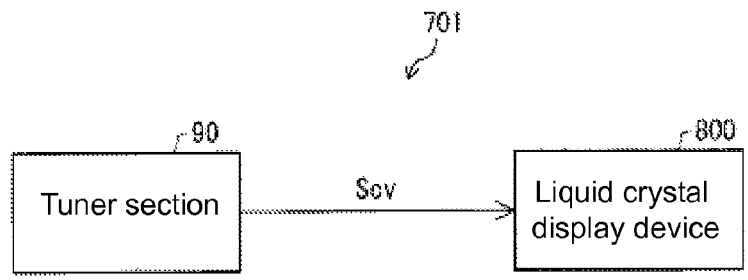
FIG. 36 is a block diagram explaining the functions of a present television receiver.

When the liquid crystal display device 800 is used to display images of television broadcasting, as shown in FIG. 36, a tuner section 90 is connected to the liquid crystal display device 800 to constitute a television receiver 701. The tuner section 90 extracts signals of a channel to be received from the waves (high frequency signals) received through an antenna (not shown), and converts the extracted signals to a middle frequency signal. The tuner section 90 then detects the middle frequency signal to retrieve composite color image signal Scv as a television signal. The composite color image signal Scv is input to the liquid crystal display device 800 as described above. Images according to the composite color image signal Scv are displayed by the liquid crystal display device 800.

Figure 37:
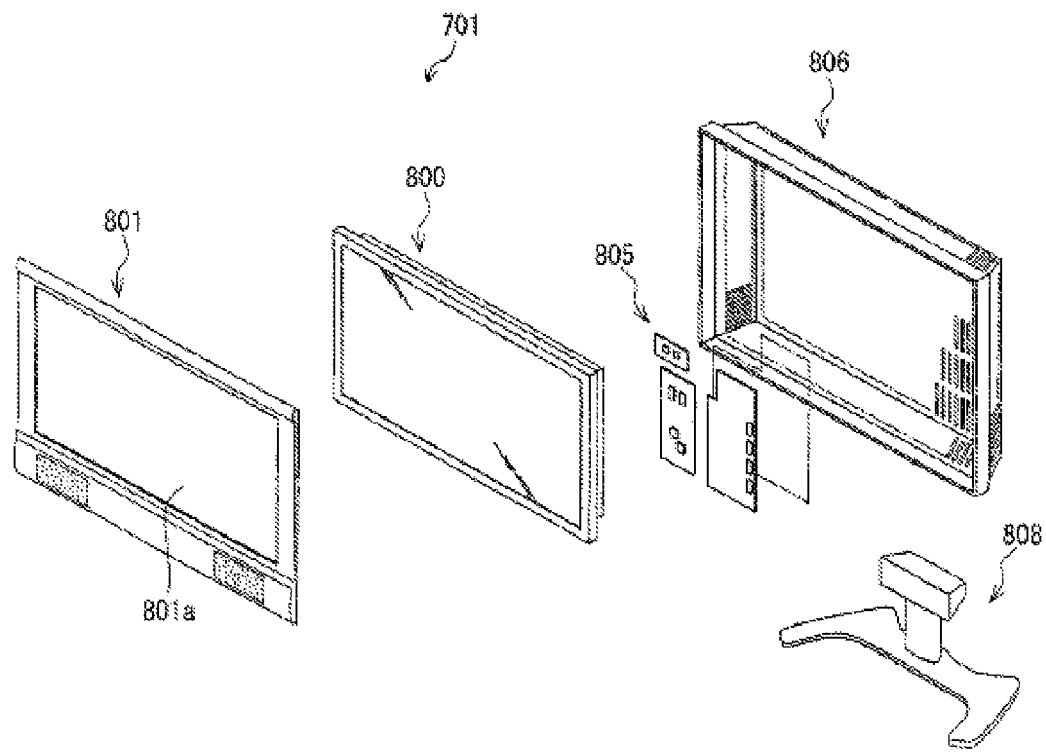
FIG. 37 is an exploded perspective view showing the configuration of a present television receiver.

FIG. 37 is an exploded perspective view showing a configuration of a television receiver. As shown in the figure, the television receiver 701 includes a first case 801 and a second case 806, in addition to the liquid crystal display device 800, as its constituting elements, and the liquid crystal display device 800 is held in the first case 801 and the second case 806. In the first case 801, there is an opening portion 801a that transmits the image to be displayed on the liquid crystal display device 800. The second case 806 covers the back side of the liquid crystal display device 800. An operation circuit 805 for operating the display device 800 is provided in the second case 806, and a supporting member 808 is attached at the bottom the second case 806.

The present invention is not limited to the embodiments described above. Any appropriate modifications of the embodiments described above based on the common technical knowledge, and any combinations of them are also included in embodiments of the present invention. Also, operations and effects and the like stated in the descriptions of embodiments are merely examples.

An active matrix substrate of the present invention is characterized in that it includes: a scan signal line that extends in the row direction when a data signal line extends in the column direction; a first transistor connected to the data signal line and the scan signal line, second and third transistors connected to the same scan signal line that is different from the aforementioned scan signal line; and a storage capacitance wiring, where a first pixel electrode electrically connected to the first transistor and a second pixel electrode connected to the first pixel electrode through a capacitance are provided in one pixel region; the storage capacitance wiring is formed in the same layer with the data signal line; the second transistor is electrically connected to the storage capacitance wiring and the first pixel electrode; and the third transistor is electrically connected to the storage capacitance wiring and the second pixel electrode.

In the configuration described above, the storage capacitance wiring is formed in the same layer with the data signal line (this is different from the layer of the scan signal line), and therefore an intersecting portion of the storage capacitance wiring and the scan signal line can be obtained. As a result, by disposing second and third transistors (transistors for discharge) near the intersecting portion, aperture ratio reduction and load increase on the gate bus line (scan signal line) can be suppressed more than in the conventional configuration (see FIG. 41). Also, the configuration has an advantage in that the distances between the storage capacitance wiring and the respective pixel electrodes are shorter than in the case where the storage capacitance wiring is disposed in the same layer with the scan signal line, and therefore the storage capacitance can be increased without changing the aperture ratio.

The present active matrix substrate may also have a configuration in which the first transistor is connected to the current scan signal line, and the second and the third transistors are connected to the previous scan signal line.

The present active matrix substrate may also have a configuration in which the second and the third transistors are disposed near the intersecting portion of the previous scan signal line and the storage capacitance wiring.

The present active matrix substrate may also have a configuration in which the storage capacitance wiring extends in the column direction.

The present active matrix substrate may also have a configuration in which the storage capacitance wiring overlap the first and second pixel electrodes through an interlayer insulating film covering the channels of the respective transistors.

The present active matrix substrate may also have a configuration in which a first capacitance electrode electrically connected to a first pixel electrode is provided, and the first capacitance electrode and the second pixel electrode overlap through an insulating layer.

The present active matrix substrate may also have a configuration in which the first capacitance electrode is formed in the same layer with the data signal line.

The present active matrix substrate may also have a configuration in which the first capacitance electrode is formed in the same layer with the scan signal line.

The present active matrix substrate may also have a configuration in which the first capacitance electrode and a storage capacitance wiring overlap through a gate insulating film.

The present active matrix substrate may also have a configuration in which a portion of a drain lead-out electrode led out from the drain electrode of the first transistor functions as the first capacitance electrode.

The present active matrix substrate may also have a configuration in which the first pixel electrode, the drain lead-out electrode led out from the drain electrode of the first transistor, and the first capacitance electrode are connected together through the same contact hole.

The present active matrix substrate may also have a configuration in which a bridging electrode that overlaps the first capacitance electrode and the storage capacitance wiring is provided.

The present active matrix substrate may also have a configuration in which the first capacitance electrode has two edges that are parallel to each other, the storage capacitance wiring also has two edges that are parallel to each other, and the both edges of the storage capacitance wiring fall between the edges of the first capacitance electrode when observed in a plan view.

The present active matrix substrate may also have a configuration in which the first capacitance electrode has two edges that are parallel to each other, the storage capacitance wiring also has two edges that are parallel to each other, and the both edges of the first capacitance electrode fall between the edges of the storage capacitance wiring.

The present active matrix substrate may also have a configuration in which the first and second pixel electrodes are arranged in the column direction.

The present active matrix substrate may also have a configuration in which the first and second pixel electrodes are arranged in the row direction.

The present active matrix substrate may also have a configuration in which the a third pixel electrode electrically connected to the first pixel electrode is provided.

The present active matrix substrate has a configuration in which a second capacitance electrode electrically connected to the second pixel electrode is provided, and the second capacitance electrode and the first pixel electrode overlap through an insulating layer.

The present active matrix substrate may also have a configuration in which a second capacitance electrode electrically connected to the second pixel electrode is provided, and the second capacitance electrode and the third pixel electrode overlap through an insulating layer.

The present active matrix substrate may also have a configuration in which a portion of the drain lead-out electrode led out from the drain electrode of the third transistor functions as the second capacitance electrode.

The present active matrix substrate may also have a configuration in which, in one of two pixel regions arranged next to each other in the column direction, the first transistor is connected to one of two adjacent data signal lines, and in the other of the two aforementioned pixel regions, the first transistor is connected to the other of the two data signal lines.

The present active matrix substrate may also have a configuration in which the first pixel electrode provided in one of the aforementioned two pixel regions and the second pixel electrode provided in the other pixel region are adjacent to each other in the column direction.

The present active matrix substrate may also have a configuration in which the storage capacitance wiring extends in the column direction and overlaps with the first and the second pixel electrodes and the space between them.

The present active matrix substrate may also have a configuration in which first and second capacitance electrodes are formed in the same layer with the scan signal line, and the first capacitance electrode connected to the first pixel electrode through a contact hole crosses under the storage capacitance wiring and arrives under the second pixel electrode, while the second capacitance electrode connected to the second pixel electrode through a contact hole crosses under the storage capacitance wiring and arrives under the first pixel electrode.

The present active matrix substrate may also be characterized in that it includes: a scan signal line that extends in the row direction when a data signal line extends in the column direction; a first transistor connected to the data signal line and the scan signal line; a second transistor connected to another scan signal line that is different from the aforementioned scan signal line; and a storage capacitance wiring, where a first pixel electrode electrically connected to the first transistor and a second pixel electrode connected to the first pixel electrode through a capacitance are provided in one pixel region; the storage capacitance wiring is formed in the same layer with the data signal line; and the second transistor is electrically connected to the storage capacitance wiring and the second pixel electrode. In this case, the active matrix substrate may also have a configuration in which the first transistor is connected to the current scan signal line, and the second transistor is connected to the previous scan signal line. The active matrix substrate may also have a configuration in which the second transistor is provided near the intersecting portion of the previous scan signal line and the storage capacitance wiring. Also, the active matrix substrate may have a configuration in which the storage capacitance wiring extends in the column direction.

The present liquid crystal panel is characterized in that it is equipped with the aforementioned active matrix substrate.

The present liquid crystal display unit is characterized in that it is equipped with the aforementioned liquid crystal panel and drivers.

The present liquid crystal display device is characterized in that it includes the aforementioned liquid crystal display unit and a light source device. Also, the present liquid crystal display device is characterized in that it is equipped with the aforementioned active matrix substrate, and that it supplies signal potentials of the same polarity to respective data signal lines during a vertical period.

The present television receiver is characterized in that it includes the aforementioned liquid crystal display device and a tuner section that receives the television broadcasting.

INDUSTRIAL APPLICABILITY

An active matrix substrate of the present invention and a liquid crystal panel equipped with the active matrix substrate is suitable, for example, for a liquid crystal television.

DESCRIPTION OF REFERENCE CHARACTERS

101-104 pixel
12, 212b, 212c transistor
15j, 15k data signal line
16i, 16j scan signal line
17a, 17b pixel electrode
18j, 18k storage capacitance wiring
27, 127 drain lead-out electrode
43 gate insulating film
51 interlayer insulating film
701 television receiver
800 liquid crystal display device

The invention claimed is:

1. An active matrix substrate comprising: scan signal lines that extend in a row direction; data signal lines that extend in a column direction, the scan signal lines and the data signal lines intersecting each other and defining a matrix of pixel regions; a first transistor connected to a data signal line and a scan signal line in each of the pixel regions; second and third transistors connected to a same scan signal line that is different from said scan signal line in each of the pixel regions; and a storage capacitance wiring,
  wherein a first pixel electrode electrically connected to said first transistor and a second pixel electrode connected to said first pixel electrode through a capacitance are provided in each of the pixel regions,
  wherein said storage capacitance wiring is formed in a same layer with the data signal lines,
  wherein said second transistor is electrically connected to said storage capacitance wiring and said first pixel electrode in each of the pixel regions, and
  wherein said third transistor is electrically connected to said storage capacitance wiring and said second pixel electrode in each of the pixel region.

2. The active matrix substrate according to claim 1, wherein said first transistor is connected to a current scan signal line, and said second and third transistors are connected to a previous scan signal line.

3. The active matrix substrate according to claim 2, wherein said second and third transistors are provided near an intersecting portion of said previous scan signal line and said storage capacitance wiring.

4. The active matrix substrate according to claim 1, wherein said storage capacitance wiring extends in the column direction.

5. The active matrix substrate according to claim 1, wherein said storage capacitance wiring overlaps said first and second pixel electrodes through an interlayer insulating film that covers channels of respective transistors.

6. The active matrix substrate according to claim 5, further comprising a first capacitance electrode electrically connected to the first pixel electrode, wherein said first capacitance electrode and said second pixel electrode overlap with each other through an insulating layer.

7. The active matrix substrate according to claim 6, wherein said first capacitance electrode is formed in a same layer with the scan signal lines.

8. The active matrix substrate according to claim 7, wherein said first capacitance electrode and said storage capacitance wiring overlap with each other through a gate insulating film.

9. The active matrix substrate according to claim 7, wherein said first pixel electrode, a drain lead-out electrode led out from the drain electrode of the first transistor, and said first capacitance electrode are connected together by a single contact hole.

10. The active matrix substrate according to claim 8, wherein the first capacitance electrode has two edges that are parallel to each other, the storage capacitance wiring has two edges that are parallel to each other, and the both edges of the storage capacitance wiring fall between the edges of the first capacitance electrode when observed in a plan view.

11. The active matrix substrate according to claim 8, wherein the first capacitance electrode has two edges that are parallel to each other, the storage capacitance wiring has two edges that are parallel to each other, and the both edges of the first capacitance electrode fall between the edges of the storage capacitance wiring when observed in a plan view.

12. The active matrix substrate according to claim 1, wherein the first and the second pixel electrodes are arranged in the column direction.

13. The active matrix substrate according to claim 1, wherein the first and the second pixel electrodes are arranged in the row direction.

14. The active matrix substrate according to claim 1, further comprising a third pixel electrode that is electrically connected to the first pixel electrode.

15. The active matrix substrate according to claim 1, further comprising a second capacitance electrode electrically connected to the second pixel electrode, wherein said second capacitance electrode and said first pixel electrode overlap with each other through an insulating layer.

16. The active matrix substrate according to claim 14, further comprising a second capacitance electrode electrically connected to the second pixel electrode, wherein the second capacitance electrode and the third pixel electrode overlap through an insulating layer.

17. The active matrix substrate according to claim 15, wherein a portion of a drain lead-out electrode led out from the drain electrode of the third transistor functions as said second capacitance electrode.

18. The active matrix substrate according to claim 13, wherein, in one of two pixel regions arranged next to each other in the column direction, the first transistor is connected to one of two adjacent data signal lines, and in the other of said two pixel regions, the first transistor is connected to the other of said two data signal lines.

19. The active matrix substrate according to claim 18, wherein the first pixel electrode provided in one of said two pixel regions and the second pixel electrode provided in another pixel region are adjacent to each other in the column direction.

20. The active matrix substrate according to claim 13, wherein said storage capacitance wiring extends in the column direction and overlaps with the first and the second pixel electrodes and a space between them.

21. The active matrix substrate according to claim 20, further comprising first and second capacitance electrodes in a same layer with the scan signal line, wherein said first capacitance electrode connected to the first pixel electrode through a contact hole crosses under the storage capacitance wiring and arrives under the second pixel electrode, while said second capacitance electrode connected to the second pixel electrode through a contact hole crosses under the storage capacitance wiring and arrives under the first pixel electrode.

22. The active matrix substrate according to claim 21, wherein said first and second capacitance electrodes are formed symmetrically with each other with respect to a point or a line.

23. A liquid crystal panel comprising the active matrix substrate according to claim 1.

24. A liquid crystal display unit comprising the liquid crystal panel according to claim 23 and a driver.

25. A liquid crystal display device comprising the liquid crystal display unit according to claim 24 and a light source device.

26. A liquid crystal display device comprising the active matrix substrate according to claim 19, wherein signal potentials of a same polarity are supplied to respective data signal lines during one vertical period.

27. A television receiver comprising the liquid crystal display device according to claim 25 and a tuner section that receives a television broadcasting.

* * * * *